United States Patent
Yamasaki

(10) Patent No.: US 10,808,781 B2
(45) Date of Patent: Oct. 20, 2020

(54) ELECTRIC LINEAR MOTION ACTUATOR AND ELECTROMECHANICAL BRAKE SYSTEM

(71) Applicant: NTN CORPORATION, Osaka (JP)

(72) Inventor: Tatsuya Yamasaki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 54 days.

(21) Appl. No.: 16/309,755

(22) PCT Filed: May 24, 2017

(86) PCT No.: PCT/JP2017/019404
§ 371 (c)(1),
(2) Date: Dec. 13, 2018

(87) PCT Pub. No.: WO2017/217202
PCT Pub. Date: Dec. 21, 2017

(65) Prior Publication Data
US 2019/0128351 A1    May 2, 2019

(30) Foreign Application Priority Data

Jun. 16, 2016   (JP) .................... 2016-119661
Jul. 7, 2016    (JP) .................... 2016-135297
(Continued)

(51) Int. Cl.
*F16D 65/18*    (2006.01)
*B60T 13/74*    (2006.01)
(Continued)

(52) U.S. Cl.
CPC .............. *F16D 65/18* (2013.01); *B60T 13/74* (2013.01); *F16D 55/226* (2013.01); *F16H 25/20* (2013.01);
(Continued)

(58) Field of Classification Search
CPC .... F16D 65/18; F16D 55/226; F16D 2125/40; B60T 13/74
See application file for complete search history.

(56) References Cited

U.S. PATENT DOCUMENTS

2013/0168192 A1    7/2013  Yasui et al.
2014/0158479 A1*   6/2014  Takahashi et al. .... H02K 7/116
                                                188/72.1
(Continued)

FOREIGN PATENT DOCUMENTS

EP    2 733 379    5/2014
EP    2 772 659    9/2014
(Continued)

OTHER PUBLICATIONS

International Search Report dated Aug. 29, 2017 in International (PCT) Application No. PCT/JP2017/019404.
(Continued)

*Primary Examiner* — Vishal R Sahni
(74) *Attorney, Agent, or Firm* — Wenderoth, Lind & Ponack, L.L.P.

(57) ABSTRACT

In an electric linear motion actuator, while an axially forward load is not being applied to an object by an outer ring member, a preload is applied to a frictionally coupling surface by an elastic member, and, when the axially forward load is applied to the object by the outer ring member, an axial load applied to the frictionally coupling surface decreases by an amount equal to the axially rearward reaction force which the outer ring member receives from the object. The electric linear motion actuator includes a load sensor for supporting, through planetary rollers and a carrier, the axially rearward reaction force. The load sensor is arranged such that any change in magnitude of an axially forward load applied through a snap ring will not affect the
(Continued)

value of the axially rearward reaction force detected by the load sensor.

12 Claims, 32 Drawing Sheets

(30) Foreign Application Priority Data

Jul. 14, 2016 (JP) .................................. 2016-139543
Jul. 20, 2016 (JP) .................................. 2016-142495

(51) Int. Cl.
*F16D 55/226* (2006.01)
*F16H 25/20* (2006.01)
*F16D 121/24* (2012.01)
*F16D 125/40* (2012.01)

(52) U.S. Cl.
CPC ...... *F16D 2121/24* (2013.01); *F16D 2125/40* (2013.01)

(56) References Cited

U.S. PATENT DOCUMENTS

| | | | | |
|---|---|---|---|---|
| 2014/0262634 | A1* | 9/2014 | Yamasaki et al. | F16D 65/00 188/72.1 |
| 2015/0204736 | A1* | 7/2015 | Masuda | F16D 65/18 73/862.69 |
| 2015/0246662 | A1* | 9/2015 | Masuda | B60T 7/085 701/70 |
| 2015/0355038 | A1* | 12/2015 | Masuda | G01L 1/22 188/1.11 E |
| 2015/0360656 | A1* | 12/2015 | Masuda | B60T 7/042 188/162 |
| 2016/0091039 | A1* | 3/2016 | Masuda | F16D 65/18 188/72.1 |

FOREIGN PATENT DOCUMENTS

| | | |
|---|---|---|
| EP | 2 999 111 | 3/2016 |
| JP | 2012-057681 | 3/2012 |
| JP | 2014-016307 | 1/2014 |
| JP | 5496836 | 5/2014 |
| JP | 2016-075708 | 5/2016 |
| WO | 2016/035610 | 3/2016 |

OTHER PUBLICATIONS

International Preliminary Report on Patentability dated Dec. 18, 2018 in International (PCT) Application No. PCT/JP2017/019404.
Extended European Search Report dated May 21, 2019 in European Patent Application No. 17813104.1.

* cited by examiner

FIG. 35(a)
FIG. 35(b)
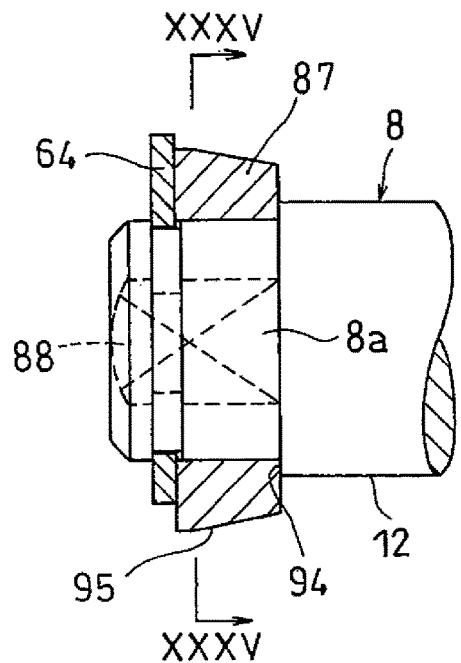
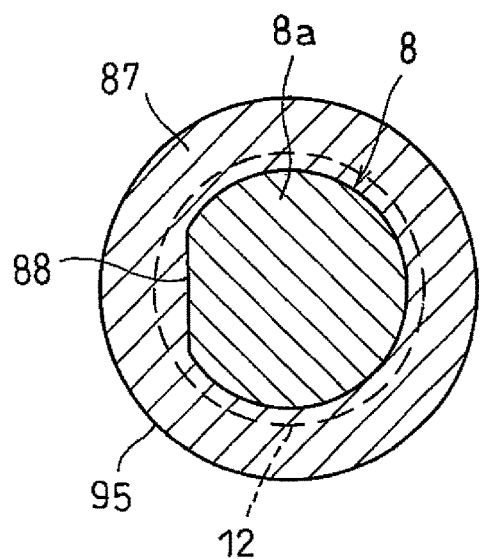
FIG. 36(a)
FIG. 36(b)
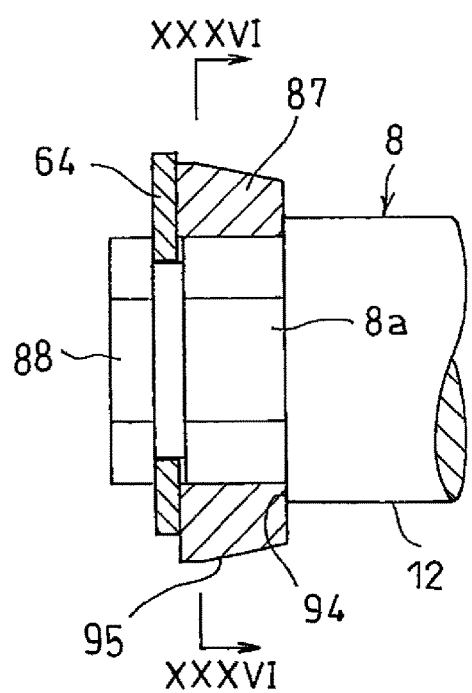
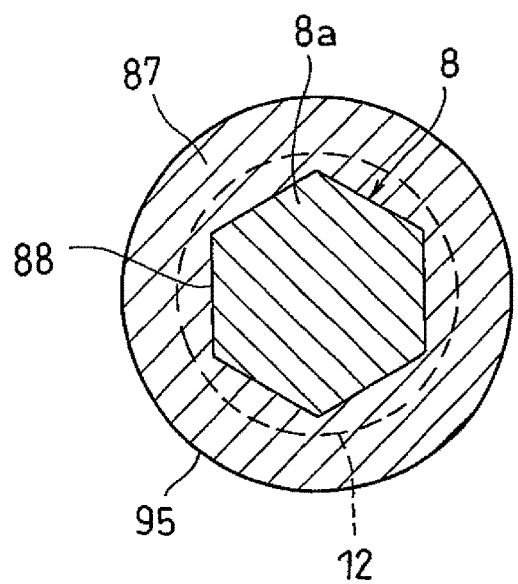

ELECTRIC LINEAR MOTION ACTUATOR AND ELECTROMECHANICAL BRAKE SYSTEM

TECHNICAL FIELD

The present invention relates to an electric linear motion actuator, and an electromechanical brake system in which the electric linear motion actuator is used.

BACKGROUND ART

As brake systems for vehicle, hydraulic brake systems driven by oil pressure have been widely used. However, since hydraulic brake systems use brake oil, a burden on the environment is high. Also, it is difficult to add, to hydraulic brake systems, sophisticated functions such as an anti-lock brake control function, a stability control function, and a brake assisting function. In order to further increase the functionality of brake systems, and reduce the burden on the environment, electromechanical brake systems, which are driven by an electric motor, are gathering attention.

Electromechanical brake systems include a brake disk that rotate together with a vehicle wheel; a brake pad opposed to the brake disk; and an electric linear motion actuator for linearly driving the brake pad to press the brake pad against the brake disk, thereby generating a braking force.

For example, the below-identified Patent document 1 discloses an electric linear motion actuator used in such electromechanical brake systems, and including an electric motor; a rotary shaft to which the rotation of the electric motor is transmitted; a plurality of planetary rollers kept in rolling contact with the outer periphery of the rotary shaft; a carrier retaining the planetary rollers such that the planetary rollers can revolve around the rotary shaft while rotating about their respective center axes; an outer ring member surrounding the planetary rollers; and a housing in which the outer ring member is axially movably received. The outer ring has a helical rib on the inner periphery. Each planetary roller has, in the outer periphery, a helical groove or circumferential grooves in which the helical rib is engaged.

For this electric linear motion actuator, when the electric motor is rotated, the rotation of the rotary shaft is transmitted to the planetary rollers kept in rolling contact with the outer periphery of the rotary shaft, and thus the planetary rollers revolve around the rotary shaft while rotating about their respective center axis. As a result thereof, since the helical rib on the inner periphery of the outer ring member is engaged in the helical grooves or the circumferential grooves in the outer peripheries of the planetary rollers, the outer ring member axially moves.

When this electric linear motion actuator is used in an electromechanical brake system, if the helical rib on the inner periphery of the outer ring member has a large lead angle, since the outer ring member axially moves at a high speed, it is possible to bring the brake pad into contact with the brake disk quickly in order to generate the braking force, and thus to improve the response of the brake. However, since the load conversion rate is low, the force with which the brake pad presses the brake disk is small.

On the other hand, if the helical rib on the inner periphery of the outer ring member has a small lead angle, since the load conversion rate is high, it is possible to press the brake pad against the brake disk with a large force when applying the brake. However, since the outer ring member axially moves at a low speed, it is impossible to bring the brake pad into contact with the brake disk quickly, that is, the response of the brake is slow. Namely, in this conventional arrangement, improving the response of the brake is in conflict with increasing the force with which the brake pad presses the brake disk.

In order to improve the response of the brake, and simultaneously increase the force with which the brake pad presses the brake disk, the below-identified Patent document 1 proposes a structure which enables the load conversion rate to be switched according to the magnitude of the axial load applied to an object by the outer ring member.

Namely, in Patent Document 1, an elastic member supports the carrier such that, due to the axially rearward reaction force which the outer ring member receives when the outer ring member applies an axially forward load to the object, the carrier moves in the axially rearward direction relative to the rotary shaft. Also, a frictionally coupling portion is disposed on the outer periphery of the rotary shaft such that, while the carrier has not moved in the axially rearward direction relative to the rotary shaft, the carrier and the frictionally coupling portion are frictionally coupled together so as to restrict the relative rotation of the carrier and the rotary shaft, and such that, when the carrier has moved in the axially rearward direction relative to the rotary shaft, the carrier and the frictionally coupling portion are uncoupled from each other so as to allow the carrier and the rotary shaft to rotate relative to each other.

With this arrangement, while no axially forward load is being applied to the object by the outer ring member, the carrier and the frictionally coupling portion on the outer periphery of the rotary shaft are frictionally coupled together, thereby restricting the relative rotation of the carrier and the rotary shaft. Therefore, in this state, the rotation of the rotary shaft transmitted from outside causes the carrier to rotate together with the rotary shaft, so that the outer ring member axially moves at a low reduction ratio. On the other hand, when the axially forward load is applied to the object by the outer ring member, the carrier and the frictionally coupling portion on the outer periphery of the rotary shaft are uncoupled from each other, thereby allowing the carrier and the rotary shaft to rotate relative to each other. Therefore, the rotation of the rotary shaft transmitted from outside causes the planetary rollers to revolve around the rotary shaft while rotating about their respective center axes, and thus the outer ring member axially moves at a high reduction ratio. In this way, it is possible to switch the load conversion rate (reduction ratio) according to the magnitude of the axial load applied to the object by the outer ring member.

On the other hand, the below-identified Patent document 2 discloses a load sensor used in an electromechanical brake system, and configured to detect the magnitude of the axially rearward reaction force which the electric linear motion actuator of the brake system receives when it presses the brake pad against the brake disk. This load sensor is disposed to support, through the planetary rollers and the carrier, the axially rearward reaction force which the outer ring member receives from the object when the outer ring member applies an axially forward load to the object.

PRIOR ART DOCUMENTS

Patent Documents

Patent document 1: Japanese Patent No. 5496836
Patent document 2: Japanese Unexamined Patent Application Publication No. 2014-016307

SUMMARY OF THE INVENTION

Problems to be Solved by the Invention

The inventor of the present application experimentally prepared, in his company, an electric linear motion actuator 77 including, as illustrated in FIG. 14, a planetary roller screw type linear motion actuator 74 configured to axially move an outer ring 72 due to the engagement of a helical rib 73 on the inner periphery of the outer ring member 72 in circumferential grooves 71 in the outer peripheries of the planetary rollers 70; and a load sensor 76 configured to support, through the planetary rollers 70 and a carrier 75, the axially rearward reaction force which the outer ring member 72 receives from an object when the outer ring member applies the axially forward load to the object. Then, the inventor conducted an experiment to find the relationship between the magnitude of the axially forward load applied to the object from the outer ring member 72, and the output from the load sensor 76.

The electric linear motion actuator 77 used in the above experiment includes (though some of the below elements are already mentioned above) a rotary shaft 78 to which the rotation of an electric motor (not shown) is transmitted; plural planetary rollers 70 in rolling contact with the outer periphery of the rotary shaft 78; a carrier 75 which retains the planetary rollers 70 such that the planetary rollers 70 can revolve around the rotary shaft 78 while rotating about their respective center axes; an outer ring member 72 surroundings the planetary rollers 70; a housing 79 in which the outer ring member 72 is axially movably received; a helical rib 73 on the inner periphery of the outer ring member 72; and circumferential grooves 71 in the outer peripheries of the planetary rollers 70.

The rotary shaft 78 is provided, on its outer periphery, with an frictionally engaging surface 80 configured to restrict the range within which the carrier 75 is movable in the axially forward direction relative to the rotary shaft 78; and a snap ring 81 configured to restrict the range within which the carrier 75 is movable in the axially rearward direction relative to the rotary shaft 78. An elastic member 82 is mounted between the carrier 75 and the load sensor 76 so as to bias the carrier 75 in the axially forward direction relative to the rotary shaft 78.

The frictionally engaging surface 80 comprises a tapered surface configured such that, while the carrier 75 has not moved in the axially rearward direction relative to the rotary shaft 78, the tapered surface and the carrier 75 are frictionally coupled together so as to restrict the relative rotation of the carrier 75 and the rotary shaft 78, and such that, when the carrier 75 has moved in the axially rearward direction relative to the rotary shaft 78, the tapered surface and the carrier 75 are uncoupled from each other so as to allow the carrier 75 and the rotary shaft 78 to rotate relative to each other.

The load sensor 76 is fixedly mounted at a position axially rearward of the carrier 75. The load sensor 76 includes a flange member 83 configured to support the axially rearward reaction force which the outer ring member 72 receives when the outer ring member 72 applies the axially forward load to the object such that the flange member 83 is deflected by the axially rearward reaction force; a circular annular support member 84 disposed axially rearward of the flange member 83; a magnetic target 85 configured to generate a magnetic field; and a magnetism detector 86 configured to detect the magnetic field generated by the magnetic target 85. The load sensor 76 is configured such that, as the flange member 83 is deflected, the magnetic target 85 and the magnetism detector 86 are displaced from each other according to the degree of such deflection, and is capable of detecting the magnitude of the reaction force based on the magnetic field which the magnetism detector 86 detects.

By the experiment conducted to find the relationship between the magnitude of the axially forward load applied to the object from the outer ring member 72, and the output from the load sensor 76, the below-described problem was discovered.

Namely, it is expected that, as the magnitude of the axially forward load applied to the object from the outer ring member 72 is monotonically increased, the reaction force value detected by the load sensor 76 also monotonically increases according to the magnitude of this load.

Actually, however, it turned out that, when the magnitude of the axially forward load applied to the object from the outer ring member 72 was monotonically increased, as illustrated in FIG. 15, the reaction force value detected by the load sensor 76 decreased temporarily, and then increased.

It is considered that the reaction force value detected by the load sensor 76 decreased temporarily for the following reasons.

Assuming that: $F_{OR}$ is the magnitude of the axially rearward reaction force which the outer ring member 72 receives when the outer ring member 72 applies an axially forward load to the object; $F_C$ is the magnitude of the axial load applied to the load sensor 76 from the carrier 75; $F_{SR}$ is the magnitude of the axially forward load applied to the load sensor 76 through the snap ring 81; $F_H$ is the magnitude of the axial load which the support member 84 receives from the housing 79; and $F_S$ is the magnitude of the preload applied to the carrier 75 by the elastic member 82 while no axially forward load is being applied to the object by the outer ring member 72, then the relations $F_C=F_S$, $F_{SR}=F_S-F_{OR}$, and $F_R=F_{OR}$ are satisfied while $F_{OR} \leq F_S$; and the relations $F_C=F_{OR}$, $F_{SR}=0$, and $F_R=F_{OR}$ are met while $F_{OR}>F_S$.

The reason why $F_{SR}=F_S-F_{OR}$ while $F_{OR} \leq F_S$ is because, when the axially rearward reaction force $F_{OR}$ is applied to the outer ring member 72 from the object, the axial load applied to the frictionally engaging surface 80 from the carrier 75 decreases by the amount equal to the reaction force $F_{OR}$, so that the axially forward load $F_{SR}$ applied through the snap ring 81 also decreases. Also, the load $F_{SR}$ elastically deforms the support member 84 of the load sensor 76 in the axially forward direction.

This led to the discovery that, not only because load $F_{SR}$ that deflects the support member 84 of the load sensor 76 in the axially forward direction is actually applied to the support member 84, but because the load $F_{SR}$ changes according to the magnitude of $F_{or}$, when the magnitude of the axially forward load applied to the object from the outer ring member 72 monotonically increases, the reaction force value detected by the load sensor 76 decreases temporarily as illustrated in FIG. 15.

If, as illustrated in FIG. 15, the reaction force value detected by the load sensor 76 decreases temporarily, since the value detected by the load sensor 76 is not in a one-toone relationship with the magnitude of the actual reaction force anymore, it is impossible to stably control the magnitude of the axial load based on the value detected by the load sensor 76.

An object of the present invention is, in an electric linear motion actuator including a carrier axially movably supported by the elastic member, to enable the load sensor to stably detect the axially rearward reaction force which the outer ring member receives from the object when the outer ring member applies the axially forward load to the object.

Means for Solving the Problems

In order to achieve the above object, the present invention provides an electric linear motion actuator comprising: an electric motor; a rotary shaft to which rotation of the electric motor is to be transmitted; a plurality of planetary rollers in rolling contact with an outer periphery of the rotary shaft, and each having an outer periphery; a carrier retaining the planetary rollers such that the planetary rollers can revolve around the rotary shaft while rotating about respective center axes of the planetary rollers; an outer ring member surrounding the planetary rollers, and supported so as to be axially movable; a housing in which the outer ring member is axially movably received; a helical rib disposed on an inner periphery of the outer ring member; either helical grooves each disposed in the outer periphery of a respective one of the planetary rollers, or circumferential grooves, a plurality of the circumferential grooves being disposed in the outer periphery of a respective one of the planetary rollers, wherein the helical rib is engaged in the helical grooves or the circumferential grooves such that the outer ring member is axially movable when the planetary rollers revolve around the rotary shaft while rotating about the respective center axes thereof; a front engagement portion disposed on the outer periphery of the rotary shaft so as to restrict a range within which the carrier is movable in an axially forward direction relative to the rotary shaft; a rear engagement portion disposed on the outer periphery of the rotary shaft so as to restrict a range within which the carrier is movable in an axially rearward direction relative to the rotary shaft; and an elastic member configured to bias the carrier in the axially forward direction relative to the rotary shaft; wherein the electric linear motion actuator is configured such that: while a first axially forward load is not being applied to an object by the outer ring member, a preload is applied to the front engagement portion by the elastic member, and when the first axially forward load is applied to the object by the outer ring member, an axial load applied to the front engagement portion decreases by an amount equal to an axially rearward reaction force which the outer ring member receives from the object when the first axially forward load is applied to the object by the outer ring member, characterized in that the electric linear motion actuator further comprises a load sensor configured to support, through the planetary rollers and the carrier, the axially rearward reaction force, wherein the load sensor is disposed such that any change in magnitude of a second axially forward load applied through the rear engagement portion does not affect a value of the axially rearward reaction force detected by the load sensor.

With this arrangement, since, even when the magnitude of the axially forward load applied from the rear engagement portion changes, the reaction force value detected by the load sensor is not affected, the load sensor can stably detect the axially rearward reaction force which the outer ring member receives form the object when the outer ring member applies an axially forward load to the object.

The above electric linear motion actuator may be an actuator wherein the load sensor comprises: a flange member configured to be deflected by the axially rearward reaction force; a circular annular plate-shaped support member disposed axially rearward of the flange member; a magnetic target configured to generate a magnetic field; and a magnetism detector configured to detect the magnetic field generated by the magnetic target, wherein one of the magnetic target and the magnetism detector is fixed to the flange member, and the other of the magnetic target and the magnetism detector is fixed to the circular annular plate-shaped support member such that, as the flange member is deflected, the magnetic target and the magnetism detector are displaced from each other according to a degree of deflection of the flange member, wherein the circular annular plate-shaped support member is disposed between the carrier and the rear engagement portion such that the second axially forward load is applied to the circular annular plate-shaped support member, and wherein the circular annular plate-shaped support member includes, on an axial side surface of the circular annular plate-shaped support member, a plurality of radially extending ribs circumferentially spaced apart from each other, and configured such that, due to the ribs, even when the magnitude of the axially forward load applied from the rear engagement portion changes, the reaction force value detected by the load sensor is not affected.

With this arrangement, since the ribs on the axial side surface of the support member increase the rigidity of the support member, the support member is not deflected by the axially forward load input to the support member. Therefore, even when the magnitude of the axially forward load applied from the rear engagement portion changes, the reaction force value detected by the load sensor is not affected.

Also, the above electric linear motion actuator may be an actuator wherein the load sensor comprises: a flange member configured to be deflected by the axially rearward reaction force; a circular annular plate-shaped support member disposed axially rearward of the flange member; a magnetic target configured to generate a magnetic field; and a magnetism detector configured to detect the magnetic field generated by the magnetic target, wherein one of the magnetic target and the magnetism detector is fixed to the flange member, and the other of the magnetic target and the magnetism detector is fixed to the circular annular plate-shaped support member such that, as the flange member is deflected, the magnetic target and the magnetism detector are displaced from each other according to a degree of deflection of the flange member, wherein the circular annular plate-shaped support member has a radially outer edge, and is disposed between the carrier and the rear engagement portion such that the second axially forward load is applied to the radially outer edge of the circular annular plate-shaped support member such that, even when the magnitude of the axially forward load applied from the rear engagement portion changes, the reaction force value detected by the load sensor is not affected.

With this arrangement, since an axially forward load is input to the radially outer edge of the support member, the support member is not deflected by the axially forward load input to the support member. Therefore, even when the magnitude of the axially forward load applied from the rear engagement portion changes, the reaction force value detected by the load sensor is not affected.

The load sensor may be disposed axially rearward of the rear engagement portion such that, even when the magnitude of the axially forward load applied from the rear engagement portion changes, the reaction force value detected by the load sensor is not affected.

With this arrangement, since the load sensor is disposed axially rearward of the rear engagement portion, the axially forward load applied from the rear engagement portion is not input to the load sensor. Therefore, even when the magnitude of the axially forward load applied from the rear engagement portion changes, the reaction force value detected by the load sensor is not affected.

The electric linear motion actuator may further comprise: a first thrust bearing arranged to allow the carrier and the load sensor to rotate relative to each other, while transmitting any axial load between the carrier and the load sensor; and a second thrust bearing arranged to allow the carrier and the rear engagement portion to rotate relative to each other, while transmitting any axial load between the carrier and the rear engagement portion.

With this arrangement, it is possible to stably detect a reaction force with the load sensor, while effectively reducing the rotational resistance of the carrier.

The front engagement portion may comprise a frictionally coupling surface configured such that, while the carrier has not moved in the axially rearward direction relative to the rotary shaft, the frictionally coupling surface and the carrier are frictionally coupled together so as to restrict a relative rotation of the carrier and the rotary shaft, and such that, when the carrier has moved in the axially rearward direction relative to the rotary shaft, the frictionally coupling surface and the carrier are uncoupled from each other so as to allow the carrier and the rotary shaft to rotate relative to each other.

The present invention also provides an electromechanical brake system comprising: a brake disk configured to rotate together with a vehicle wheel; a brake pad opposed to the brake disk; and the above-described electric linear motion actuator, which is configured to linearly drive the brake pad.

Effects of the Invention

For the electric linear motion actuator of the present invention, since, even when the magnitude of the axially forward load applied from the rear engagement portion changes, the reaction force value detected by the load sensor is not affected, the load sensor can stably detect the axially rearward reaction force which the outer ring member receives form the object when the outer ring member applies an axially forward load to the object.

BRIEF DESCRIPTION OF THE DRAWINGS

FIG. 35(a) is a view illustrating a variation of the fictionally coupling portion of FIG. 31.

FIG. 35(b) is a sectional view taken along line XXXV-XXXV of FIG. 35(a).

FIG. 36(a) is an enlarged view illustrating a frictionally coupling portion of a planetary roller screw type linear motion mechanism according to a second embodiment of the fourth aspect of the present invention.

FIG. 36(b) is a sectional view taken along line XXXVI-XXXVI of FIG. 36(a).

DETAILED DESCRIPTION OF THE INVENTION

Figure 1:
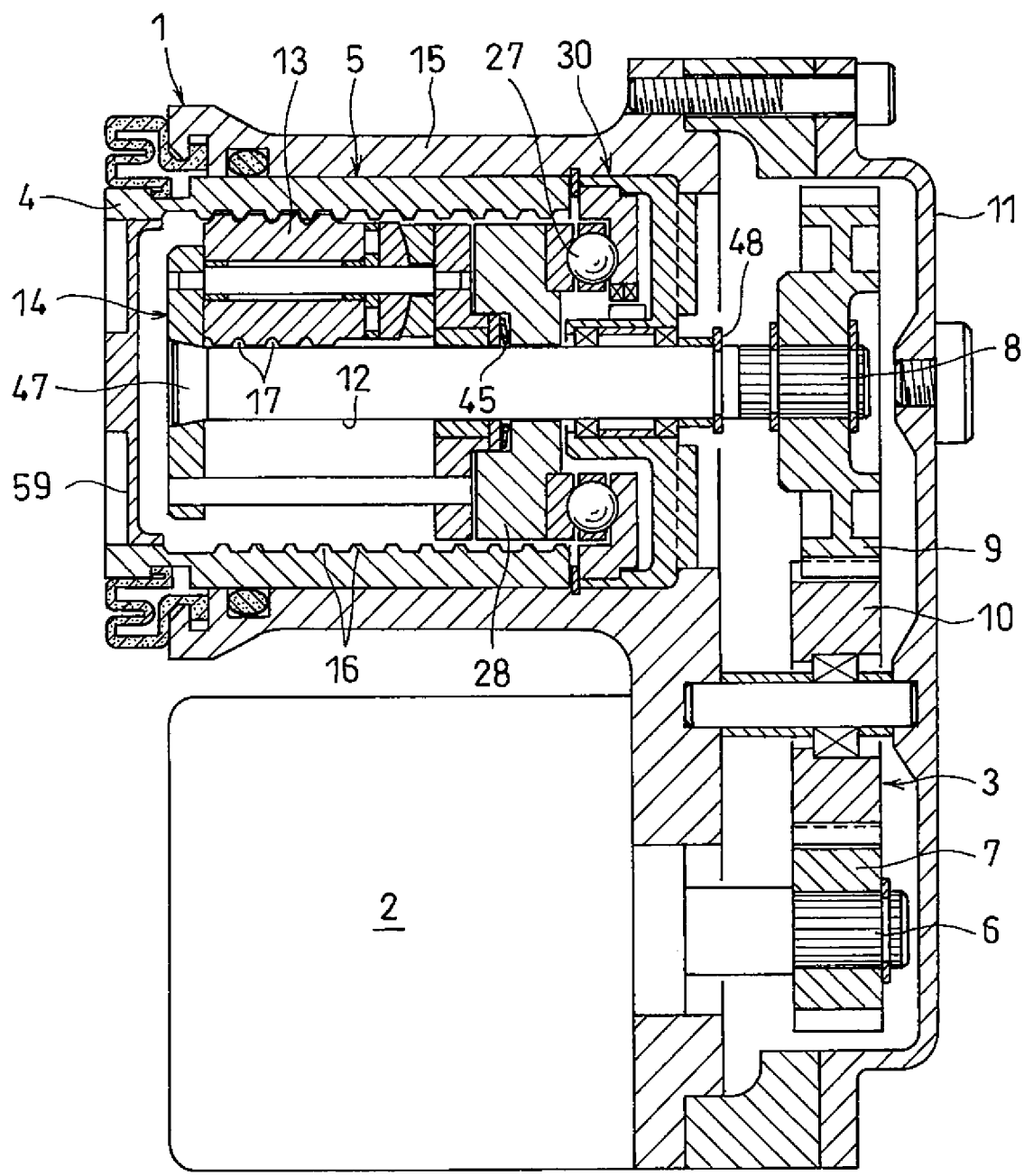
FIG. 1 is a sectional view of an electric linear motion actuator according to a first embodiment of a first aspect of the present invention.

Structure of the Electric Linear Motion Actuator According to the First Embodiment of the First Aspect of the Present Invention As illustrated in FIG. 1, this electric linear motion actuator 1 includes an electric motor 2; a reduction gear train 3 configured to reduce the rotational speed of the electric motor 2; and a planetary roller screw type linear motion mechanism 5 configured to convert the rotation transmitted from the electric motor 2 through the reduction gear train 3, into a linear motion of an outer ring member 4.

The reduction gear train 3 includes an input gear 7 fixed to the motor shaft 6 of the electric motor 2; an output gear 9 fixed to a rotary shaft 8 of the planetary roller screw type linear motion mechanism 5; an intermediate gear 10 through which rotation is transmitted from the input gear 7 to the output gear 9; and a gear case 11 in which the gears 7, 9 and 10 are received. The respective gears 7, 9 and 10 have teeth different in number from each other. By transmitting the rotation input to the input gear 7 from the motor shaft 6 of the electric motor 2 to the intermediate gear 10, and then the output gear 9, the reduction gear train 3 reduces the rotation in speed, and outputs the rotation reduced in speed from the output gear 9 to the rotary shaft 8.

Figure 2:
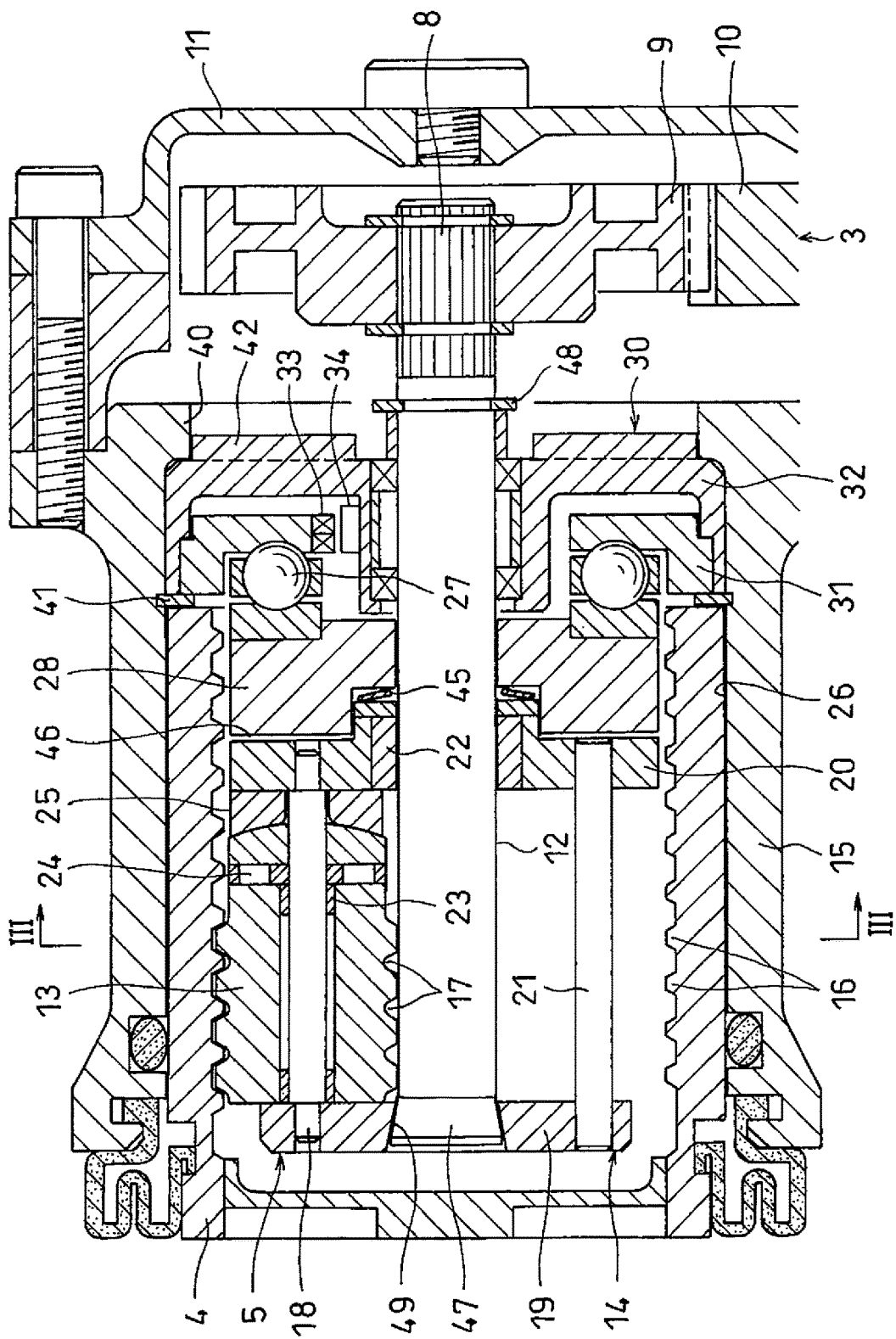
FIG. 2 is an enlarged sectional view illustrating a planetary roller screw type linear motion mechanism of FIG. 1 and its vicinity.
Figure 3:
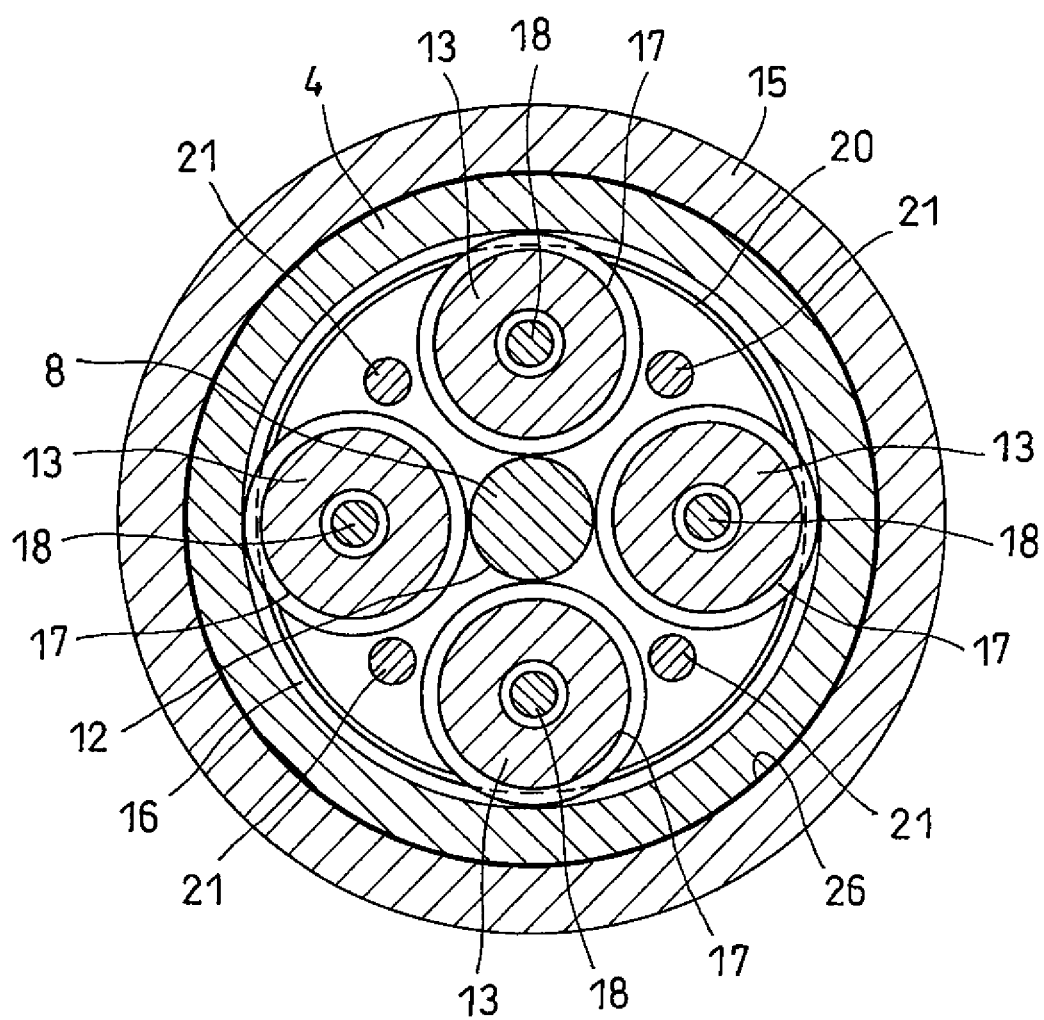
FIG. 3 is a sectional view taken along line III-III of FIG. 2.

As illustrated in FIGS. 2 and 3, the planetary roller screw type linear motion mechanism 5 includes the above-mentioned rotary shaft 8, which has a cylindrical surface 12 on its outer periphery; a plurality of planetary rollers 13 in rolling contact with the cylindrical surface 12; a carrier 14 retaining the planetary rollers 13 such that the planetary rollers 13 can revolve around the rotary shaft 8 while rotating about their respective center axes; the above-mentioned outer ring member 4, which is a hollow tubular member surrounding the planetary rollers 13; and a housing 15 in which the outer ring member 4 is axially movably received. The planetary rollers 13 are circumferentially spaced apart from each other between the inner periphery of the outer ring member 4 and the outer periphery of the rotary shaft 8.

As used herein, "axial", "axially", and "axial direction" refer to the direction parallel to the rotary shaft 8; "axially forward" and "axially forward direction" refer to the direction in which the outer ring member 4 moves to protrude from the housing 15; "axially rearward" and "axially rearward direction" refer to the direction opposite to the axially forward direction, specifically, the direction in which the outer ring member 4 moves into the housing 15 so that its portion protruding from the housing 15 decreases; "circumferential", "circumferentially" and "circumferential direction" refer to the (circumferential) direction about the rotary shaft 8; and "radial", "radially" and "radial direction" refer to a direction orthogonal to the rotary shaft 8.

As illustrated in FIG. 2, the outer ring member 4 has, on its inner periphery, a helical rib 16 having a predetermined lead angle so as to extend obliquely with respect to the circumferential direction. Each planetary roller 13 has, in its outer periphery, a plurality of axially spaced apart circumferential grooves 17 in which the helical rib 16 is engaged. The interval between each axially adjacent pair of circumferential grooves 17 is equal in size to the pitch of the helical rib 16. Instead of the circumferential grooves 17, which have a 0 degree lead angle, each planetary roller 13 may have a helical groove different in lead angle from the helical rib 16.

As illustrated in FIGS. 2 and 3, the carrier 14 includes a plurality of support pins 18 supporting the respective planetary rollers 13 such that the planetary rollers 13 are rotatable about their respective center axes; an axially front disk 19 retaining the axially front ends of the support pins 18; an axially rear disk 20 retaining the axially rear ends of the support pins 18; and pillars 21 which extend between the respective circumferentially adjacent pairs of planetary rollers 13, and through which the axially front disk 19 and the axially rear disk 20 are fixedly coupled together so as to be unmovable relative to each other in the axial and circumferential directions.

As illustrated in FIG. 2, the axially front disk 19 and the axially rear disk 20 are annular disks through which the rotary shaft 8 extends. A sliding bearing 22 is mounted on the inner periphery of the axially rear disk 20, and is in sliding contact with the outer periphery of the rotary shaft 8.

Radial bearings 23 are mounted between the outer periphery of each support pin 18 and the inner periphery of the planetary roller 13, and support the planetary roller 13 so that the planetary roller 13 is rotatable about its center axis. A thrust bearing 24 is mounted between each planetary roller 13 and the axially rear disk 20, and axially supports the planetary roller 13 so that the planetary roller 13 is rotatable about its center axis. An aligning seat 25 is mounted between each thrust bearing 24 and the axially rear disk 21, and supports the corresponding planetary roller 13 through the thrust bearing 24 such that the planetary roller 13 is inclinable.

The outer ring member 4 is axially slidably supported by the inner surface of a receiving hole 26 formed in the housing 15. A load sensor 30 is fixedly mounted inside the housing 15 at a position away from the carrier 14 in the axially rearward direction. A thrust bearing 27 is mounted between the carrier 14 and the load sensor 30, and supports the carrier 14 from its axially rear side such that the carrier 14 can revolve around the rotary shaft 8. A spacer 28 is mounted between the carrier 14 and the thrust bearing 27 such that an axial load is transmitted from the carrier 14 to the thrust bearing 27 through the spacer 28.

The load sensor 30 includes a flange member 31 configured to be deflected by the axially rearward reaction force which the outer ring member 4 receives when the outer ring member 4 applies an axially forward load to an object; a circular annular plate-shaped support member 32 disposed axially rearward of the flange member 31; a magnetic target 33 configured to generate a magnetic field; and a magnetism detector 34 configured to detect the magnetic field generated by the magnetic target 33.

Figure 4:
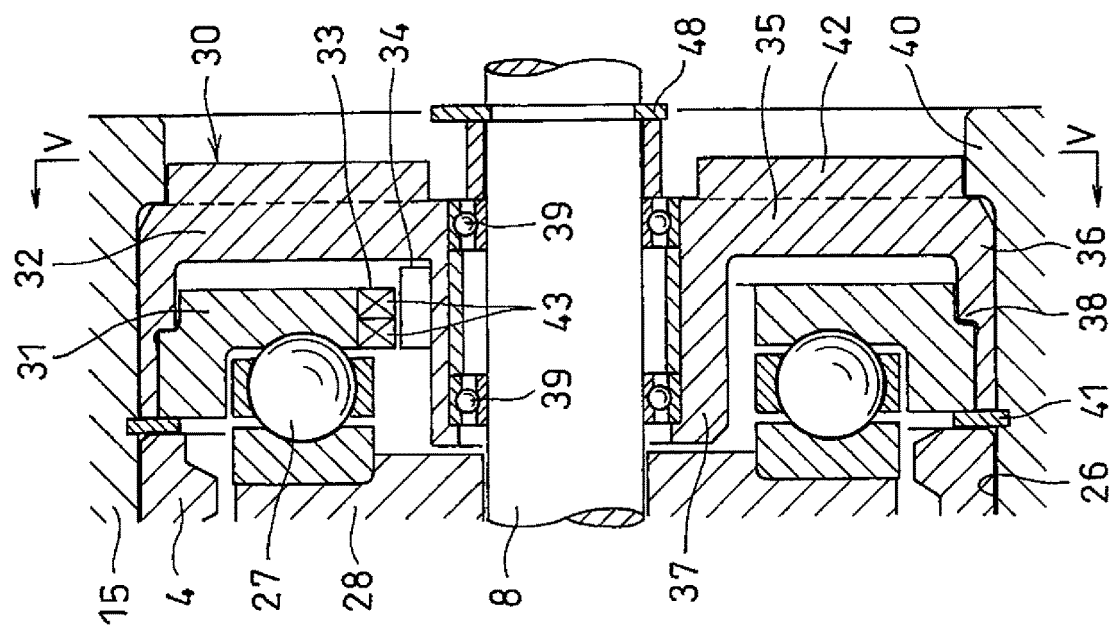
FIG. 4 is an enlarged sectional view illustrating a load sensor of FIG. 2 and its vicinity.

As illustrated in FIG. 4, the support member 32 includes a circular annular plate 35 disposed axially rearward of the flange member 31 so as to be opposed to the flange member 31; an outer tubular portion 36 connected to the radially outer edge of the circular annular plate 35; and an inner tubular portion 37 connected to the radially inner edge of the circular annular plate 35. The outer tubular portion 36 extends from the circular annular plate 35 in the axially forward direction such that the flange member 31 is received in the tubular portion 36. The outer tubular portion 36 has, on its inner periphery, a step 38 configured to restrict the axially rearward movement of the radially outer edge of the flange member 31. The support member 32 supports the radially outer edge of the flange member 31 from its axially rear side such that, when the axially rearward reaction force is applied to the flange member 31, the flange member 31 is deflected in the axially rearward direction about the radially outer edge of the flange member 31.

The inner tubular portion 37 of the support member 32 extends from the circular annular plate 35 in the axially forward direction so as to be radially opposed to the inner periphery of the flange member 31. Radial bearings 39 are mounted to the inner periphery of the inner tubular portion 37 so as to rotatably support the rotary shaft 8. The radial bearings 39 may be, for example, sintered sliding bearings or deep groove ball bearings.

The housing 15 includes a support protrusion 40 disposed axially rearward of the portion of the inner periphery of the housing 15 on which the support member 32 is fitted, the support protrusion 40 protruding in the radially inward direction, and extending in the circumferential direction. The support protrusion 40 is in contact with the axially rear end of the outer tubular portion 36 of the support member 32, thereby restricting the axially rearward movement of the support member 32. A snap ring 41 is mounted to the inner periphery of the housing 15, and restricts the axially forward movement of the support member 32.

Figure 5:
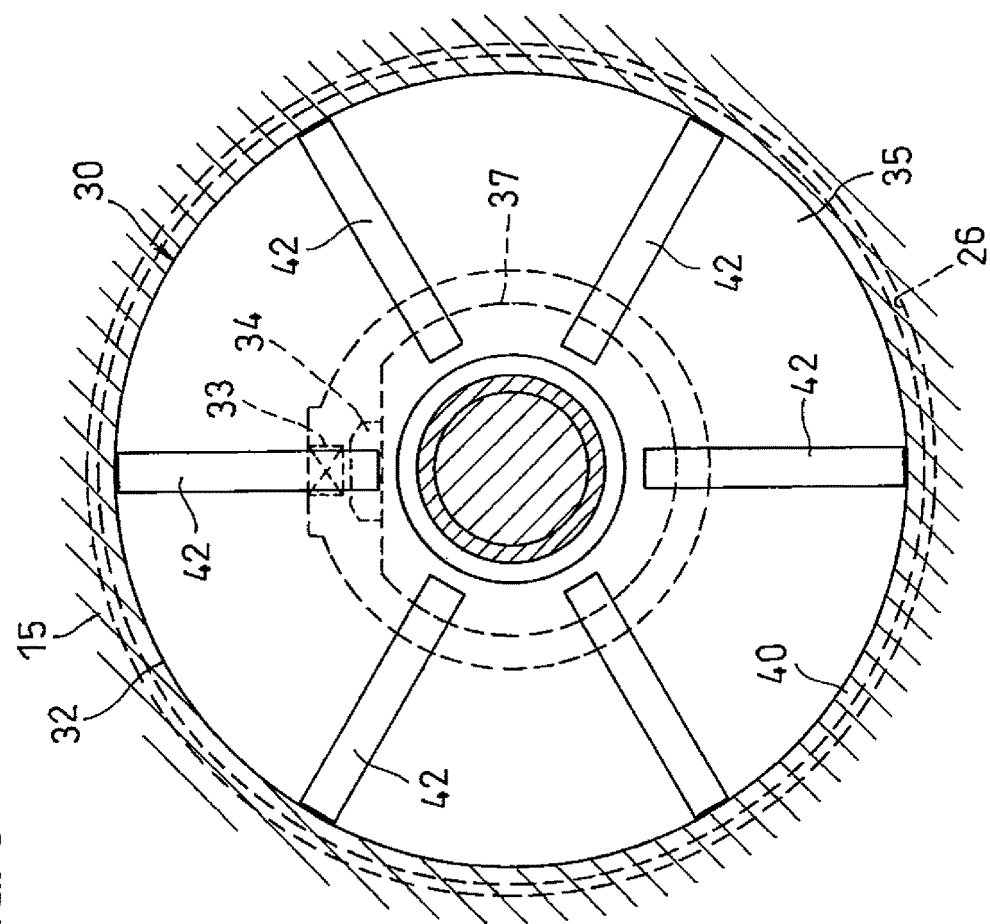
FIG. 5 is a sectional view taken along line V-V of FIG. 4.

As illustrated in FIG. 5, the circular annular plate 35 includes, on the axially rear side surface thereof, a plurality of radially inwardly extending ribs 42 circumferentially spaced apart from each other. The radially outer ends of the ribs 42 are radially opposed to the radially inner edge of the support protrusion 40 (see FIG. 4).

As illustrated in FIG. 4, the magnetic target 33 is fixed to the inner periphery of the flange member 31, and the magnetism detector 34 is fixed to the outer periphery of the inner tubular portion 37 such that the magnetic target 33 and the magnetism detector 34 are displaced from each other according to the degree of deflection of the flange member 31. The magnetic target 33 is constituted by two permanent magnets 43 magnetized in the radial direction, and arranged such that the north pole of one of the two permanent magnets 43 is axially adjacent to the south pole of the other permanent magnet 43. The magnetism detector 34 is disposed so as to be radially opposed to the magnetic target 33, in the vicinity of the boundary between the adjacent magnetic poles of the two permanent magnets 43. The magnetism detector 34 may be, for example, a Hall IC.

The load sensor 30 is configured such that, when the axially rearward load is input to the flange member 31, the flange member 31 is deflected in the axially rearward direction about the radially outer edge of the flange member 31; the magnetic target 33 and the magnetism detector 34 are axially displaced from each other by the deflection of the flange member 31; and the output signal from the magnetism detector 34 changes according to the degree of relative displacement between the magnetic target 33 and the magnetism detector 34. Therefore, by grasping, beforehand, the relationship between the magnitude of the axial load applied to the flange member 31, and the output signal from the magnetism detector 34, the load sensor 30 can detect the magnitude of the axial load applied to the flange member 31 based on the output signal from the magnetism detector 34.

As illustrated in FIG. 2, an elastic member 45 is mounted between the carrier 14 and the spacer 28 so as to bias the carrier 14 in the axially forward direction with respect to the rotary shaft 8, and an axial gap 46 is defined between the carrier 14 and the spacer 28 so as to allow the axial movement of the carrier 14.

The elastic member 45 is an annular member through which the rotary shaft 8 extends. The elastic member 45 is, for example, a disk spring, but a wave spring or a coil spring may be used instead. The elastic member 45 is mounted such that, while no axially forward load is being applied to the object by the outer ring member 4 (i.e., while no axially rearward reaction force is being applied to the carrier 14), the elastic member 45 is already axially compressed, thereby applying a preload to the carrier 14 from the elastic member 45.

While, in this embodiment, the elastic member 45 is mounted between the carrier 14 and the spacer 28, the elastic member 45 may be mounted to another portion of the actuator 1 between the carrier 14 and the load sensor 30, for example, may be mounted between the spacer 28 and the thrust bearing 27, or between the thrust bearing 27 and the load sensor 30. Alternatively, by constituting the spacer 28 with two divided members axially movable relative to each other, the elastic member 45 may be mounted between the two divided members.

The rotary shaft 8 is provided, on its outer periphery, with a frictionally coupling surface 47 (front engagement portion) for restricting the range within which the carrier 14 is movable in the axially forward direction relative to the rotary shaft 8; and a snap ring 48 (rear engagement portion) for restricting the range within which the carrier 14 is movable in the axially rearward direction relative to the rotary shaft 8.

The frictionally coupling surface 47 comprises a tapered surface whose diameter increases toward the axially front side thereof at an inclination angle (angle relative to the axial direction) of 5 to 20 degree.

The axially front disk 19 of the carrier 14 has, on its inner periphery, a tapered inner peripheral surface 49 opposed to the frictionally coupling surface 47 on the outer periphery of the rotary shaft 8. The tapered inner peripheral surface 49 has an inclination angle (angle relative to the axial direction) of 5 to 20 degree. The tapered inner peripheral surface 49 is preferably equal in inclination angle to the frictionally coupling surface 47.

(Operation of the Electric Linear Motion Actuator)

It is now described how the above-described electric linear motion actuator 1 operates.

When the motor shaft 6 of the electric motor 2 illustrated in FIG. 1 rotates, the rotation of the motor shaft 6 is transmitted to the rotary shaft 8 of the planetary roller screw type linear motion mechanism 5, after reduced in speed by the reduction gear train 3.

Figure 6:
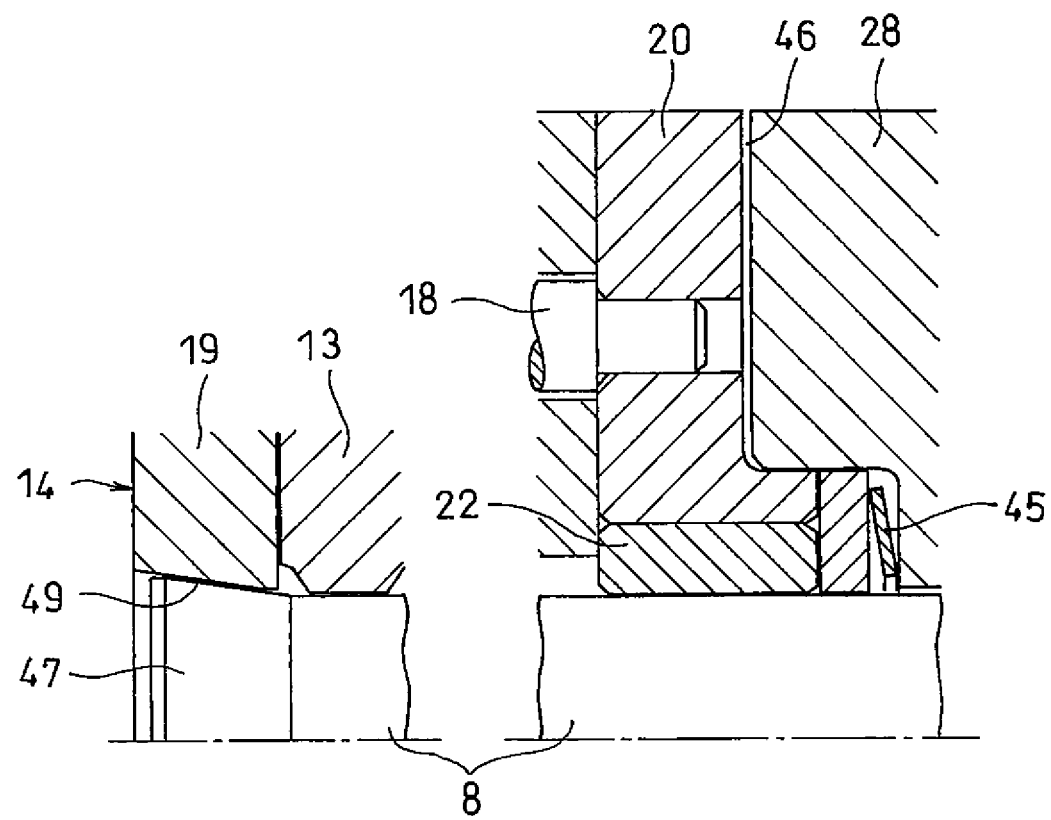
FIG. 6 is a view illustrating the state in which no axially rearward load is being applied to a carrier of FIG. 2, and thus a tapered inner peripheral surface of the carrier and a frictionally coupling surface of a rotary shaft are frictionally coupled together.

While no axially forward load is being applied to the object by the outer ring member 4 illustrated in FIG. 2 (i.e., while no axially rearward reaction force is being applied to the carrier 14), the elastic member 45 presses the tapered inner peripheral surface 49 of the carrier 14 against the frictionally coupling surface 47 on the outer periphery of the rotary shaft 8, thereby applying a preload to the frictionally coupling surface 47. Due to the preload (axial load) applied to the frictionally coupling surface 47 by the elastic member 45 through the carrier 14, the rotary shaft 8 is biased in the axially forward direction. As a result thereof, an axially forward load is applied to the support member 32 through the snap ring 48. In this state, as illustrated in FIG. 6, the tapered inner peripheral surface 49 and the frictionally coupling surface 47 are frictionally coupled together, and the relative rotation between the carrier 14 and the rotary shaft 8 is restricted by the frictional force between the tapered inner peripheral surface 49 and the frictionally coupling surface 47. Therefore, in this state, the rotation of the rotary shaft 8 illustrated in FIG. 2 causes the carrier 14 to rotate together with the rotary shaft 8, so that the planetary rollers 13 revolve around the rotary shaft 8 without rotating about their respective center axes. As a result thereof, since the helical rib 16 on the inner periphery of the outer ring member 4 is engaged in the circumferential grooves 17 in the outer peripheries of the planetary rollers 13, the planetary rollers 13 and the outer ring member 4 axially move relative to each other. However, since the axial movement of the planetary rollers 13 is restricted along with the carrier 14, the planetary rollers 13 do not axially move relative to the housing 15, and the outer ring member 4 axially moves relative to the housing 15.

At this time, since the carrier 14 rotates together with the rotary shaft 8, and the planetary rollers 13 revolve around the rotary shaft 8 without rotating about their respective center axes, the revolution speed of the planetary rollers 13 is relatively fast, compared with when they are revolving around the rotary shaft 8 while rotating about their respective center axes. Therefore, the outer ring member 4 axially moves at a higher speed, and thus the load conversion rate is low.

When the axially forward load starts to be applied to the object by the outer ring member 4, an axially rearward reaction force acts on the outer ring member 4 and is transmitted to the carrier 14 through the planetary rollers 13, thereby reducing the axial load applied to the frictionally coupling surface 47 through the carrier 14. This in turn reduces the magnitude of the axially forward load applied to the support member 32 through the snap ring 48.

Figure 7:
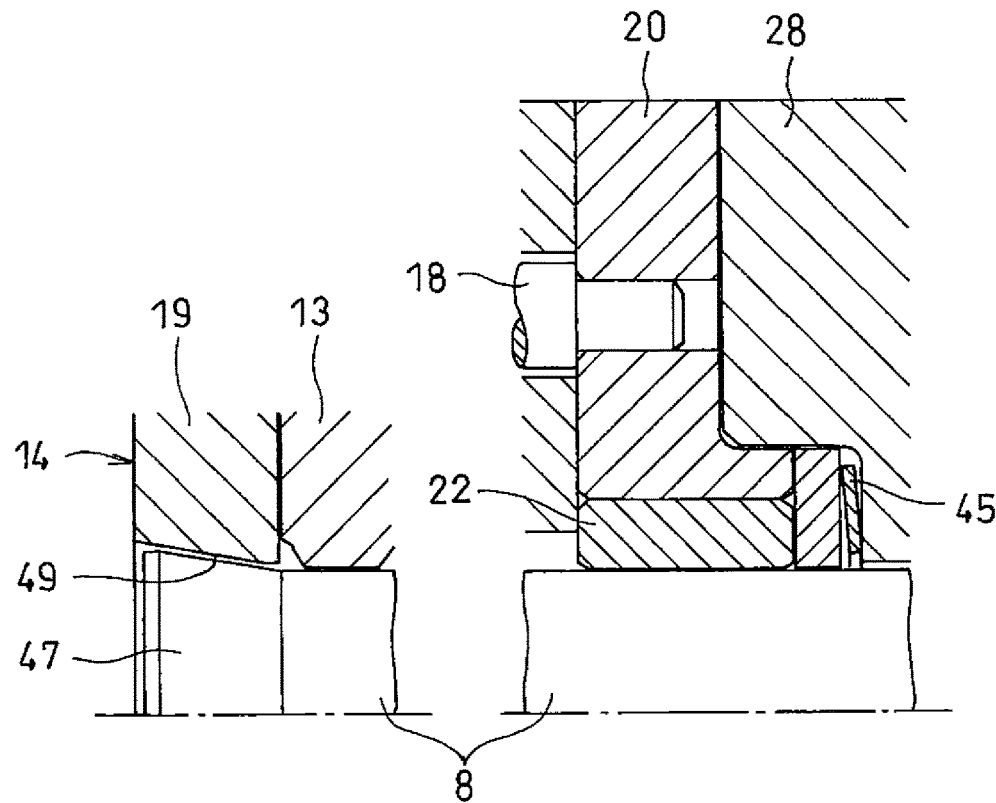
FIG. 7 is a view illustrating the state in which an axially rearward load is being applied to the carrier of FIG. 2, and thus the tapered inner peripheral surface of the carrier and the frictionally coupling surface of the rotary shaft are uncoupled from each other.

When the axially forward load applied to the object by the outer ring member 4 further increases thereafter, and the axially rearward reaction force which the outer ring member 4 receives from the object exceeds the preload by the elastic member 45, as illustrated in FIG. 7, the amount by which the elastic member 45 is axially compressed increases, and the carrier 14 moves in the axially rearward direction relative to the rotary shaft 8 within the range of the axial gap 46 between the carrier 14 and the spacer 28. As a result thereof, the tapered inner peripheral surface 49 and the frictionally coupling surface 47 are uncoupled from each other, thereby allowing the carrier 14 and the rotary shaft 8 to rotate relative to each other. The axial gap 46 between the carrier 14 and the spacer 28 is minute such that the distance by which the carrier 14 is movable in the axially rearward direction relative to the rotary shaft 8 is extremely small/short (e.g., 0.5 mm or less).

When the carrier 14 becomes rotatable relative to the planetary rollers 13, since the planetary rollers 13 illustrated in FIG. 2 revolve around the rotary shaft 8 while rotating about their respective center axes, the revolution speed of the planetary rollers 13 is relatively slow compared with when they are revolving around the rotary shaft 8 without rotating about their respective axes. Therefore, the outer ring member 4 axially moves at a lower speed, and thus the load conversion rate is high.

As described above, the electric linear motion actuator 1 is configured such that the load conversion rate can be switched according to the magnitude of the axial load applied to the object by the outer ring member 4. By using this electric linear motion actuator 1 in an electromechanical brake system, as describe below, it is possible to improve the response of the brake, and simultaneously to increase the pressing force of the brake.

When the axially forward load is applied to the object by the outer ring member 4 illustrated in FIG. 2, an axially rearward reaction force is applied to the outer ring member 4, and is received by the load sensor 30 through the planetary rollers 13, the thrust bearings 24, the carrier 14, the spacer 28, and the thrust bearing 27. Due to this reaction force, the flange member 31 of the load sensor 30 is deflected in the axially rearward direction, so that the magnetic target 33 and the magnetism detector 34 are displaced from each other. Since the output signal from the magnetism detector 34 changes according to the degree of relative displacement between the magnetic target 33 and the magnetism detector 34, the load sensor 30 can detect the magnitude of the axial load applied to the load sensor 30 based on the output signal from the magnetism detector 34.

When the magnitude of the axially forward load applied to the object from the outer ring member 4 monotonically increases, the axial load applied to the frictionally coupling surface 47 through the carrier 14 decreases, so that the axially forward load applied from the snap ring 48 also decreases. Therefore, before the axially rearward reaction force which the outer ring member 4 receives from the object exceeds the preload by the elastic member 45, the reaction force value detected by the load sensor 30 could also decrease.

Figure 8:
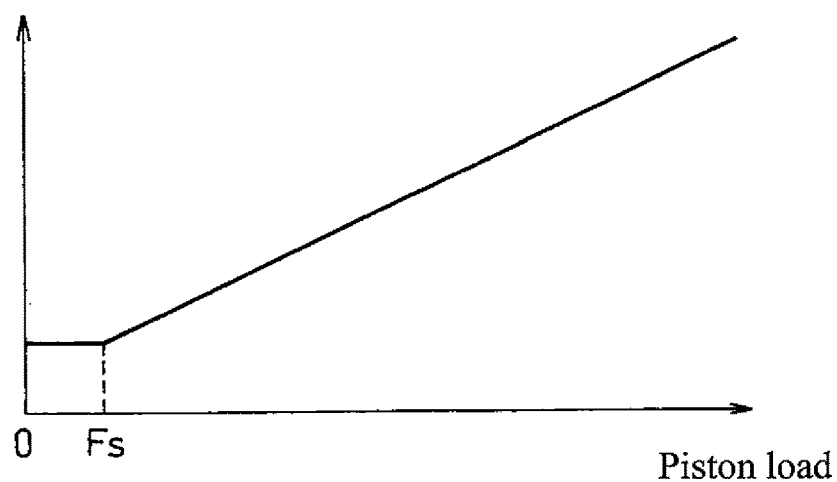
FIG. 8 is a graph illustrating the relationship between the magnitude of the axially forward load applied to an object from an outer ring member, and the output from the load sensor in the electric linear motion actuator according to each of the first and second embodiments of the first aspect of the present invention.

However, in this embodiment, since the ribs 42 on the axially rear side surface of the support member 32 increase the rigidity of the support member 32, the support member 32 is not deflected by the axially forward load applied to the support member 32 through the snap ring 48. Therefore, even when the magnitude of the axially forward load applied through the snap ring 48 changes, such a change will not affect the reaction force value detected by the load sensor 30. In other words, as illustrated in FIG. 8, before the axially rearward reaction force which the outer ring member 4 receives from the object exceeds the preload by the elastic member 45, the reaction force value detected by the load sensor 30 does not decrease. Therefore, the load sensor 30 can stably detect the axially rearward reaction force which the outer ring member 4 receives from the object when the outer ring member 4 applies the axially forward load to the object. $F_s$ in FIG. 8 indicates the magnitude of the preload applied to the carrier 14 from the elastic member 45 while no axially forward load is being applied to the object by the outer ring member 4.

(Structure of the Electromechanical Brake System in which the Electric Linear Motion Actuator 1 is Used)

Figure 12:
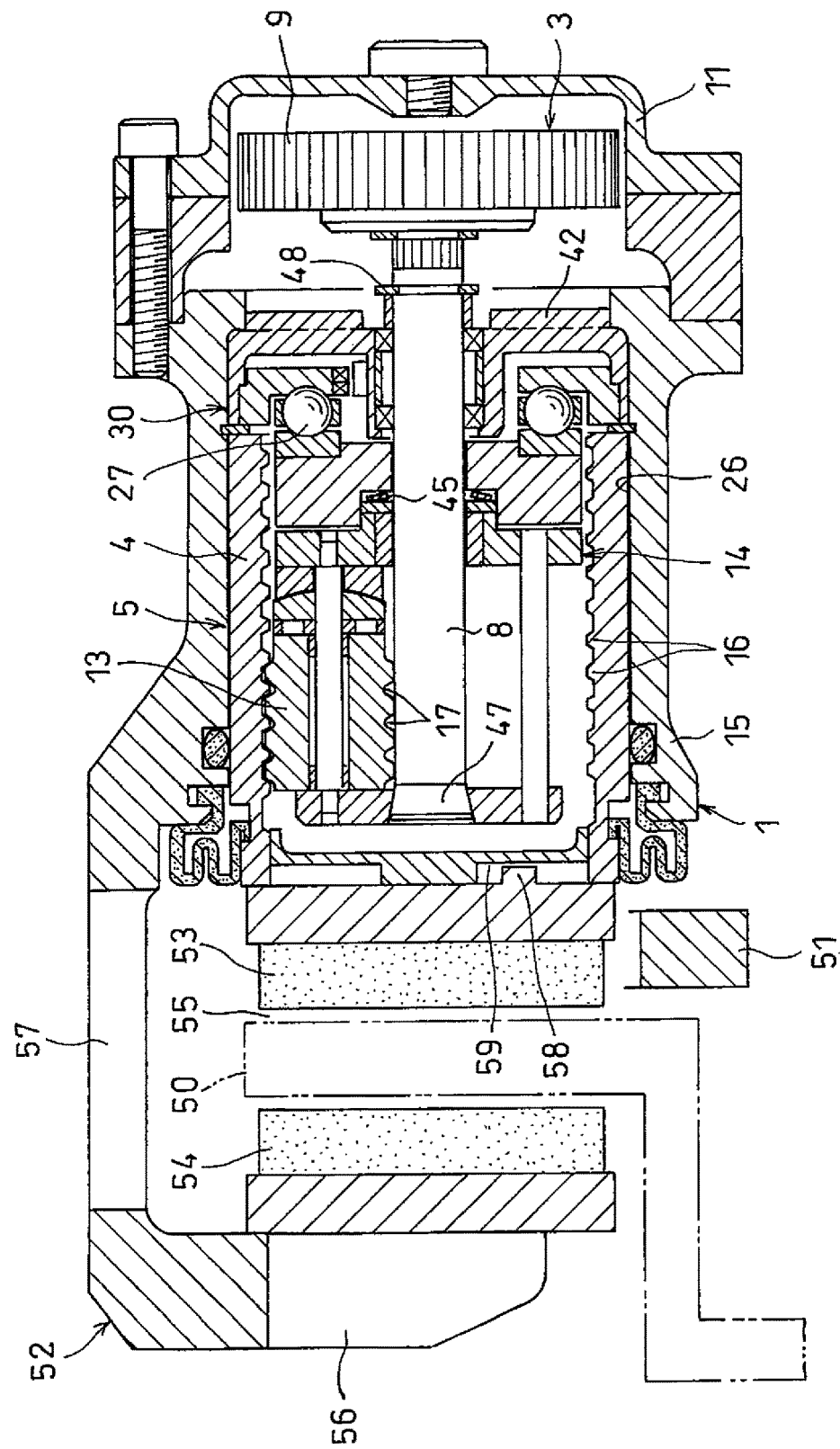
FIG. 12 is a sectional view of an electromechanical brake system in which the electric linear motion actuator of FIG. 1 is used.
Figure 13:
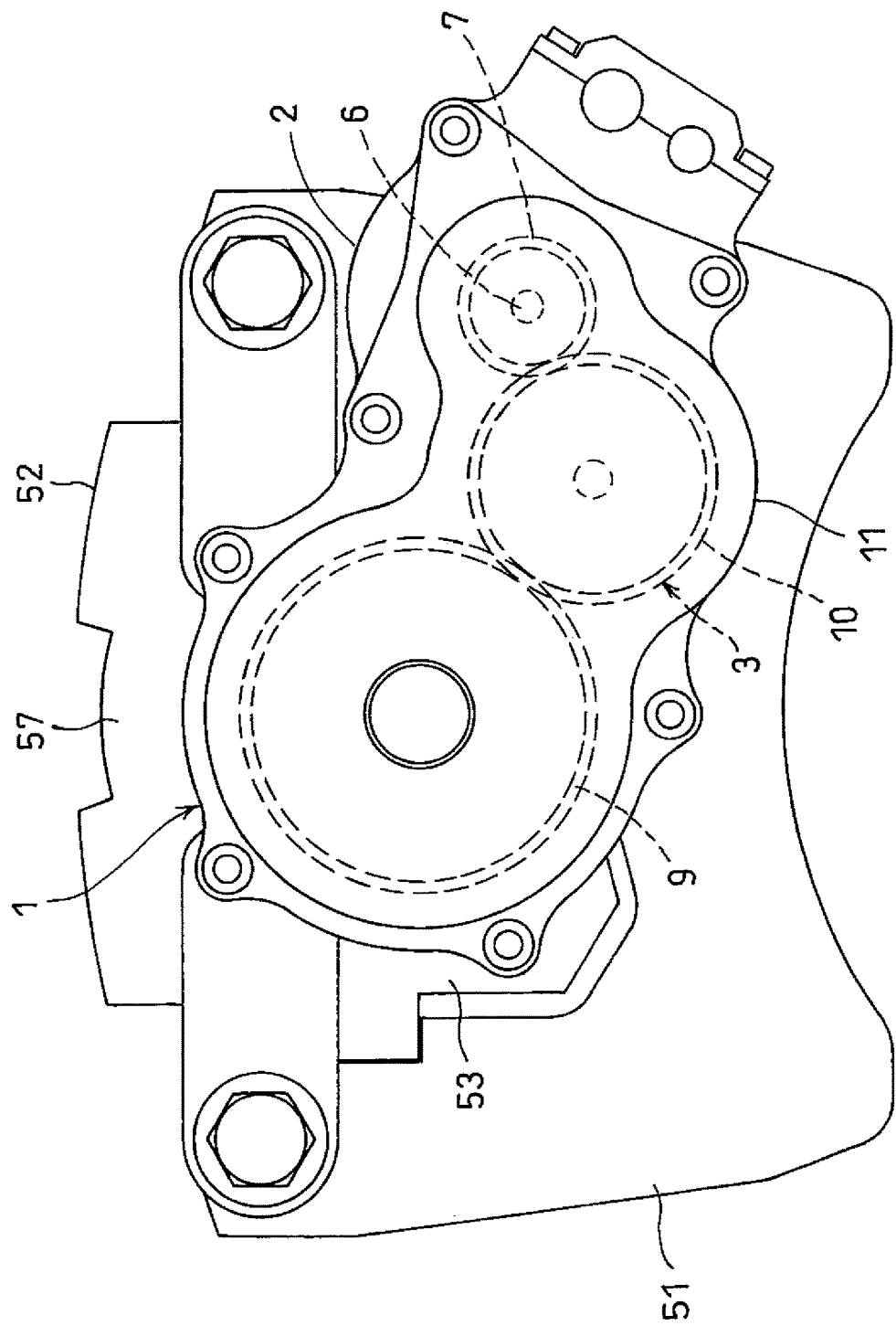
FIG. 13 is a view of the electromechanical brake system of FIG. 12, when seen from the inboard side.
Figure 14:
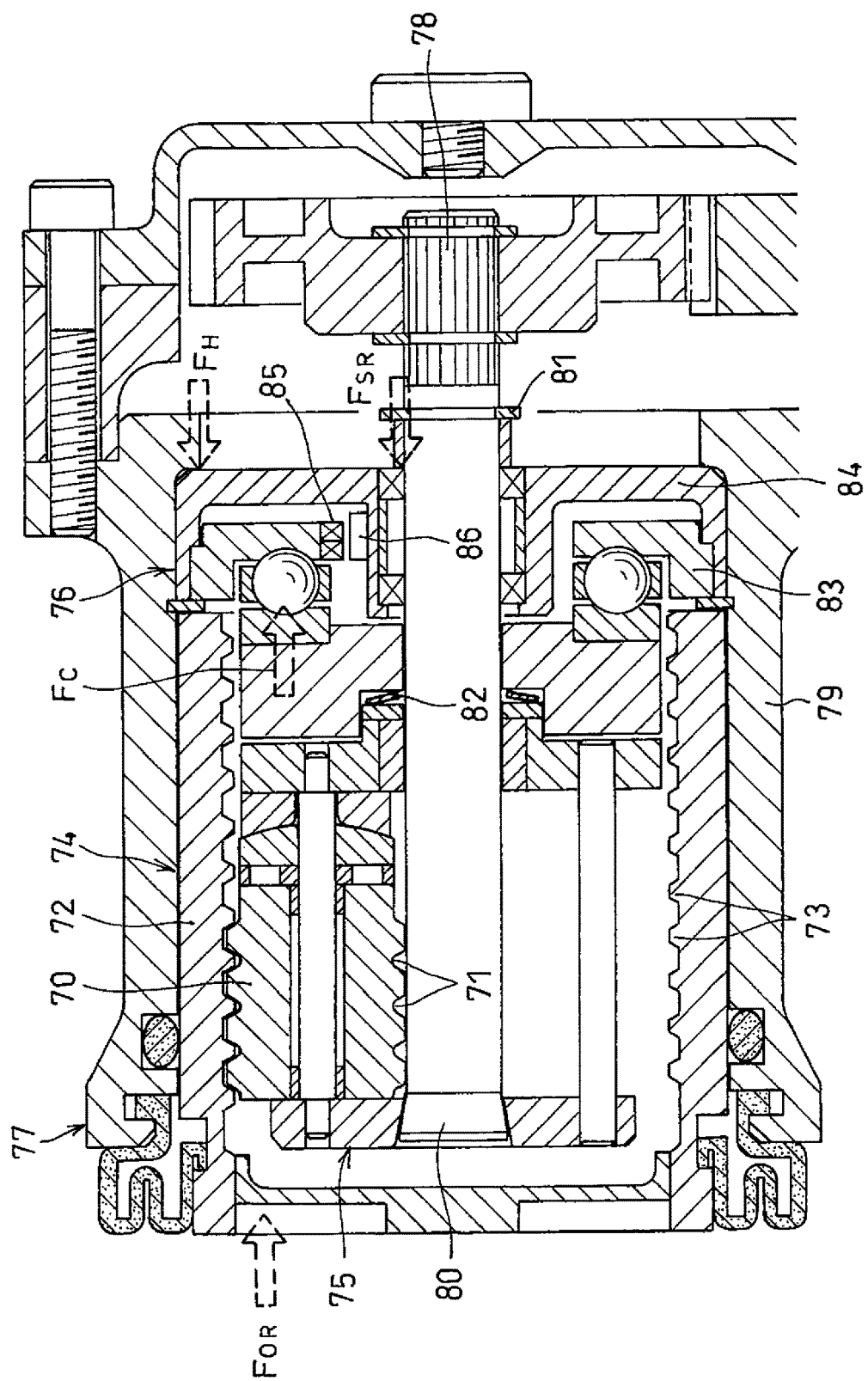
FIG. 14 is a sectional view of an electric linear motion actuator illustrated as a comparative example.
Figure 15:
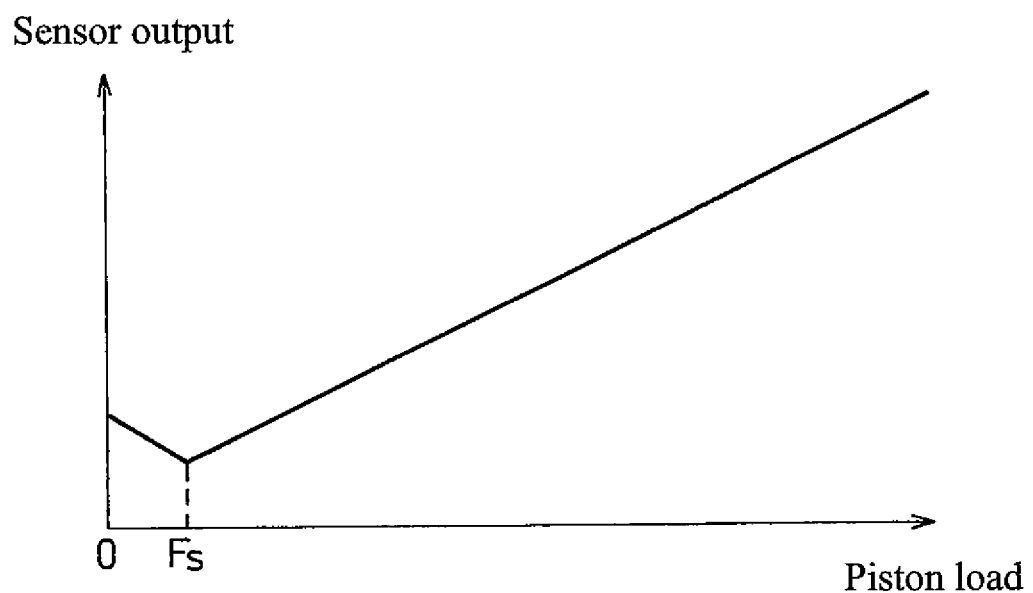
FIG. 15 is a graph illustrating the relationship between the magnitude of the axially forward load applied to the object from the outer ring member, and the output from the load sensor in the electric linear motion actuator of FIG. 14.

FIGS. 12 and 13 illustrate such an electromechanical brake system. This electromechanical brake system includes a brake disk 50 configured to rotate together with a vehicle wheel (not shown); a mounting bracket 51 fixed to the vehicle body so as to be axially unmovable relative to the brake disk 50; a caliper body 52 supported by the mounting bracket 51 so as to be slidable in the axial direction of the brake disk 50 relative to the mounting bracket 51; an inboard brake pad 53 and an outboard brake pad 54 which are opposed to the respective axial sides of the brake disk 50; and the electric linear motion actuator 1, which is arranged to linearly drive the inboard brake pad 53. A minute clearance 55 is defined between the inboard brake pad 53 and the brake disk 50. The inboard and outboard brake pads 53 and 54 are retained by the mounting bracket 51 so as to be axially movable and circumferentially unmovable.

The caliper body 52 includes a claw portion 56 axially opposed to the back of the outboard brake pad 54; and an outer shell portion 57 opposed to the radially outer portion of the brake disk 50. In the example shown, the outer shell portion 57 of the caliper body 52 is integral with the housing 15 of the electric linear motion actuator 1, but the outer shell portion 57 of the caliper body 52 and the housing 15 of the electric linear motion actuator 1 may be formed separately from each other, and fixedly coupled together, e.g., by bolts. The outer ring member 4 is attached to the back side of the inboard brake pad 53 so that the inboard brake pad 53 is movable together with the outer ring member 4 when the outer ring member 4 moves.

The outer ring member 4 includes, in its end close to the brake disk 50, an engagement recess 59 in which an engagement protrusion 58 formed on the back side of the inboard brake pad 53 is engaged so that the outer ring member 4 is rotationally fixed.

(Operation of the Electromechanical Brake System)

It is now described how the above-described electromechanical brake system operates.

To apply the brake, the outer ring member 4 of the electric linear motion actuator 1 is moved in the axially forward direction to move the inboard brake pad 53 in the axially forward direction. Since, as illustrated in FIG. 6, the carrier 14 is frictionally coupled to the frictionally coupling surface 47 of the rotary shaft 8 until the inboard brake pad 53 comes into contact with the brake disk 50, the outer ring member 4 illustrated in FIG. 12 axially moves at a relatively high speed until the inboard brake pad 53 comes into contact with the brake disk 50. Therefore, it is possible to bring the inboard brake pad 53 into contact with the brake disk 50 quickly, and thus to improve the response of the brake.

When the inboard brake pad 53 comes into contact with the brake disk 50 thereafter, and applies the axial load to the brake disk 50, as illustrated in FIG. 7, the carrier 14 moves in the axially rearward direction relative to the rotary shaft 8, and thus the carrier 14 and the frictionally coupling surface 47 of the rotary shaft 8 are uncoupled from each other. As a result thereof, the axial moving speed of the outer ring member 4 illustrated in FIG. 12 decreases, and the load conversion rate increases, thereby generating a large axial load. It is thus possible to increase the force with which the inboard brake pad 53 presses the brake disk 50.

As described above, by using the electric linear motion actuator 1 in an electromechanical brake system, it is possible to improve the response of the brake, and simultaneously to increase the force with which the inboard brake pad 53 presses the brake disk 50. Also, even while the force with which the inboard brake pad 53 presses the brake disk 50 is small, it is possible to stably control the pressing force of the inboard brake pad 53 based on the output from the load sensor 30.

Second Embodiment

Figure 9:
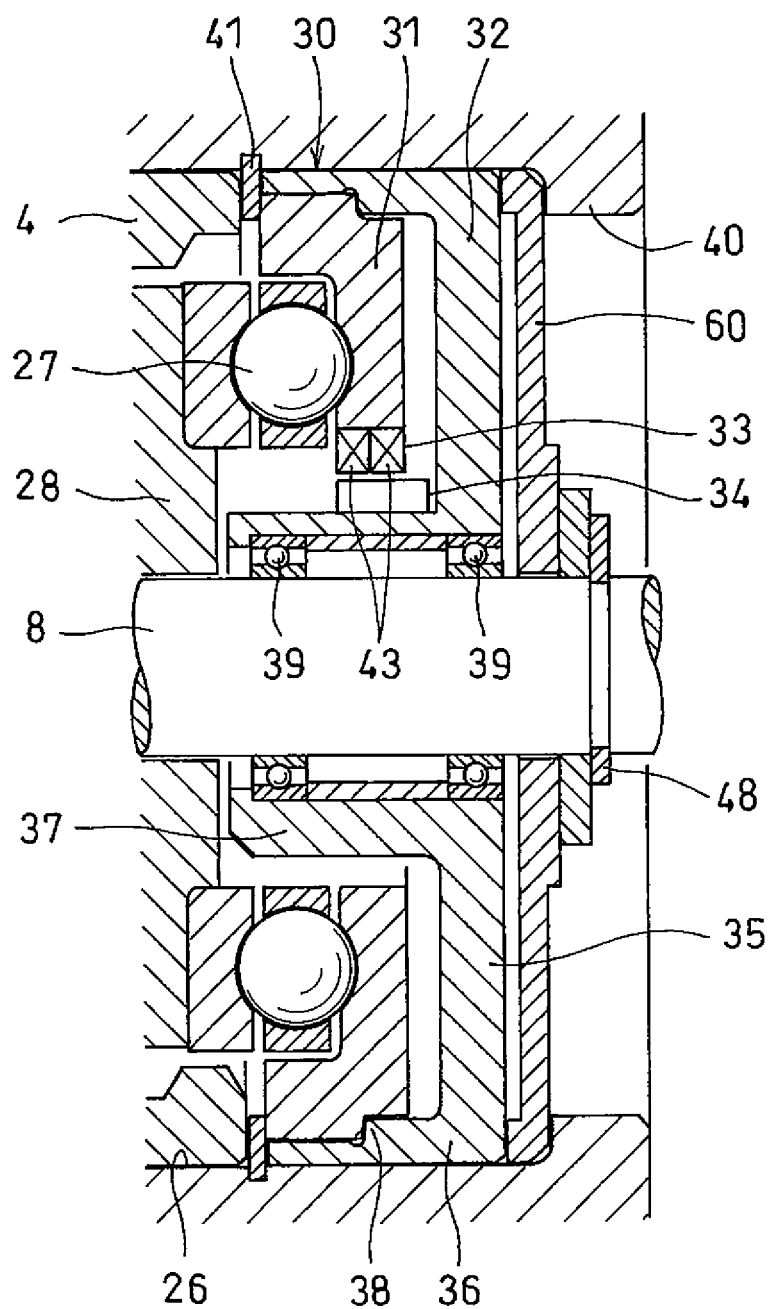
FIG. 9 is an enlarged sectional view illustrating the load sensor of the electric linear motion actuator according to the second embodiment of the first aspect of the present invention, and the vicinity of the load sensor.

FIG. 9 illustrates an electric linear motion actuator 1 according to the second embodiment of the first aspect of the present invention. Elements of the second embodiment corresponding to those of the first embodiment are denoted by the same reference numerals, and their description is omitted.

This electric linear motion actuator 1 includes a second support member 60 disposed between the support member 32 and the snap ring 48. The second support member 60 is a circular annular member through which the rotary shaft 8 extends. The radially inner edge of the second support member 60 is supported from its axially rear side by the snap ring 48, and the radially outer edge of the second support member 60 supports the radially outer edge of the support member 32 from its axially rear side. The support member 32 and the second support member 60 are in contact with each other only at their radially outer edges, and are out of contact with each other at the portions of the support members 32 and 60 located radially inwardly of their radially outer edges. By providing the second support member 60 between the snap ring 48 and the support member 32, the axially forward load transmitted through the snap ring 48 is applied to the radially outer edge of the support member 32. The radially outer edge of the second support member 60 is axially sandwiched between the support protrusion 40 and the snap ring 41. The second support member 60 may be integral with the housing 15.

Since the electric linear motion actuator 1 according to the second embodiment is configured such that the axially forward load transmitted through the snap ring 48 is applied to the radially outer edge of the support member 32, the support member 32 is not deflected by this axially forward load. Therefore, even when the magnitude of the axially forward load applied through the snap ring 48 changes due to the axially rearward reaction force which the outer ring member 4 receives from the object, such a change will not affect the reaction force value detected by the load sensor 30. In other words, as illustrated in FIG. 8, before the axially rearward reaction force which the outer ring member 4 receives from the object exceeds the preload by the elastic member 45, the reaction force value detected by the load sensor 30 does not decrease. Therefore, the load sensor 30 can stably detect the axially rearward reaction force which the outer ring member 4 receives from the object when outer ring member applies the axially forward load to the object.

Third Embodiment

Figure 10:
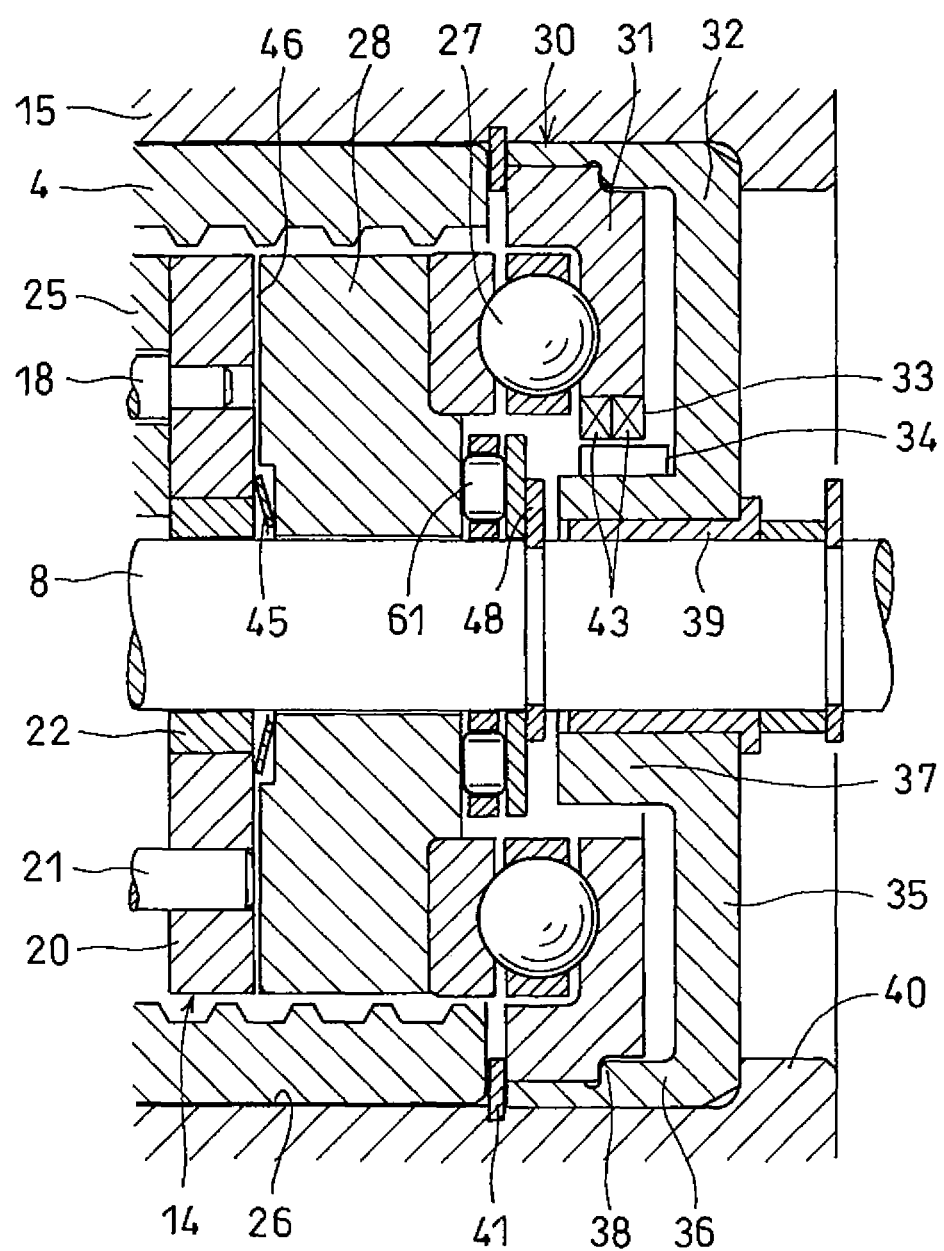
FIG. 10 is an enlarged sectional view illustrating a load sensor of an electric linear motion actuator according to a third embodiment of the first aspect of the present invention, and the vicinity of the load sensor.

FIG. 10 illustrates an electric linear motion actuator 1 according to the third embodiment of the first aspect of the present invention. Elements of the third embodiment corresponding to those of the first embodiment are denoted by the same reference numerals, and their description is omitted.

The electric linear motion actuator 1 of the third embodiment includes, on the portion of the outer periphery of the rotary shaft 8 between the carrier 14 and the load sensor 30, a snap ring 48 (rear engagement portion) for restricting the range within which the carrier 14 is movable in the axially rearward direction relative to the rotary shaft 8. The load sensor 30 is located axially rearward of the snap ring 48.

A first thrust bearing 27 is mounted between the spacer 28 and the flange member 31 so as to allow the carrier 14 and the load sensor 30 to rotate relative to each other, while transmitting an axial load between the carrier 14 and the load sensor 30. A second thrust bearing 61 is mounted between the spacer 28 and the snap ring 48 so as to allow the carrier 14 and the snap ring 48 to rotate relative to each other, while transmitting an axial load between the carrier 14 and the snap ring 48. The second thrust bearing 61 may be a sliding bearing. However, by using a rolling bearing as the second thrust bearing 61, it is possible to more effectively reduce the rotational resistance of the carrier 14.

Figure 11:
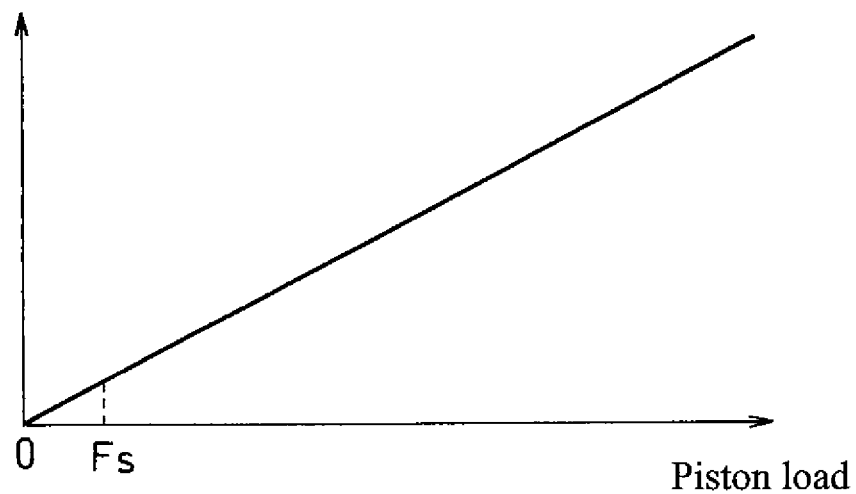
FIG. 11 is a graph illustrating the relationship between the magnitude of the axially forward load applied to the object from an outer ring member, and the output from the load sensor in the electric linear motion actuator according to the third embodiment of the first aspect of the present invention.

Since, in this embodiment, the load sensor 30 is disposed axially rearward of the snap ring 48, the axially forward load transmitted through the snap ring 48 is not applied to the load sensor 30. Therefore, even when the magnitude of the axially forward load through the snap ring 48 changes, such a change will not affect the reaction force value detected by the load sensor 30. In other words, as illustrated in FIG. 11, before the axially rearward reaction force which the outer ring member 4 receives from the object exceeds the preload by the elastic member 45, the reaction force value detected by the load sensor 30 does not decrease. Therefore, the load sensor 30 can stably detect the axially rearward reaction force which the outer ring member 4 receives from the object when the outer ring member 4 applies the axially forward load to the object.

Since, in this embodiment, the load sensor 30 is not located between the frictionally coupling surface 47 (front engagement portion) for restricting the range within which the carrier 14 is movable in the axially forward direction relative to the rotary shaft 8, and the snap ring 48 (rear engagement portion) for restricting the range within which the carrier 14 is movable in the axially rearward direction relative to the rotary shaft 8, the force of the elastic member 45 does not affect the load sensor 30 at all, so that, as illustrated in FIG. 11, a linear output can be obtained as the output from the load sensor 30.

The above-described embodiments are merely examples in every respect, and the present invention is not limited to the above embodiments. The scope of the present invention is indicated not by the above description but by the claims, and should be understood to include all modifications within the scope of the claims and the meaning equivalent to the scope of the claims.

An electric linear motion actuator 1 according to the embodiment of the second aspect of the present invention is now described with reference to FIGS. 16 to 20. Elements of this embodiment corresponding to those of the above embodiments are denoted by the same reference numerals, and their description is omitted.

Figure 17:
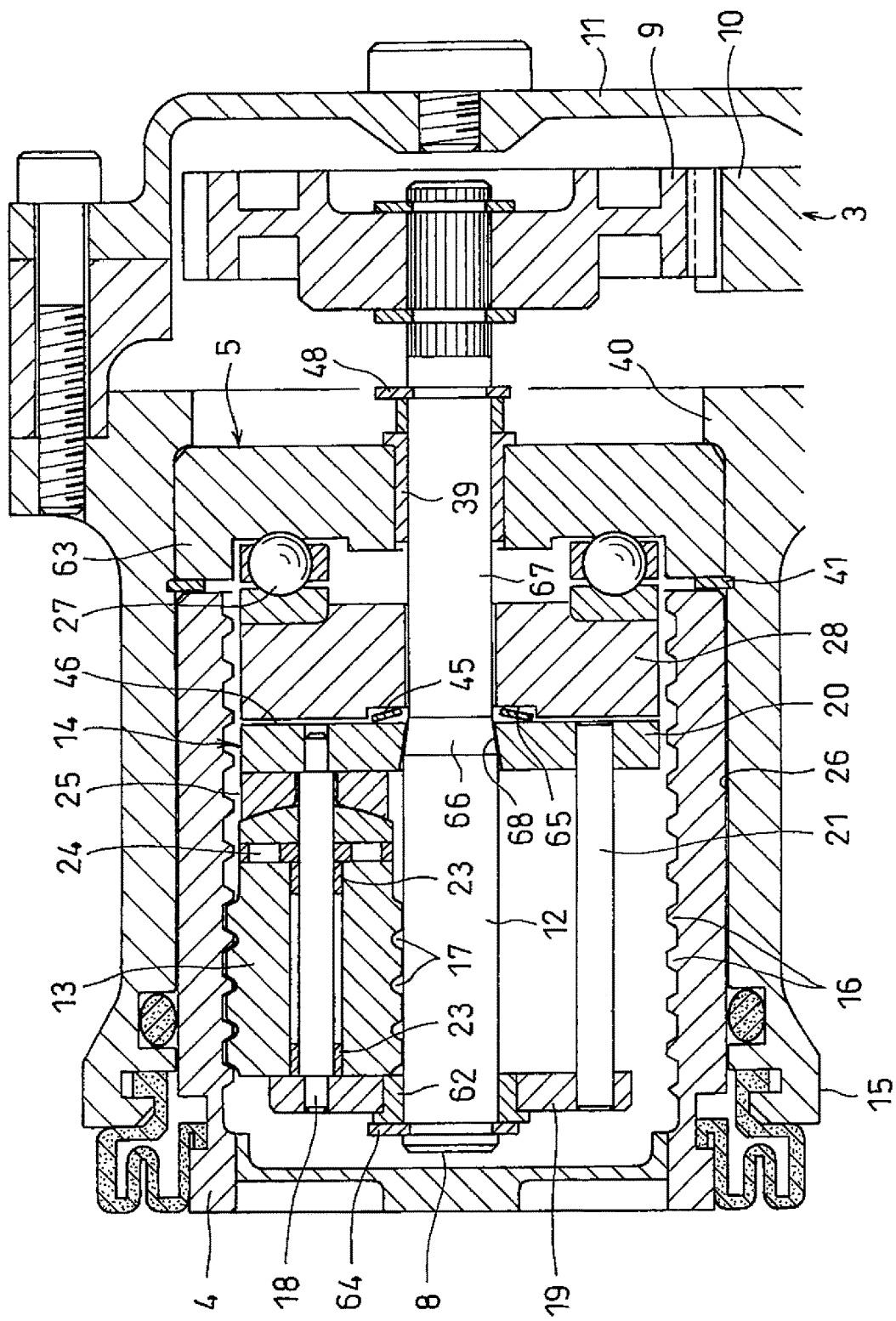
FIG. 17 is an enlarged sectional view illustrating the planetary roller screw type linear motion mechanism of FIG. 16 and its vicinity.

In this embodiment, as illustrated in FIG. 17, the axially front disk 19 and the axially rear disk 20 are annular disks through which the rotary shaft 8 extends. A sliding bearing 62 is mounted on the inner periphery of the axially front disk 19, and is in sliding contact with the outer periphery of the rotary shaft 8.

The outer ring member 4 is axially slidably supported by the inner surface of a receiving hole 26 formed in the housing 15. A bearing supporting member 63 is fixedly mounted inside the housing 15 at a position away from the outer ring member 4 in the axially rearward direction. The bearing supporting member 63 is a circular annular member through which the rotary shaft 8 extends. A radial bearing 39 is mounted on the inner periphery of the bearing supporting member 63 so as to rotatably support the rotary shaft 8. The radial bearing 39 may be, for example, a sintered sliding bearing or a deep groove ball bearing.

The axially rearward movement of the bearing supporting member 63 is restricted by a support protrusion 40 disposed on the inner periphery of the receiving hole 26, whereas the axially forward movement of the bearing supporting member 63 is restricted by a snap ring 41 mounted to the inner periphery of the receiving hole 26. The axially forward movement of the rotary shaft 8 relative to the bearing supporting member 63 is restricted by a snap ring 48 mounted on the outer periphery of the rotary shaft 8. The axially forward movement of the carrier 14 relative to the rotary shaft 8 is restricted by a snap ring 64 mounted on the outer periphery of the rotary shaft 8 at its axially front end.

The radial bearing 39 is mounted with its axially forward movement relative to the bearing supporting member 63 restricted. The snap ring 48 is disposed axially rearward of the radial bearing 39. The snap ring 64 is disposed axially forward of the sliding bearing 62.

A thrust bearing 27 is mounted between the carrier 14 and the bearing supporting member 63, and rotatably supports the carrier 14 from its axially rear side. A spacer 28 is mounted between the carrier 14 and the thrust bearing 27 such that an axial load is transmitted from the carrier 14 to the thrust bearing 27 through the spacer 28. An elastic member 45 is mounted between the carrier 14 and the spacer 28, and an axial gap 46 is defined between the carrier 14 and the spacer 28 so as to allow the axial movement of the carrier 14. Due to this, when an axially rearward load is applied to the carrier 14, this load axially compresses the elastic member 45, and moves the carrier 14 in the axially rearward direction relative to the rotary shaft 8 within the range of the axial gap 46 between the carrier 14 and the spacer 28. The axial gap 46 between the carrier 14 and the spacer 28 is minute such that the distance by which the carrier 14 is movable in the axially rearward direction relative to the rotary shaft 8 is extremely small/short (e.g., 0.5 mm or less).

The elastic member 45 is an annular member through which the rotary shaft 8 extends. The elastic member 45 is, for example, a disk spring, but a wave spring or a coil spring may be used instead. The elastic member 45 is mounted such that, while no axially rearward load is being applied to the carrier 14 at all, the elastic member 45 is already axially compressed, thereby biasing the carrier 14, and when an axially rearward load is applied to the carrier 14, the amount by which the elastic member 45 is axially compressed increases according to the magnitude of this load.

A receiving recess 65 is formed in the surface of the spacer 28 opposed to the carrier 14. A portion of the elastic member 45 is received in the receiving recess 65, and the remaining portion of the elastic member 65 is located out of the receiving recess 65.

While, in this embodiment, the elastic member 45 is mounted between the carrier 14 and the spacer 28, the elastic member 45 may be mounted to another portion of the actuator 1 between the carrier 14 and the bearing supporting member 63, for example, may be mounted between the spacer 28 and the thrust bearing 27, or between the thrust bearing 27 and the bearing supporting member 63. Alternatively, by constituting the spacer 28 with two divided members axially movable relative to each other, the elastic member 45 may be mounted between the two divided members.

The rotary shaft 8 has, on its outer periphery, a cylindrical surface 12 with which the planetary rollers 13 are in rolling contact; a tapered surface 66 (frictionally coupling portion) located axially rearward of the cylindrical surface 12; and a cylindrical surface 67 connected to the axially rear end of the tapered surface 66. The cylindrical surface 67 is supported by the radial bearing 39, and is smaller in diameter than the cylindrical surface 12.

Figure 18:
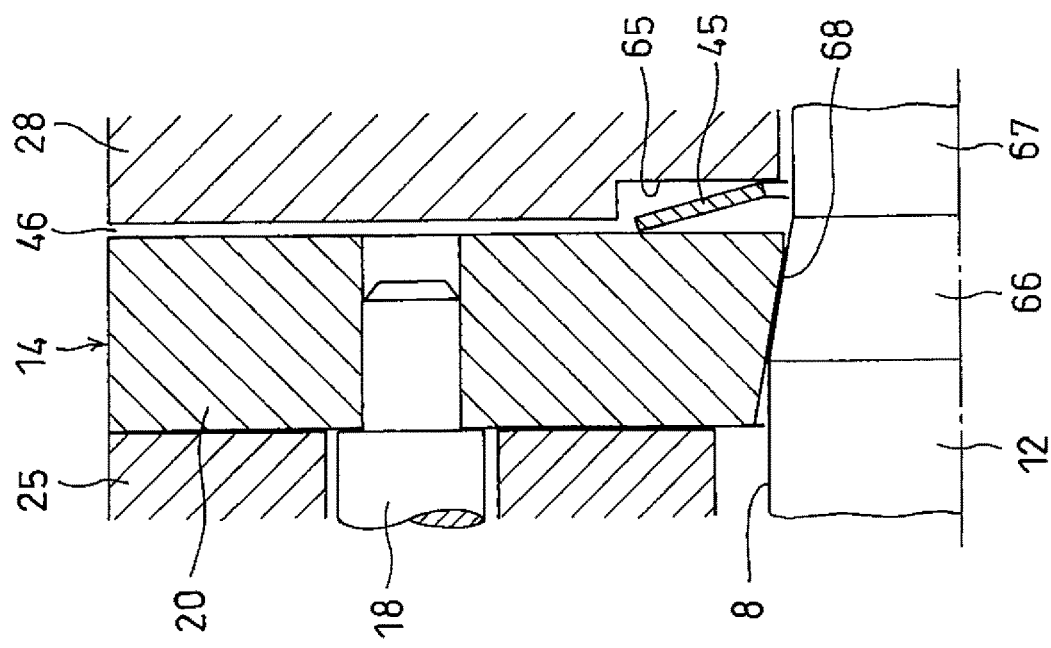
FIG. 18 is an enlarged sectional view illustrating an elastic member of FIG. 17 and its vicinity.

As illustrated in FIG. 18, the tapered surface 66 is a conical surface whose diameter decreases toward the axially rear side thereof at an inclination angle (angle relative to the axial direction) of 5 to 20 degree.

The axially rear disk 20 of the carrier 14 has, on its inner periphery, a tapered inner peripheral surface 68 opposed to the tapered surface 66 on the outer periphery of the rotary shaft 8. The tapered inner peripheral surface 68 has an inclination angle (angle relative to the axial direction) of 5 to 20 degree. The tapered inner peripheral surface 68 is preferably equal in inclination angle to the tapered surface 66.

While, as shown in FIG. 18, the carrier 14 has not moved in the axially rearward direction relative to the rotary shaft 8 (that is, while no axially rearward load is being applied to the carrier 14), the tapered inner peripheral surface 68 of the carrier 14 is in contact with the tapered surface 66 on the outer periphery of the rotary shaft 8. In particular, the tapered inner peripheral surface 68 and the tapered surface 66 are frictionally coupled together by the force of the elastic member 45, so that the relative rotation of the carrier 14 and the rotary shaft 8 is restricted by the frictional force between the surfaces 66 and 68.

Figure 19:
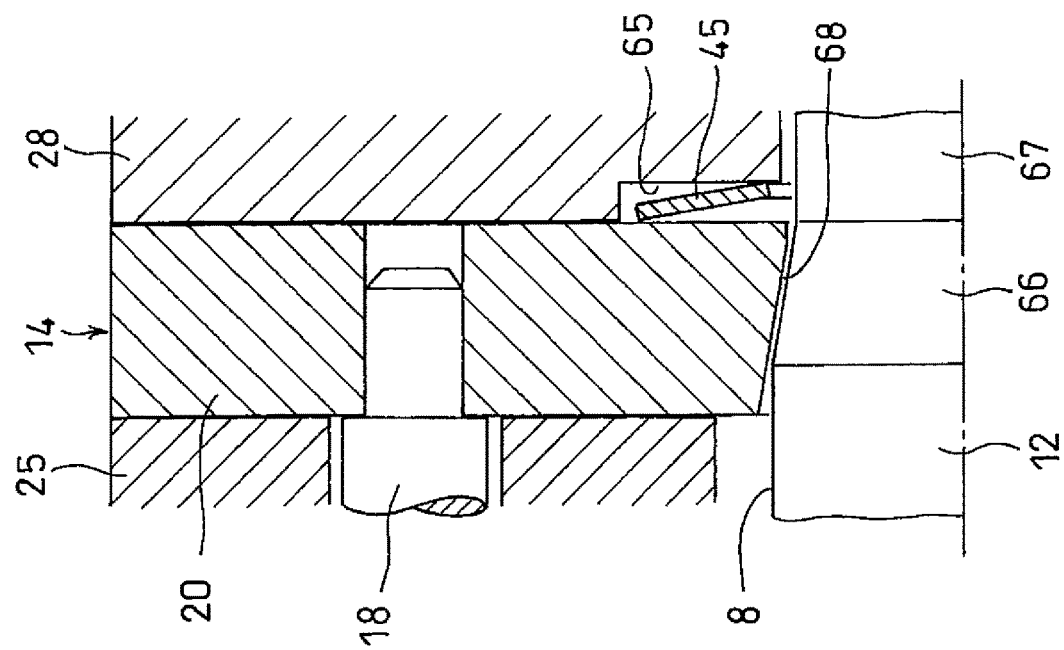
FIG. 19 is a view illustrating the state in which an axially rearward reaction force is applied to a carrier of FIG. 18.

On the other hand, when, as shown in FIG. 19, the carrier 14 has moved in the axially rearward direction relative to the rotary shaft 8 (i.e., when the axially rearward load is applied to the carrier 14, and the elastic member 45 is compressed further by this load), the tapered inner peripheral surface 68 of the carrier 14 is separated from the tapered surface 66 on the outer periphery of the rotary shaft 8. In particular, the tapered inner peripheral surface 68 and the tapered surface 66 are uncoupled from each other, thereby allowing the carrier 14 and the rotary shaft 8 to rotate relative to each other.

It is now described how the above-described electric linear motion actuator 1 operates.

Figure 16:
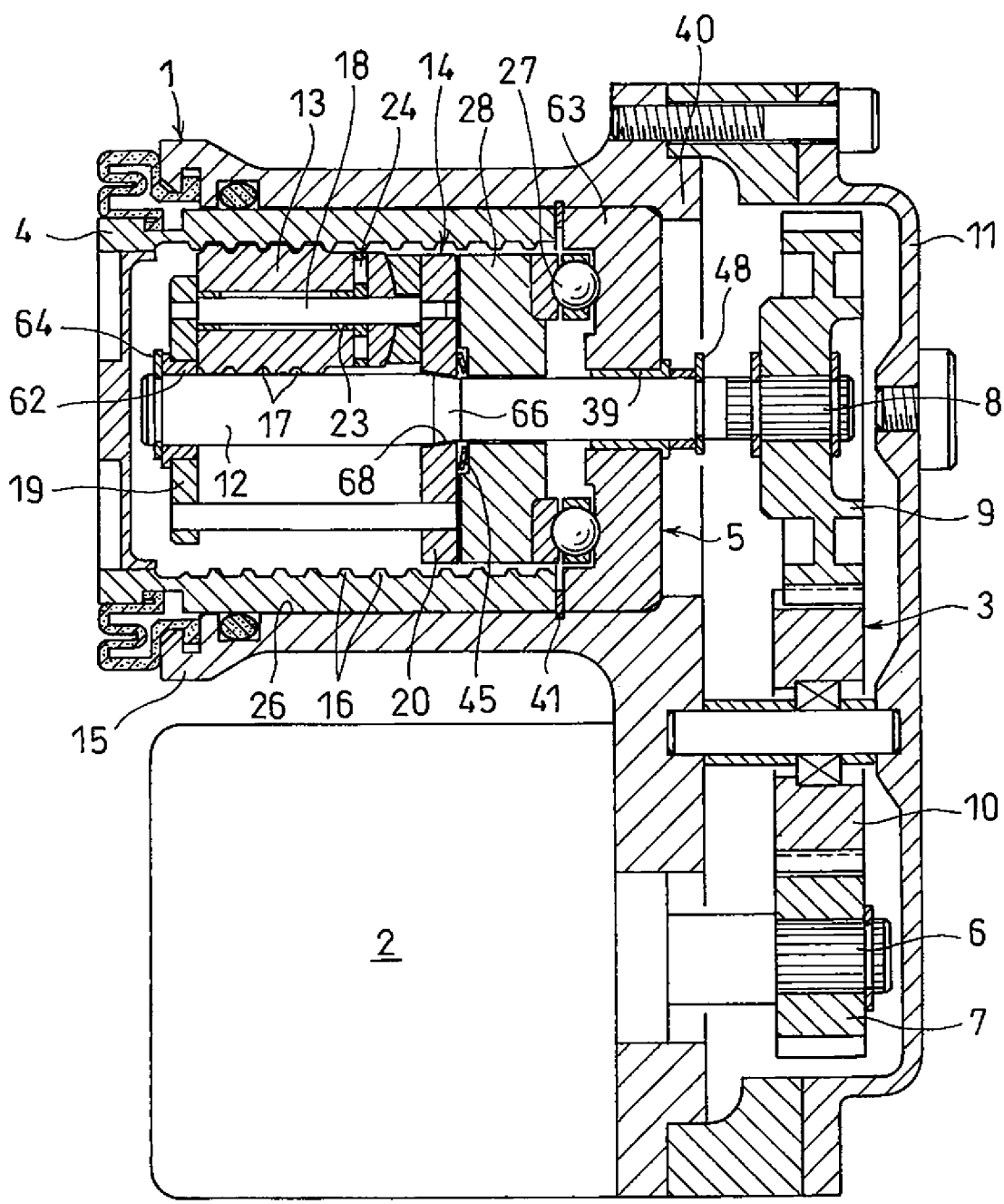
FIG. 16 is a sectional view of an electric linear motion actuator including a planetary roller screw type linear motion mechanism embodying a second aspect of the present invention.

When the motor shaft 6 of the electric motor 2 illustrated in FIG. 16 rotates, the rotation of the motor shaft 6 is transmitted to the rotary shaft 8 of the planetary roller screw type linear motion mechanism 5, after reduced in speed by the reduction gear train 3.

Since, while no axially forward load is being applied to the object by the outer ring member 4, no axially rearward load is applied to the carrier 14, as illustrated in FIG. 18, the tapered inner peripheral surface 68 of the carrier 14 and the tapered surface 66 on the outer periphery of the rotary shaft 8 are frictionally coupled together, thereby restricting the relative rotation of the carrier 14 and the rotary shaft 8. Therefore, in this state, the rotation of the rotary shaft 8 transmitted from the electric motor 2 illustrated in FIG. 16 through the reduction gear train 3 causes the carrier 14 to rotate together with the rotary shaft 8, so that the planetary rollers 13 revolve around the rotary shaft 8 without rotating about their respective center axes. As a result thereof, since the helical rib 16 on the inner periphery of the outer ring member 4 is engaged in the circumferential grooves 17 in the outer peripheries of the planetary rollers 13, the planetary rollers 13 and the outer ring member 4 axially move relative to each other. However, since the axial movement of the planetary rollers 13 is restricted along with the carrier 14, the planetary rollers 13 do not axially move relative to the housing 15, and the outer ring member 4 axially moves relative to the housing 15.

On the other hand, while the axially forward load is being applied to the object by the outer ring member 4, an axially rearward reaction force is applied to the outer ring member 4 and transmitted to the carrier 14 through the planetary rollers 13 and then the thrust bearing 24, thereby moving the carrier 14 in the axially rearward direction relative to the rotary shaft 8. As a result thereof, as illustrated in FIG. 19, the tapered inner peripheral surface 68 of the carrier 14 and the tapered surface 66 on the outer periphery of the rotary shaft 8 are uncoupled from each other, thus allowing the carrier 14 and the rotary shaft 8 to rotate relative to each other. Therefore, in this state, the rotation of the rotary shaft 8 transmitted from the electric motor 2 illustrated in FIG. 16 through the reduction gear train 3 causes the planetary rollers 13 to revolve around the rotary shaft 8 while rotating about the support pins 18, i.e., their respective center axes. As a result thereof, since the helical rib 16 on the inner periphery of the outer ring member 4 is engaged in the circumferential grooves 17 in the outer peripheries of the planetary rollers 13, the planetary rollers 13 and the outer ring member 4 axially move relative to each other. However, since the axial movement of the planetary rollers 13 is restricted along with the carrier 14, the planetary rollers 13 do not axially move relative to the housing 15, and the outer ring member 4 axially moves relative to the housing 15.

Figure 20:
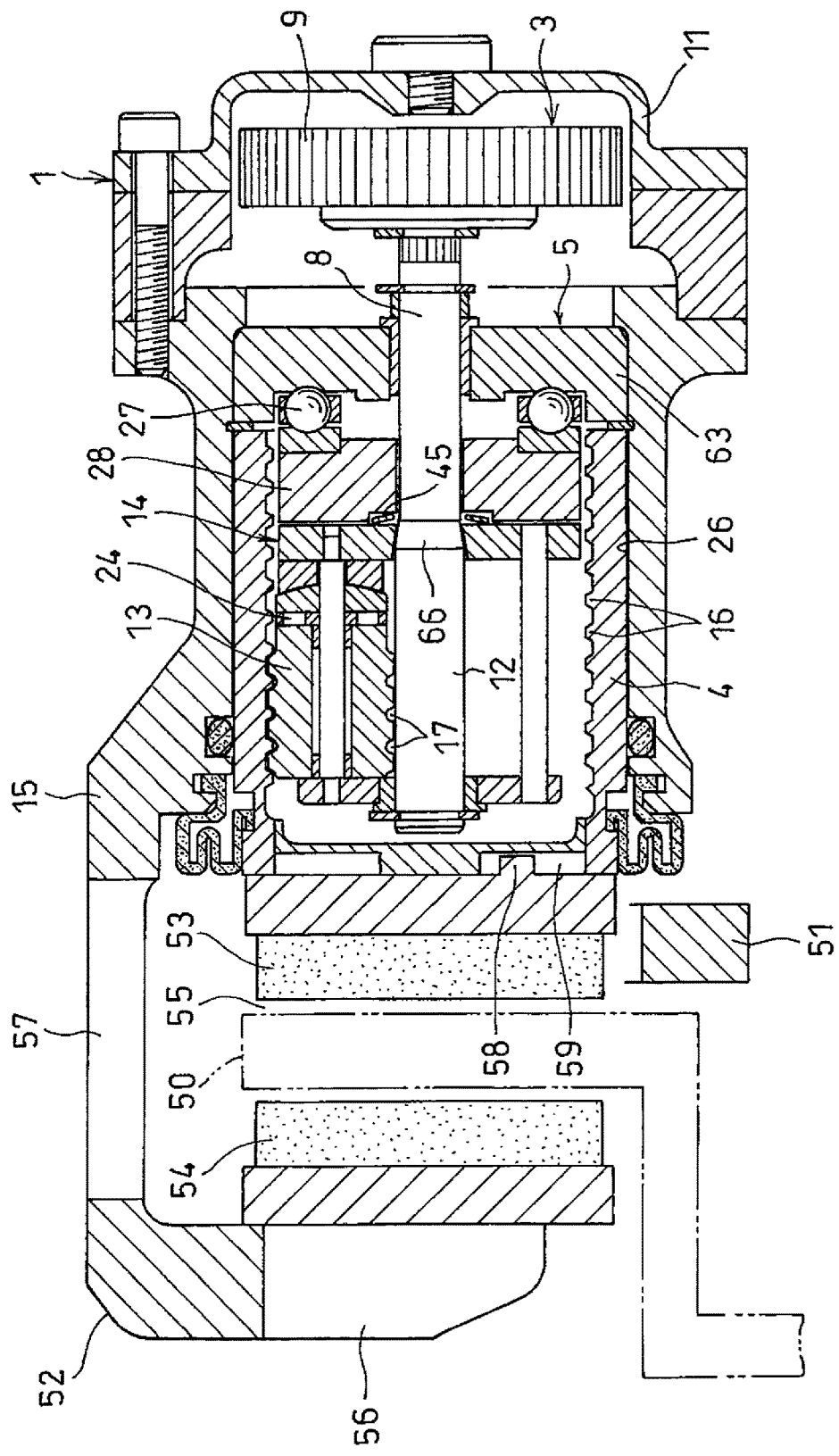
FIG. 20 is a sectional view of an electromechanical brake system in which the electric linear motion actuator of FIG. 16 is used.

FIG. 20 illustrates the electromechanical brake system in which the above-described electric linear motion actuator 1 is used. It is described how this electromechanical brake system operates.

When the electric motor 2 (see FIG. 16) is rotated to apply the brake, the rotation thereof is transmitted to the rotary shaft 8 through the reduction gear train 3, and is converted to the axial movement of the outer ring member 4 by the planetary roller screw type linear motion mechanism 5, so that the inboard brake pad 53 is pushed and moved in the axially forward direction by the outer ring member 4. Since, as illustrated in FIG. 18, the carrier 14 is frictionally coupled to the tapered surface 66 of the rotary shaft 8 until the inboard brake pad 53 comes into contact with the brake disk 50, the outer ring member 4 illustrated in FIG. 16 axially moves at a relatively high speed until the inboard brake pad 53 comes into contact with the brake disk 50. Therefore, it is possible to bring the inboard brake pad 53 into contact with the brake disk 50 quickly, and thus to improve the response of the brake.

When the inboard brake pad 53 comes into contact with the brake disk 50 thereafter, and applies the axial load to the brake disk 50, as illustrated in FIG. 19, the carrier 14 moves in the axially rearward direction relative to the rotary shaft 8, and thus the carrier 14 and the tapered surface 66 of the rotary shaft 8 are uncoupled from each other. As a result thereof, the axial moving speed of the outer ring member 4 illustrated in FIG. 16 decreases, and the load conversion rate increases, thereby generating a large axial load. Thus, it is possible to increase the force with which the inboard brake pad 53 presses the brake disk 50.

As described above, the planetary roller screw type linear motion mechanism 5 is configured such that, while no axially forward load is being applied to the object by the outer ring member 4, the carrier 14 is frictionally coupled to the frictionally coupling portion on the outer periphery of the rotary shaft 8, and thus the relative rotation of the carrier 14 and the rotary shaft 8 is restricted. Thus, in this state, the outer ring member 4 axially moves at a high speed, and the load conversion rate is low. On the other hand, when the axially forward load is applied to the object by the outer ring member 4, the carrier 14 and the frictionally coupling portion on the outer periphery of the rotary shaft 8 are uncoupled from each other, and thus the carrier 14 and the rotary shaft 8 are allowed to rotate relative to each other. This reduces the axial moving speed of the outer ring member 4, and increases the load conversion rate. In this way, the planetary roller screw type linear motion mechanism 5 is configured such that the load conversion rate can be switched according to the magnitude of the axial load applied to the object by the outer ring member 4.

In this embodiment, when the cylindrical surface 12 on the outer periphery of the rotary shaft 8, with which the planetary rollers 13 are in rolling contact, is finished with high accuracy, e.g., by polishing, it is possible to use a low-cost machining method such as centerless polishing.

Namely, it would be possible, for example, to arrange the tapered surface 66 illustrated in FIG. 17 axially forward (i.e., on the left side (in FIG. 17)) of the cylindrical surface 12, with which the planetary rollers 13 are in rolling contact, and provide the tapered surface 68 on the inner periphery of the axially front disk 19. However, since, in this arrangement, the tapered surface 66 is larger in diameter than the cylindrical surface 12, when the cylindrical surface 12 is finished, e.g., by polishing, it is impossible to use a low-cost machining method (e.g., centerless polishing), thus increasing the machining costs for finishing the cylindrical surface 12 with high accuracy.

In contrast thereto, in this embodiment, since the tapered surface 66 (frictionally coupling portion) on the outer periphery of the rotary shaft 8 is disposed axially rearward of the planetary rollers 13 (i.e., axially rearward of the cylindrical surface 12), the cylindrical surface 12, with which the planetary rollers 13 are in rolling contact, is larger in diameter than any other portion of the rotary shaft 8. Therefore, it is possible to use a low-cost machining method (i.e., a method by which the outer periphery of the rotary shaft 8 is ground with the rotary shaft 8 rollably supported, such as centerless polishing), and to finish the cylindrical surface 12 easily. Centerless polishing is a machining method in which, with a workpiece sandwiched between a grinding wheel configured to rotate at a fixed position, and a regulating wheel configured to rotate at a position opposed to the grinding wheel through the workpiece, the outer periphery of the workpiece is continuously polished, while axially feeding the workpiece, with the grinding wheel and the regulating wheel.

The frictionally coupling portion of the rotary shaft 8 may be, for example, a surface connecting the cylindrical surfaces 12 and 67 together and extending perpendicularly to the axis of the rotary shaft 8. However, if, as in this embodiment, the tapered surface 66 is used as the frictionally coupling portion of the rotary shaft 8, when the carrier 14 is frictionally coupled to the rotary shaft 8, it is possible to generate a large frictional force due to the wedge effect of the tapered surface 66.

While, in this embodiment, the carrier 14 and the rotary shaft 8 are frictionally coupled together, the rotary shaft 8 may be, instead, frictionally coupled to a member configured to rotate together with the carrier 14. For example, the electric linear motion actuator may be configured such that the elastic member 45 is disposed between the spacer 28 and the thrust bearing 27, the spacer 28 is coupled to the carrier 14 so as to be rotatable together with the carrier 14, and the spacer 28 has the tapered inner peripheral surface 68, which is frictionally coupled to the tapered surface 66 on the outer periphery of the rotary shaft 8.

The embodiment of the second aspect of the present invention, which has been described above with reference to FIGS. 16 to 20, can be summarized as follows:

(Additional Description 1)

A planetary roller screw type linear motion mechanism comprising:

- a rotary shaft (8) having a cylindrical surface (12) on its outer periphery;
- a plurality of planetary rollers (13) in rolling contact with the cylindrical surface (12);
- a carrier (14) retaining the planetary rollers (13) such that the planetary rollers (13) can revolve around the rotary shaft (8) while rotating about their respective center axes;
- an outer ring member (4) surrounding the planetary rollers (13), and supported to be axially movable;
- a helical rib (16) disposed on the inner periphery of the outer ring member (4); and
- a helical groove or circumferential grooves (17) which are disposed in the outer periphery of each of the planetary rollers (13), and in which the helical rib (16) is engaged, wherein the outer ring member (4) is axially movable due to the engagement of the helical rib (16) in the helical groove or the circumferential grooves (17) of each of the planetary rollers (13), characterized in that the planetary roller screw type linear motion mechanism further comprises:

an elastic member (45) supporting the carrier (14) such that the carrier (14) moves in one axial direction of two opposite axial directions relative to the rotary shaft (8) under the reaction force in the one axial direction which the outer ring member (4) receives when a load in the other axial direction of the two opposite axial directions is applied to an object by the outer ring member (4); and a frictionally coupling portion disposed on the outer periphery of the rotary shaft (8), the frictionally coupling portion being configured, while the carrier (14) has not moved in the one axial direction relative to the rotary shaft (8), to be frictionally coupled to the carrier (14) so as to restrict the relative rotation of the carrier (14) and the rotary shaft (8), the frictionally coupling portion being further configured, when the carrier (14) has moved in the one axial direction relative to the rotary shaft (8), to be uncoupled from the carrier (14) so as to allow the carrier (14) and the rotary shaft (8) to rotate relative to each other, and wherein the frictionally coupling portion is disposed forward of the planetary rollers (13) in the one axial direction.

(Additional Description 2)

The planetary roller screw type linear motion mechanism according to additional description 1, wherein the frictionally coupling portion comprises a tapered surface (66) whose diameter decreases toward the one axial direction.

(Additional Description 3)

An electromechanical brake system comprising:

the planetary roller screw type linear motion mechanism (5) according to additional description 1 or 2;

an electric motor (2) configured to drive and rotate the rotary shaft (8) of the planetary roller screw type linear motion mechanism (5);

a brake pad (53) configured to move together with the outer ring member (4) of the planetary roller screw type linear motion mechanism (5); and a brake disk (50) opposed to the brake pad (53).

Electric linear motion actuators 1 according to the first and second embodiments of the third aspect of the present invention are now described with reference to FIGS. 21 to 28. Elements of the actuators 1 of the third aspect corresponding to those of the previous embodiments are denoted by the same reference numerals, and their description is omitted.

Figure 22:
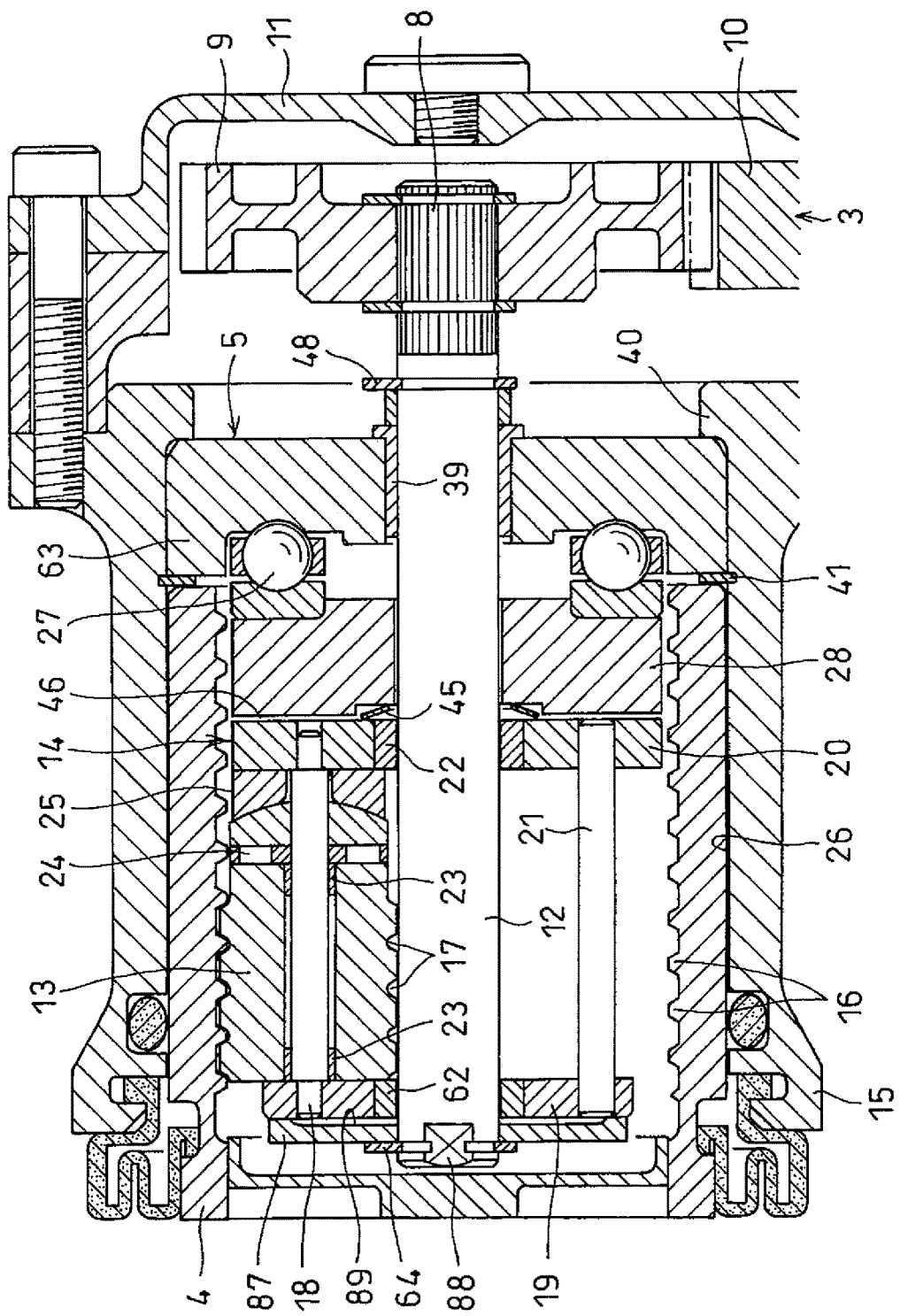
FIG. 22 is an enlarged sectional view illustrating the planetary roller screw type linear motion mechanism of FIG. 21 and its vicinity.

As illustrated in FIG. 22, in the first embodiment of the third aspect of the invention, the outer ring member 4 is axially slidably supported by the inner surface of a receiving hole 26 formed in the housing 15. A bearing supporting member 63 is fixedly mounted inside the housing 15 at a position away from the carrier 14 in the axially rearward direction. The bearing supporting member 63 is a circular annular member through which the rotary shaft 8 extends. A radial bearing 39 is mounted on the inner periphery of the bearing supporting member 63 so as to rotatably support the rotary shaft 8. The radial bearing 39 may be, for example, a sintered sliding bearing or a deep groove ball bearing.

The axially rearward movement of the bearing supporting member 63 is restricted by a support protrusion 40 disposed on the inner periphery of the receiving hole 26, whereas the axially forward movement of the bearing supporting member 63 is restricted by a snap ring 41 mounted to the inner periphery of the receiving hole 26. The axially forward movement of the rotary shaft 8 relative to the bearing supporting member 63 is restricted by a snap ring 48 mounted on the outer periphery of the rotary shaft 8. The axially forward movement of the carrier 14 relative to the rotary shaft 8 is restricted by a snap ring 64 mounted on the outer periphery of the rotary shaft 8 at its axially front end.

The radial bearing 39 is mounted with its axially forward movement relative to the bearing supporting member 63 restricted. The snap ring 48 is disposed axially rearward of the radial bearing 39. The snap ring 64 is disposed axially forward of the sliding bearing 62, which is on the inner periphery of the axially front disk 19.

The elastic member 45 is an annular member through which the rotary shaft 8 extends, and is, for example, a disk spring, but a wave spring or a coil spring may be used instead. The elastic member 4 is mounted such that, while no axially forward load is being applied to the object by the outer ring member 4 (i.e., while no axially rearward reaction force is being applied to the carrier 14), the elastic member 45 is already axially compressed, so that a preload is applied from the elastic member 45 to the carrier 14.

A frictionally coupling portion 87 is mounted to the outer periphery of the rotary shaft 8 so as to be axially opposed to the axially front disk 19. The frictionally coupling portion 87 is a disk-shaped member formed separately from the rotary shaft 8, and fitted and mounted to the outer periphery of the rotary shaft 8.

Figure 23:
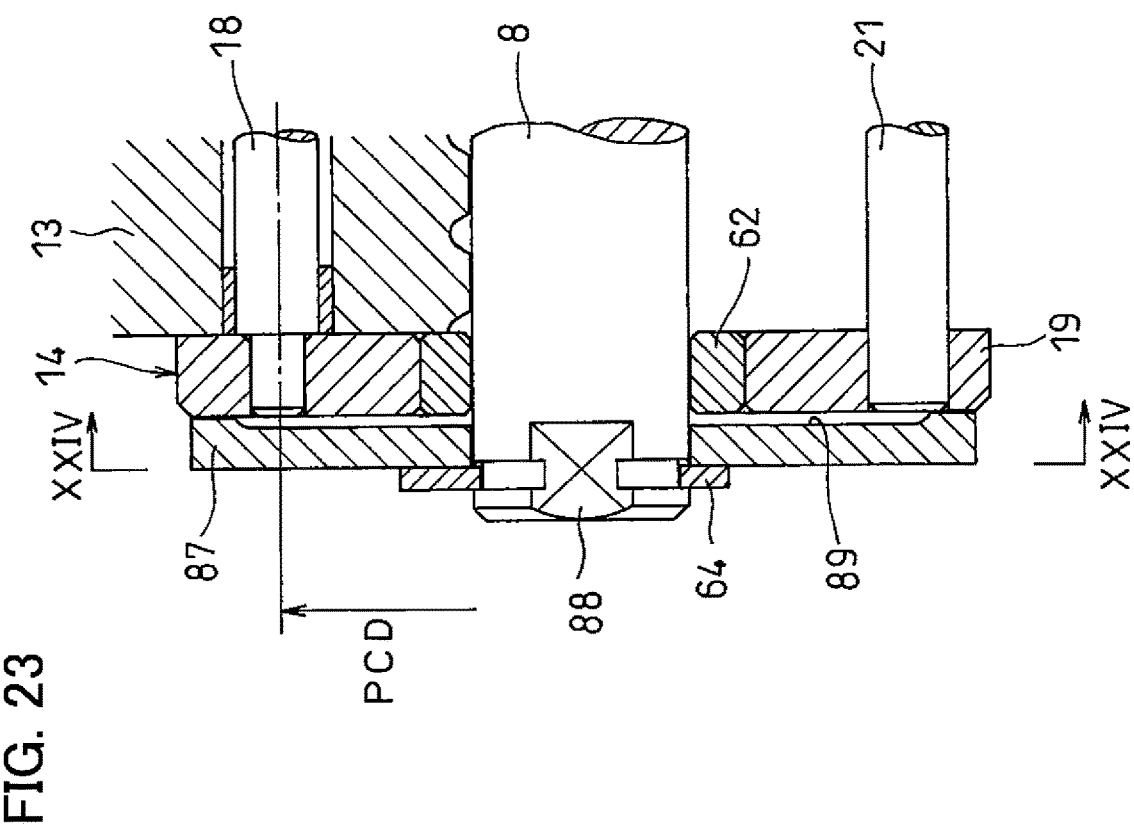
FIG. 23 is an enlarged sectional view illustrating a frictionally coupling portion of FIG. 22 and its vicinity.
Figure 24:
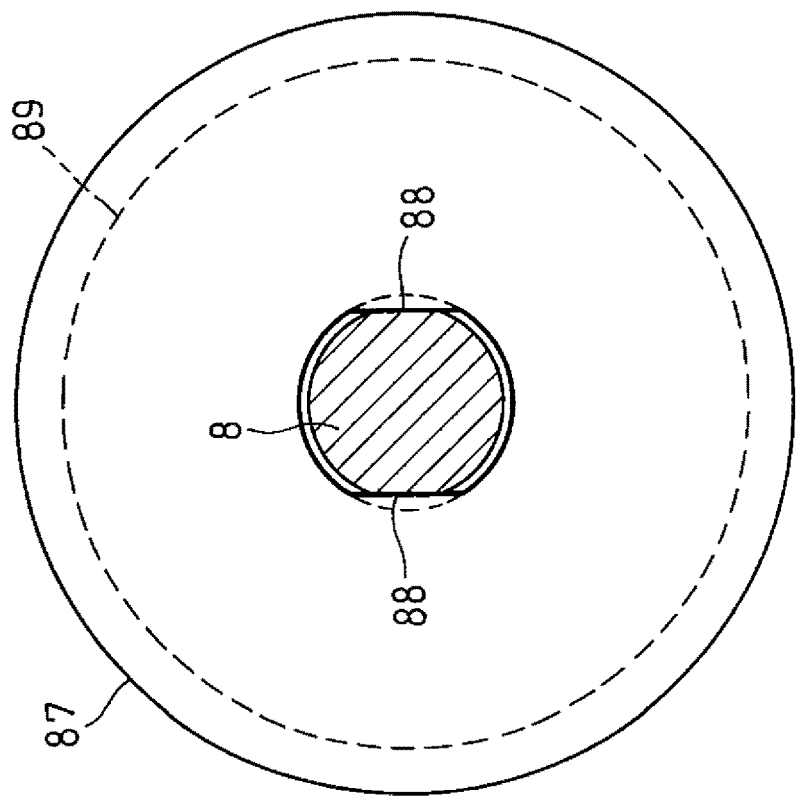
FIG. 24 is a sectional view taken along line XXIV-XXIV of FIG. 23.

As illustrated in FIG. 23, an anti-rotation arrangement 88 is disposed between the fitting surfaces of the frictionally coupling portion 87 and the rotary shaft 8 to prevent the rotation of the frictionally coupling portion 87 relative to the rotary shaft 8. In the shown example (see FIG. 24), the anti-rotation arrangement 88 comprises flat surfaces formed by cutting portions of the circumference of the rotary shaft 8 so as to extend parallel to the center axis of the rotary shaft 8. The axially forward movement of the frictionally coupling portion 87 relative to the rotary shaft 8 is restricted by the snap ring 64 on the outer periphery of the rotary shaft 8.

The frictionally coupling portion 87 has an outer diameter larger than the diameter of the imaginary circle passing through the centers of the planetary rollers 13 (this diameter is hereinafter simply referred to as "the PCD of the planetary rollers 13"). The carrier 14 is configured to contact the frictionally coupling portion 87 at a contact surface of the frictionally coupling portion 87 which is located radially outwardly of the PCD of the planetary rollers 13, and which has a center at the center of the rotary shaft 8. The contact surface of the frictionally coupling portion 87 is a flat surface orthogonal to the axial direction.

A circular recess 89 is formed in the surface of the frictionally coupling portion 87 opposed to the axially front disk 19 such that the center of the recess 89 coincides with the center of the rotary shaft 8. The recess 89 has a diameter larger than the PCD of the planetary rollers 13. Therefore, the carrier 14 comes into contact with the frictionally coupling portion 87 so as to be out of contact with the entire area of the frictionally coupling portion 87 located radially inwardly of the PCD of the planetary rollers 13.

Figure 25:
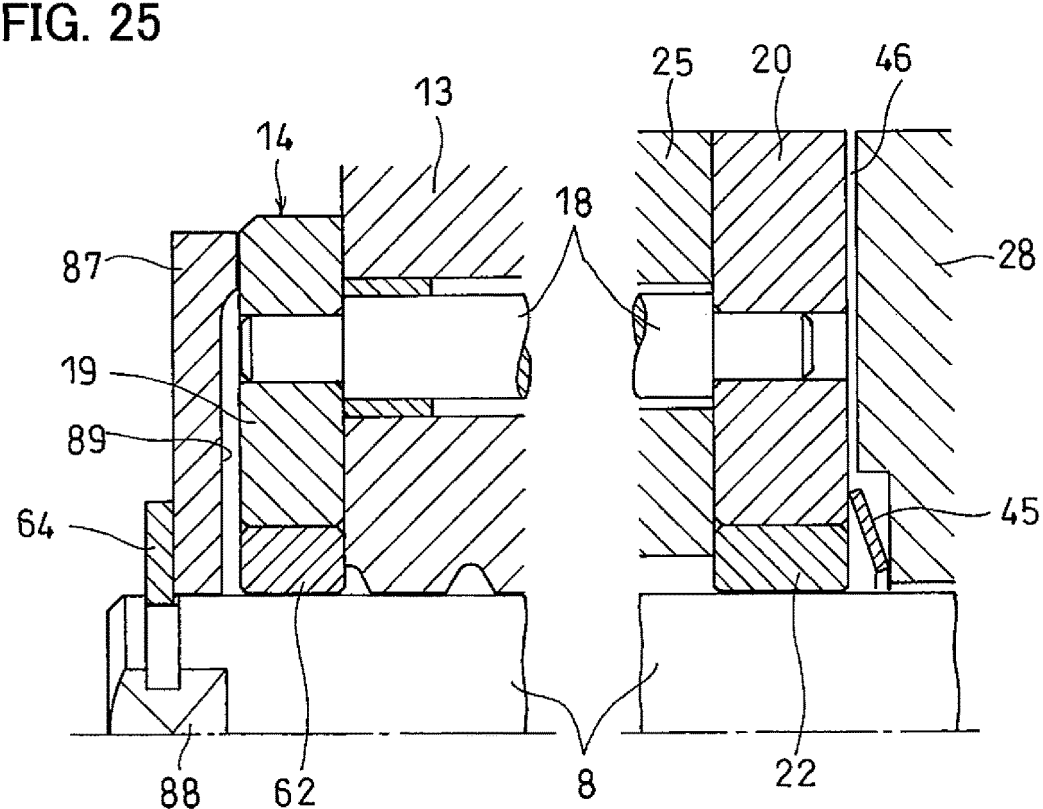
FIG. 25 is a view illustrating the state in which no axially rearward load is being applied to a carrier of FIG. 22, and thus the carrier and the frictionally coupling portion are frictionally coupled together.

While the carrier 14 has not moved in the axially rearward direction relative to the rotary shaft 8 as illustrated in FIG. 25 (that is, while no axially rearward load is being applied to the carrier 14), the frictionally coupling portion 87 is in contact with an area of the carrier 14 located radially outwardly of the PCD of the planetary rollers 13. In this state, the frictionally coupling portion 87 and the carrier 14 are frictionally coupled together by the force of the elastic member 45, so that the relative rotation of the carrier 14 and the rotary shaft 8 is restricted by the frictional force between the contact surfaces of the frictionally coupling portion 87 and the carrier 14.

Figure 26:
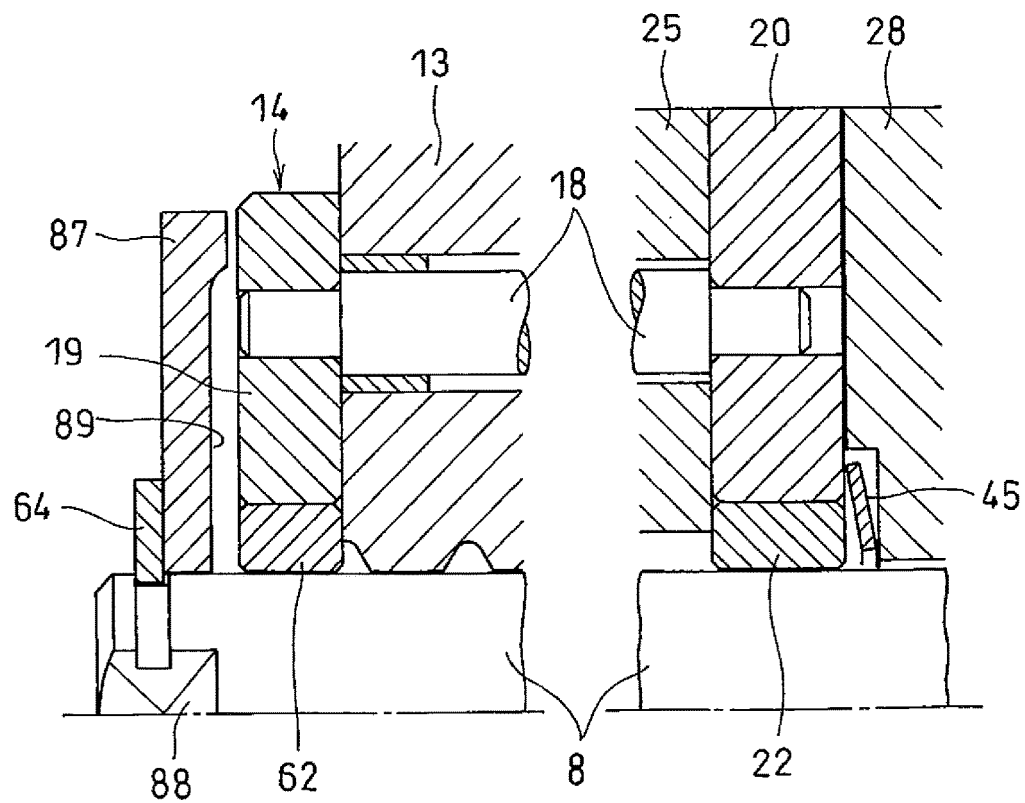
FIG. 26 is a view illustrating the state in which an axially rearward load is applied to the carrier of FIG. 22, and thus the carrier and the frictionally coupling portion are uncoupled from each other.

On the other hand, when the carrier 14 has moved in the axially rearward direction relative to the rotary shaft 8 as illustrated in FIG. 26 (i.e., when the axially rearward load is applied to the carrier 14, and the elastic member 45 is further compressed), the axially front disk 19 of the carrier 14 is separated, i.e., uncoupled, from the frictionally coupling portion 87, so that the carrier 14 and the rotary shaft 8 become rotatable relative to each other.

It is now described how the above-described electric linear motion actuator 1 operates.

Figure 21:
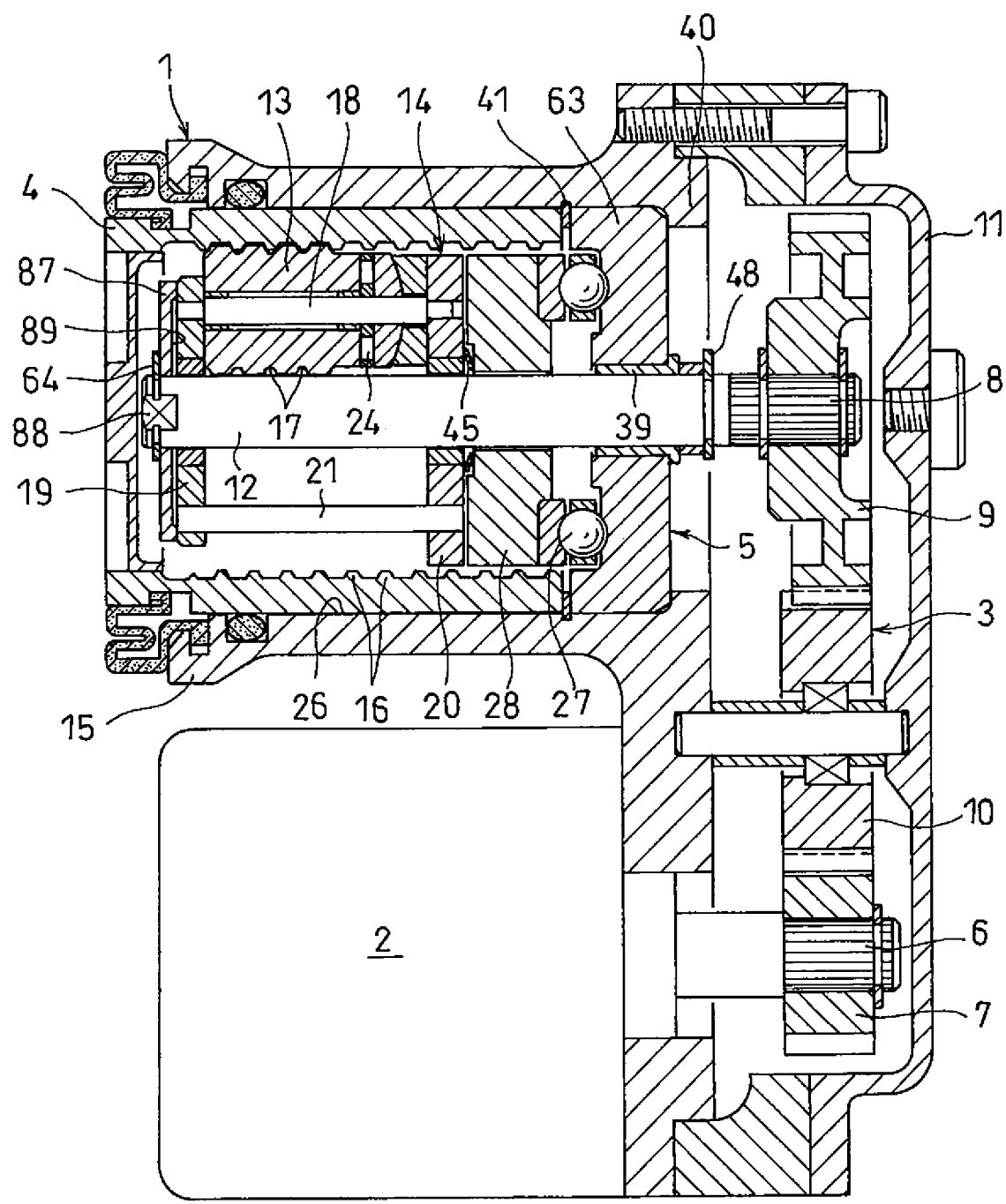
FIG. 21 is a sectional view of an electric linear motion actuator including a planetary roller screw type linear motion mechanism according to a first embodiment of a third aspect of the present invention.

When the motor shaft 6 of the electric motor 2 illustrated in FIG. 21 rotates, the rotation of the motor shaft 6 is transmitted to the rotary shaft 8 of the planetary roller screw type linear motion mechanism 5, after reduced in speed by the reduction gear train 3.

While no axially forward load is being applied to the object by the outer ring member 4 illustrated in FIG. 22 (i.e., while no axially rearward reaction force is being applied to the carrier 14), the carrier 14 and the frictionally coupling portion 87 are frictionally coupled together as illustrated in FIG. 25, thereby restricting the relative rotation of the carrier 14 and the rotary shaft 8. Therefore, in this state, the rotation of the rotary shaft 8 transmitted from the electric motor 2 illustrated in FIG. 21 through the reduction gear train 3 causes the carrier 14 to rotate together with the rotary shaft 8, so that the planetary rollers 13 revolve around the rotary shaft 8 without rotating about their respective center axes. As a result thereof, since the helical rib 16 on the inner periphery of the outer ring member 4 is engaged in the circumferential grooves 17 in the outer peripheries of the planetary rollers 13, the planetary rollers 13 and the outer ring member 4 axially move relative to each other. However, since the axial movement of the planetary rollers 13 is restricted along with the carrier 14, the planetary rollers 13 do not axially move relative to the housing 15, and the outer ring member 4 axially moves relative to the housing 15.

On the other hand, while the axially forward load is being applied to the object by the outer ring member 4, the axially rearward reaction force is applied to the outer ring member 4 and transmitted to the carrier 14 through the planetary rollers 13 and then the thrust bearing 24, thereby moving the carrier 14 in the axially rearward direction relative to the rotary shaft 8. As a result thereof, as illustrated in FIG. 26, the carrier 14 and the frictionally coupling portion 87 are uncoupled from each other, thus allowing the carrier 14 and the rotary shaft 8 to rotate relative to each other. Therefore, in this state, the rotation of the rotary shaft 8 transmitted from the electric motor 2 illustrated in FIG. 21 through the reduction gear train 3 causes the planetary rollers 13 to revolve around the rotary shaft 8 while rotating about the support pins 18, i.e., their respective center axes. As a result thereof, since the helical rib 16 on the inner periphery of the outer ring member 4 is engaged in the circumferential grooves 17 in the outer peripheries of the planetary rollers 13, the planetary rollers 13 and the outer ring member 4 axially move relative to each other. However, since the axial movement of the planetary rollers 13 is restricted along with the carrier 14, the planetary rollers 13 do not axially move relative to the housing 15, and the outer ring member 4 axially moves relative to the housing 15.

Figure 28:
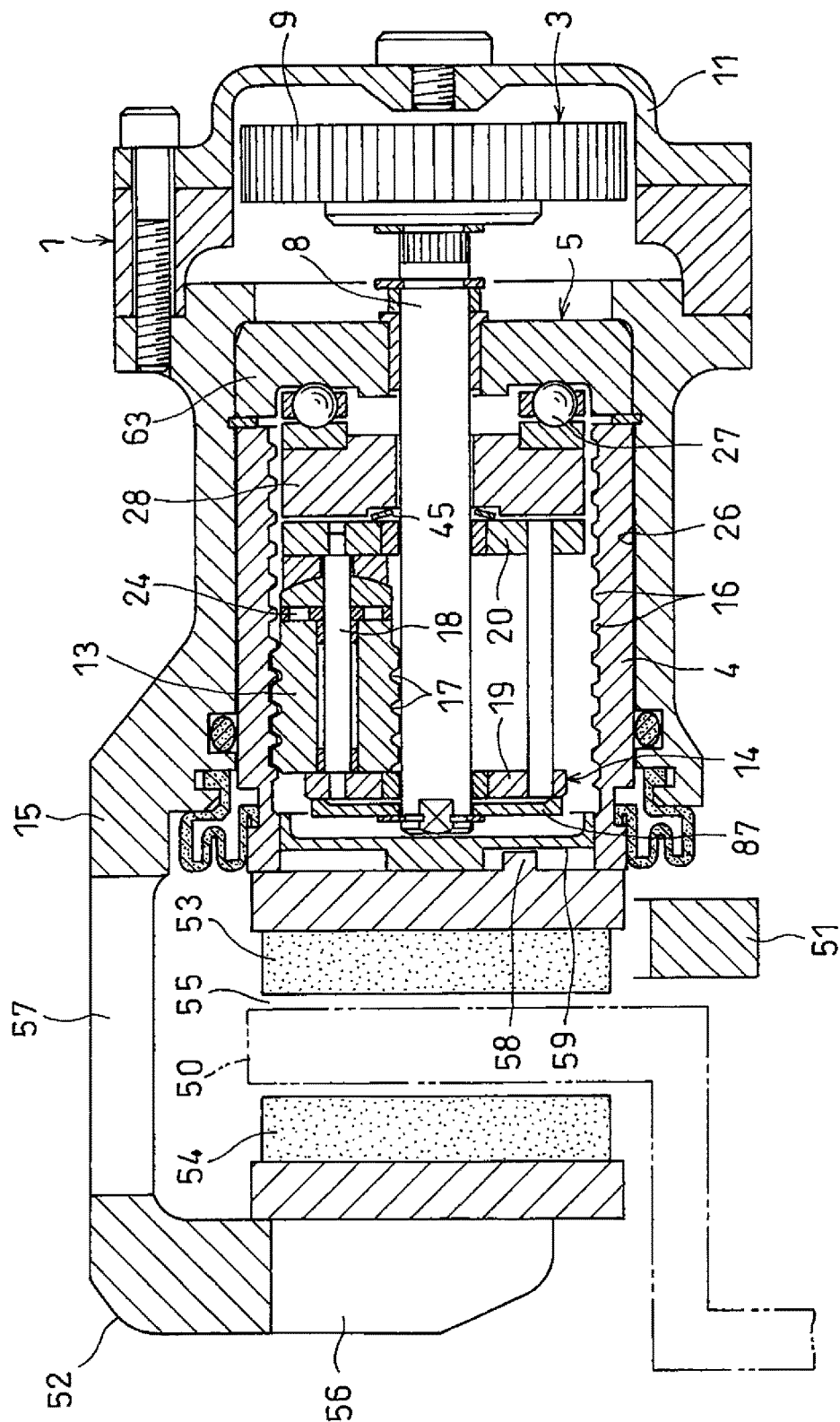
FIG. 28 is a sectional view of an electromechanical brake system in which the electric linear motion actuator of FIG. 21 is used.

FIG. 28 illustrates the electromechanical brake system in which the above-described electric linear motion actuator 1 of this embodiment is used. It is described how this electromechanical brake system operates.

When the electric motor 2 (see FIG. 21) is rotated to apply the brake, the rotation thereof is transmitted to the rotary shaft 8 through the reduction gear train 3, and is converted to the axial movement of the outer ring member 4 by the planetary roller screw type linear motion mechanism 5, so that the inboard brake pad 53 is pushed and moved in the axially forward direction by the outer ring member 4. Since, as illustrated in FIG. 25, the carrier 14 is frictionally coupled to the frictionally coupling portion 87 until the inboard brake pad 53 comes into contact with the brake disk 50, the outer ring member 4 illustrated in FIG. 28 axially moves at a relatively high speed until the inboard brake pad 53 comes into contact with the brake disk 50. Therefore, it is possible to bring the inboard brake pad 53 into contact with the brake disk 50 quickly, and thus to improve the response of the brake.

When, thereafter, the inboard brake pad 53 comes into contact with the brake disk 50, and applies an axial load to the brake disk 50, as illustrated in FIG. 26, the carrier 14 moves in the axially rearward direction relative to the rotary shaft 8, and thus the carrier 14 and the frictionally coupling portion 87 are uncoupled from each other. As a result thereof, the axial moving speed of the outer ring member 4 illustrated in FIG. 28 decreases, and the load conversion rate increases, thereby generating a large axial load. It is thus possible to increase the force with which the inboard brake pad 53 presses the brake disk 50.

As described above, the planetary roller screw type linear motion mechanism 5 is configured such that, while no axially forward load is being applied to the object by the outer ring member 4, the carrier 14 is frictionally coupled to the frictionally coupling portion 87 on the outer periphery of the rotary shaft 8, and thus the relative rotation of the carrier 14 and the rotary shaft 8 is restricted. Thus, in this state, the outer ring member 4 axially moves at a high speed, and the load conversion rate is low. On the other hand, when the axially forward load is applied to the object by the outer ring member 4, the carrier 14 and the frictionally coupling portion 87 on the outer periphery of the rotary shaft 8 are uncoupled from each other, and thus the carrier 14 and the rotary shaft 8 are allowed to rotate relative to each other. This reduces the axial moving speed of the outer ring member 4, and increases the load conversion rate. In this way, the planetary roller screw type linear motion mechanism 5 is configured such that the load conversion rate can be switched according to the magnitude of the axial load applied to the object by the outer ring member 4.

In this embodiment, since, as illustrated in FIG. 23, when the carrier 14 is frictionally coupled to the frictionally coupling portion 87, the carrier (14) comes into contact with an area of the frictionally coupling portion 87 located radially outwardly of the PCD of the planetary rollers 13, and having a center at the center of the rotary shaft 8, the contact areas of the frictionally coupling portion 87 and the carrier 14 are large in radius, so that large torque is transmittable with the carrier 14 and the frictionally coupling portion 87 frictionally coupled together. Therefore, even when the rotary shaft 8 accelerates or decelerates rapidly, it is possible to prevent the slippage between the rotary shaft 8 and the carrier 14, thus enabling the linear motion mechanism 5 to operate in a reliable manner.

In this embodiment, since the frictionally coupling portion 87 is formed separately from the rotary shaft 8, it is possible to easily machine both the rotary shaft 8 and the frictionally coupling portion 87, and thus to reduce the total manufacturing cost.

In this embodiment, since the frictionally coupling portion 87 is formed such that the carrier 14 comes into contact with the frictionally coupling portion 87 so as to be out of contact with the entire area of the frictionally coupling portion 87 located radially inwardly of the PCD of the planetary rollers 13, it is possible to ensure contact pressure at the area thereof located radially outwardly of the PCD of the planetary rollers 13, and thus to effectively prevent the slippage between the rotary shaft 8 and the carrier 14.

Figure 27:
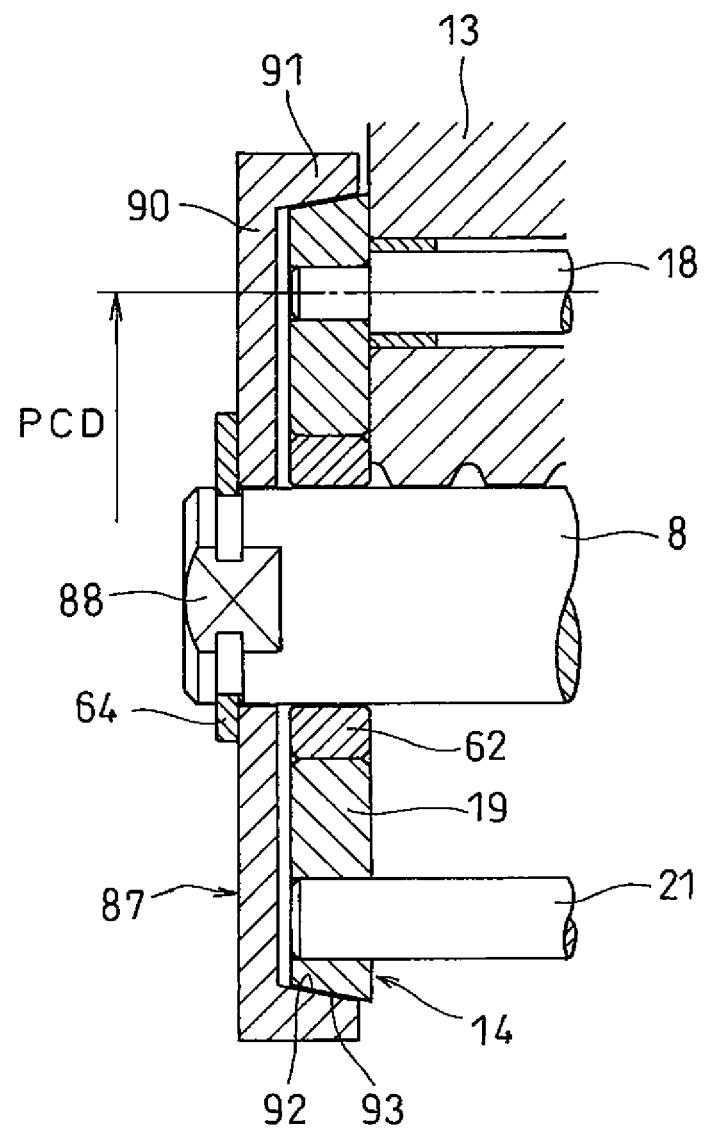
FIG. 27 is an enlarged sectional view illustrating a frictionally coupling portion of a planetary roller screw type linear motion mechanism according to a second embodiment of the third aspect of the present invention, and the vicinity of the frictionally coupling portion.

FIG. 27 shows the second embodiment of the third aspect of the present invention. In this embodiment, the frictionally coupling portion 87 is mounted to the outer periphery of the rotary shaft 8 so as to be axially opposed to the axially front disk 19. That is, the frictionally coupling portion 87 is a disk-shaped member formed separately from the rotary shaft 8, and fitted and mounted to the outer periphery of the rotary shaft 8.

The frictionally coupling portion 87 includes a disk portion 90 having an outer diameter larger than the PCD of the planetary rollers 13; and a cylindrical portion 91 extending in the axially rearward direction from the radially outer edge of the disk portion 90, and having, on its inner periphery, a tapered surface 92 opposed to the outer periphery of the axially front disk 19. The tapered surface 92 is a tapered inner peripheral surface whose diameter decreases toward the axially front side thereof at an inclination angle (angle relative to the axial direction) of 5 to 20 degree.

The axially front disk 19 of the carrier 14 has, on its outer periphery, a tapered outer peripheral surface 93 opposed to the tapered surface 92 of the frictionally coupling portion 87, and having an inclination angle (angle relative to the axial direction) of 5 to 20 degree. The tapered outer peripheral surface 93 is preferably equal in inclination angle to the tapered surface 92.

The minimum diameter of the tapered surface 92 on the inner periphery of the cylindrical portion 91 is smaller than the minimum diameter of the tapered outer peripheral surface 93 of the carrier 14. As a result thereof, the carrier 14 comes into contact with the frictionally coupling portion 87 so as to be out of contact with the entire area of the frictionally coupling portion 87 located radially inwardly of the PCD of the planetary rollers 13.

Since the planetary roller screw type linear motion mechanism 5 of this embodiment is configured such that, as illustrated in FIG. 27, when the carrier 14 is frictionally coupled to the frictionally coupling portion 87, the carrier (14) comes into contact with an area of the frictionally coupling portion 87 located radially outwardly of the PCD of the planetary rollers 13, and having a center at the center of the rotary shaft 8, the contact areas of the frictionally coupling portion 87 and the carrier 14 are large in radius, so that large torque is transmittable with the carrier 14 and the frictionally coupling portion 87 frictionally coupled together. Therefore, even when the rotary shaft 8 accelerates or decelerates rapidly, it is possible to prevent the slippage between the rotary shaft 8 and the carrier 14, thus enabling the linear motion mechanism 5 to operate in a reliable manner.

Since the contact surface of the frictionally coupling portion 87 with which the carrier 14 comes into contact comprises a tapered surface 92 whose center coincides with the center of the rotary shaft 8 and whose diameter is larger than the PCD of the planetary rollers 13, the contact surface pressure between the frictionally coupling portion 87 and the carrier 14 is high due to the wedge action/effect of the tapered surface 92, thereby making it possible to more effectively prevent the slippage between the rotary shaft 8 and the carrier 14.

In this embodiment, as in the first embodiment, since the frictionally coupling portion 87 is formed separately from the rotary shaft 8, it is possible to easily machine both the rotary shaft 8 and the frictionally coupling portion 87, and thus to reduce the total manufacturing cost.

In this embodiment, since the frictionally coupling portion 87 is formed such that the carrier 14 comes into contact with the frictionally coupling portion 87 so as to be out of contact with the entire area of the frictionally coupling portion 87 located radially inwardly of the PCD of the planetary rollers 13, it is possible to ensure contact pressure at an area thereof located radially outwardly of the PCD of the planetary rollers 13, and thus to effectively prevent the slippage between the rotary shaft 8 and the carrier 14.

The above embodiments of the third aspect of the present invention, which have been described with reference to FIGS. 21 to 28, can be summarized as follows:

(Additional Description 4)

A planetary roller screw type linear motion mechanism comprising:
- a rotary shaft (8) configured to be rotated from outside;
- a plurality of planetary rollers (13) in rolling contact with the outer periphery of the rotary shaft (8);
- a carrier (14) retaining the planetary rollers (13) such that the planetary rollers (13) can revolve around the rotary shaft (8) while rotating about their respective center axes;
- an outer ring member (4) surrounding the planetary rollers (13), and supported so as to be axially movable;
- a helical rib (16) disposed on the inner periphery of the outer ring member (4);
- a helical groove or circumferential grooves (17) which are disposed in the outer periphery of each of the planetary rollers (13), and in which the helical rib (16) is engaged such that the outer ring member (4) axially moves when the planetary rollers (13) revolve around the rotary shaft (8) while rotating about their respective center axes:
- an elastic member (45) supporting the carrier (14) such that the carrier (14) moves in the axially rearward direction relative to the rotary shaft (8) due to the axially rearward reaction force which the outer ring member (4) receives when the outer ring member (4) applies an axially forward load to an object; and
- a frictionally coupling portion (87) disposed on the outer periphery of the rotary shaft (8), and configured such that, while the carrier (14) has not moved in the axially rearward direction relative to the rotary shaft (8), the frictionally coupling portion (87) and the carrier (14) are frictionally coupled together so as to restrict the relative rotation of the carrier (14) and the rotary shaft (8), and such that, when the carrier (14) has moved in the axially rearward direction relative to the rotary shaft (8), the frictionally coupling portion (87) and the carrier (14) are uncoupled from each other so as to allow the carrier (14) and the rotary shaft (8) to rotate relative to each other, characterized in that the frictionally coupling portion (87) is shaped such that, when the carrier (14) is frictionally coupled to the frictionally coupling portion (87), the carrier (14) comes into contact with an area of the frictionally coupling portion (87) located radially outwardly of the diameter (PCD) of the imaginary circle passing through the centers of the planetary rollers (13), and having a center at the center of the rotary shaft (8).

(Additional Description 5)

The planetary roller screw type linear motion mechanism according to additional description 4, wherein the carrier (14) includes:
- a plurality of support pins (18) supporting the respective planetary rollers (13) such that the planetary rollers (13) are rotatable about their respective center axes;
- an axially front disk (19) retaining the axially front ends of the support pins (18); and
- an axially rear disk (20) retaining the axially rear ends of the support pins (18),
- wherein the frictionally coupling portion (87) is a member formed separately from the rotary shaft (8), and mounted to the outer periphery of the rotary shaft (8) so as to be axially opposed to the axially front disk (19).

(Additional Description 6)

The planetary roller screw type linear motion mechanism according to additional description 4 or 5, wherein the frictionally coupling portion 87 is formed such that the carrier (14) comes into contact with the frictionally coupling portion (87) so as to be out of contact with the entire area of the frictionally coupling portion (87) located radially inwardly of the diameter (PCD) of the imaginary circle passing through the centers of the planetary rollers (13).

(Additional Description 7)

The planetary roller screw type linear motion mechanism according to any of additional descriptions 4 to 6, wherein the contact surface of the frictionally coupling portion (87) with which the carrier (14) comes into contact comprises a tapered surface (92) whose center coincides with the center of the rotary shaft (8), and whose diameter is larger than the diameter (PCD) of the imaginary circle passing through the centers of the planetary rollers (13).

(Additional Description 8)

An electromechanical brake system comprising:
- the planetary roller screw type linear motion mechanism (5) according to any of additional descriptions 4 to 6;
- an electric motor (2) configured to drive and rotate the rotary shaft (8) of the planetary roller screw type linear motion mechanism (5);
- a brake pad (53) configured to move together with the outer ring member (4) of the planetary roller screw type linear motion mechanism (5); and
- a brake disk (50) opposed to the brake pad (53).

Electric linear motion actuators 1 according to the first to seventh embodiments of the fourth aspect of the present invention are now described with reference to FIGS. 29 to 43. Elements of the fourth aspect corresponding to those of the previous embodiments are denoted by the same reference numerals, and their description is omitted.

Figure 30:
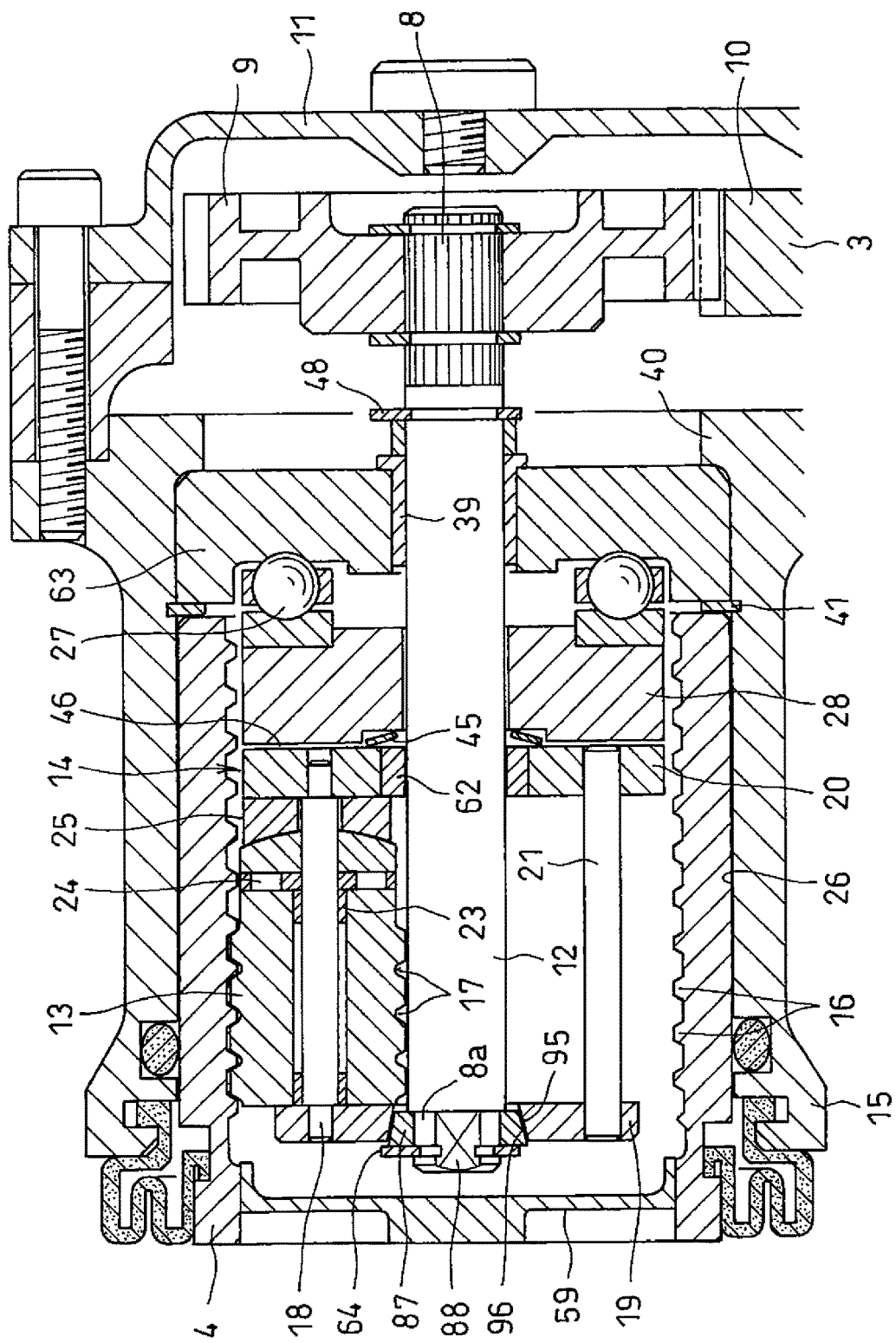
FIG. 30 is an enlarged sectional view illustrating the planetary roller screw type linear motion mechanism of FIG. 29 and its vicinity.

In the first embodiment, as illustrated in FIG. 30, the axially rearward movement of the bearing supporting member 63 is restricted by a support protrusion 40 disposed on the inner periphery of the receiving hole 26, whereas the axially forward movement of the bearing supporting member 63 is restricted by a snap ring 41 mounted to the inner periphery of the receiving hole 26. The axially forward movement of the rotary shaft 8 relative to the bearing supporting member 63 is restricted by a snap ring 48 mounted on the outer periphery of the rotary shaft 8. The axially forward movement of the carrier 14 relative to the rotary shaft 8 is restricted by a frictionally coupling portion 87 fixed to the outer periphery of the rotary shaft 8 at its axially front end.

Figure 31:
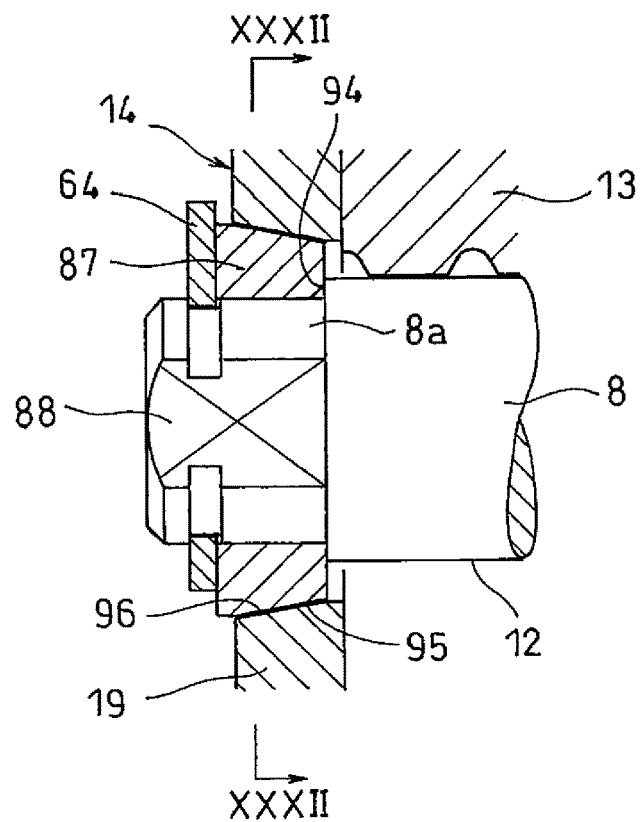
FIG. 31 is an enlarged sectional view illustrating a frictionally coupling portion of FIG. 30 and its vicinity.
Figure 32:
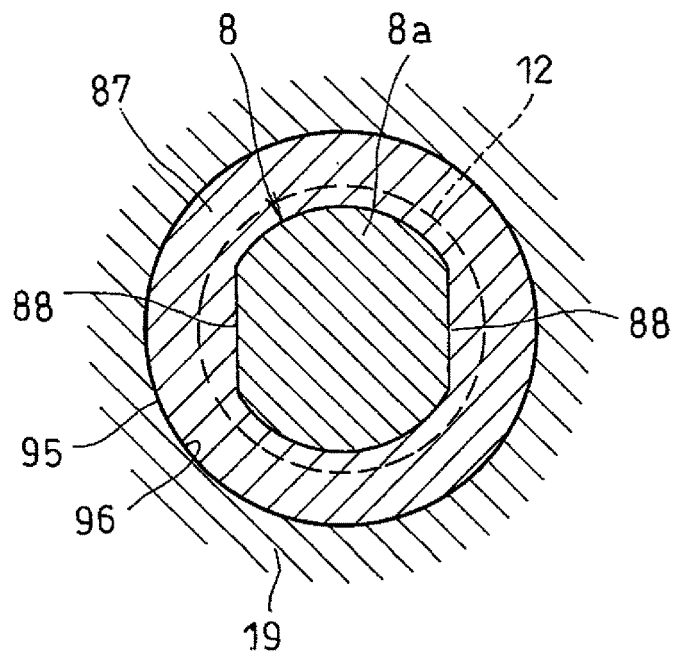
FIG. 32 is a sectional view taken along line XXXII-XXXII of FIG. 31.

As illustrated in FIGS. 31 and 32, the frictionally coupling portion 87 is an annular member formed separately from the portion of the rotary shaft 8 having a cylindrical surface 12, and is fixedly fitted to the outer periphery of a fitting shaft portion 8a formed on the axially front end of the rotary shaft 8. The fitting shaft portion 8a has no portion that radially outwardly protrudes beyond the cylindrical surface 12. On the other hand, the frictionally coupling portion 87 has an outer diameter larger than the diameter of the cylindrical surface 12 (that is, the frictionally coupling portion 87 has a portion that radially outwardly protrudes beyond the cylindrical surface 12).

The rotation of the frictionally coupling portion 87 relative to the rotary shaft 8 is restricted by fitting the frictionally coupling portion 87 to an anti-rotation arrangement 88 formed on the outer periphery of the fitting shaft portion 8a of the rotary shaft 8 and having a non-circular cross section. In this embodiment, the anti-rotation arrangement 88 comprise flat surfaces formed by cutting portions of the circumference of the rotary shaft 8 so as to extend parallel to the center axis of the rotary shaft 8. The axially forward movement of the frictionally coupling portion 87 relative to the rotary shaft 8 is restricted by a snap ring 64 mounted on the outer periphery of the fitting shaft portion 8a of the rotary shaft 8, whereas the axially rearward movement of the frictionally coupling portion 87 relative to the rotary shaft 8 is restricted by a step 94 defined at the axially rear end of the fitting shaft portion 8a. The step 94 has an axially rearwardly increasing diameter.

The frictionally coupling portion 87 has, on its outer periphery, a tapered surface 95 whose diameter decreases toward the axially rear side thereof at an inclination angle (relative to the axial direction) of 5 to 20 degree.

The axially front disk 19 of the carrier 14 has, on its inner periphery, a tapered inner peripheral surface 96 opposed to the tapered surface 95 of the frictionally coupling portion 87, and having an inclination angle (relative to the axial direction) of 5 to 20 degree. The tapered inner peripheral surface 96 is preferably equal in inclination angle to the tapered surface 95.

Figure 33:
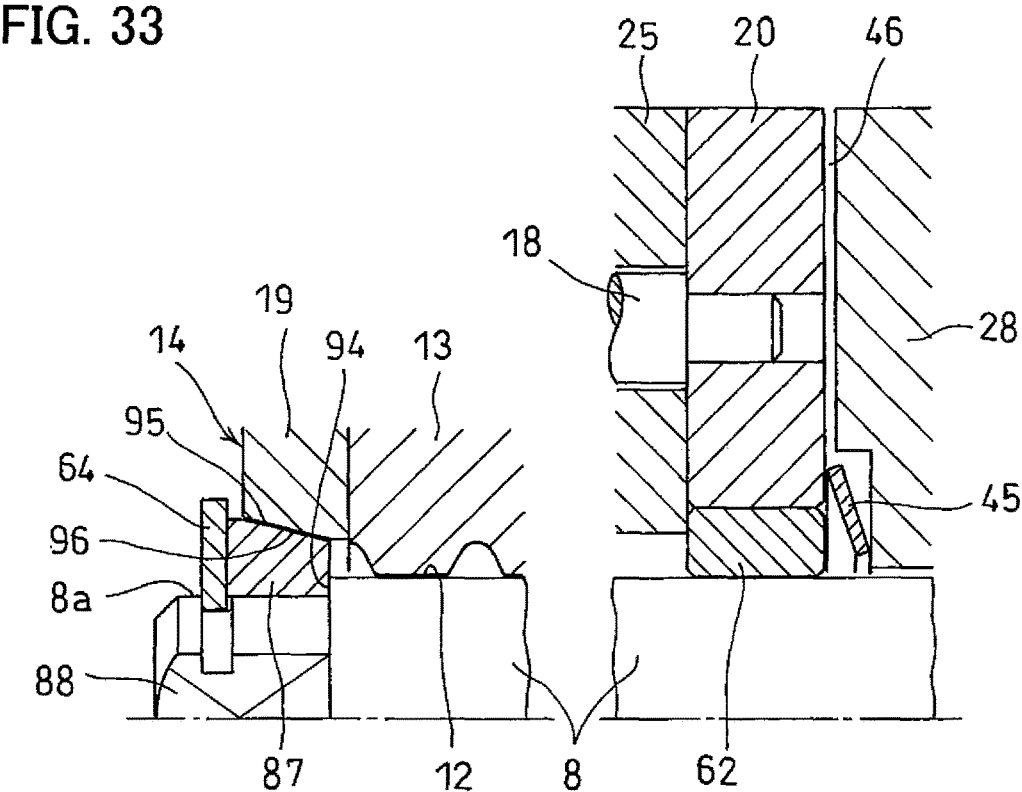
FIG. 33 is a view illustrating the state in which no axially rearward load is being applied to a carrier of FIG. 30, and thus the carrier and the frictionally coupling portion are frictionally coupled together.

While the carrier 14 has not moved in the axially rearward direction relative to the rotary shaft 8 as illustrated in FIG. 33 (that is, while no axially rearward load is being applied to the carrier 14), the tapered inner peripheral surface 96 of the carrier 14 is in contact with the tapered surface 95 on the outer periphery of the frictionally coupling portion 87. In this state, the tapered inner peripheral surface 96 and the tapered surface 95 are frictionally coupled together by the force of the elastic member 45, so that the relative rotation of the carrier 14 and the rotary shaft 8 is restricted by the frictional force between the surfaces 96 and 95.

Figure 34:
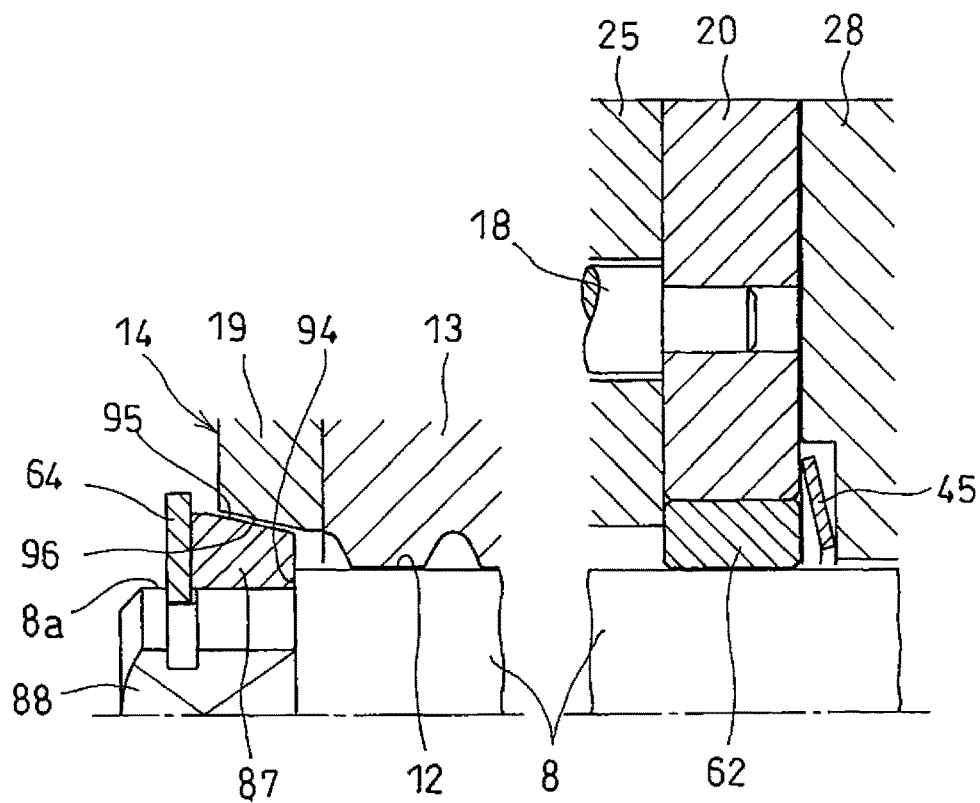
FIG. 34 is a view illustrating the state in which an axially rearward load is applied to the carrier of FIG. 30, and thus the carrier and the frictionally coupling portion are uncoupled from each other.

On the other hand, when the carrier 14 has moved in the axially rearward direction relative to the rotary shaft 8 as illustrated in FIG. 34 (i.e., when the axially rearward load is applied to the carrier 14, and as a result, the elastic member 45 is compressed further), the tapered inner peripheral surface 96 of the carrier 14 is separated, i.e., uncoupled, from the tapered surface 95 on the outer periphery of the frictionally coupling portion 87, so that the carrier 14 and the rotary shaft 8 become rotatable relative to each other.

It is now described how the above-described electric linear motion actuator 1 operates.

Figure 29:
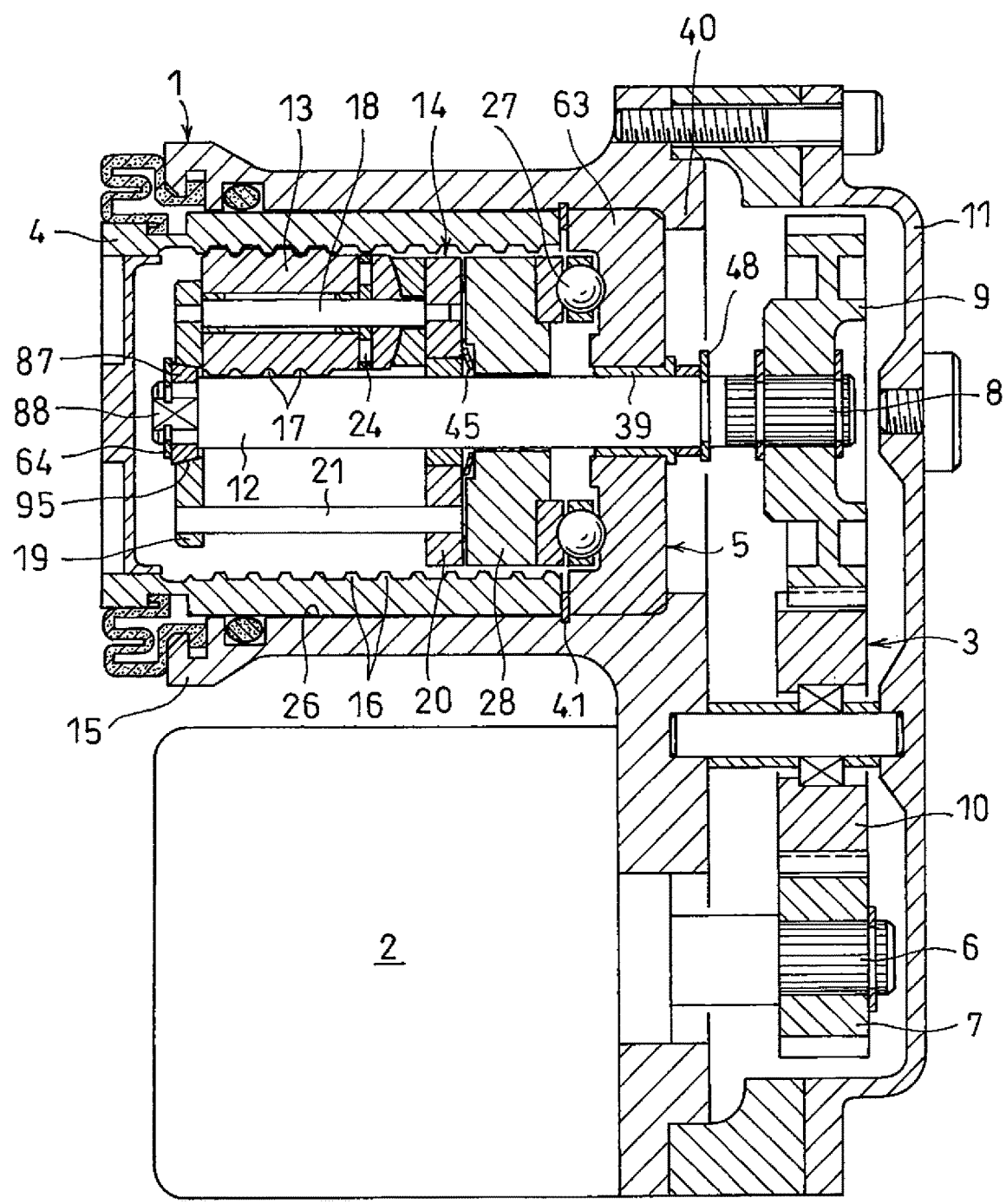
FIG. 29 is a sectional view of an electric linear motion actuator including a planetary roller screw type linear motion mechanism according to a first embodiment of a fourth aspect of the present invention.

When the motor shaft 6 of the electric motor 2 illustrated in FIG. 29 rotates, the rotation of the motor shaft 6 is transmitted to the rotary shaft 8 of the planetary roller screw type linear motion mechanism 5, after reduced in speed by the reduction gear train 3.

While no axially forward load is being applied to the object by the outer ring member 4 illustrated in FIG. 30 (i.e., while no axially rearward reaction force is being applied to the carrier 14), the carrier 14 and the frictionally coupling portion 87 are frictionally coupled together as illustrated in FIG. 33, thereby restricting the relative rotation of the carrier 14 and the rotary shaft 8. Therefore, in this state, the rotation of the rotary shaft 8 transmitted from the electric motor 2 illustrated in FIG. 29 through the reduction gear train 3 causes the carrier 14 to rotate together with the rotary shaft 8, so that the planetary rollers 13 revolve around the rotary shaft 8 without rotating about their respective center axes. As a result thereof, since the helical rib 16 on the inner periphery of the outer ring member 4 is engaged in the circumferential grooves 17 in the outer peripheries of the planetary rollers 13, the planetary rollers 13 and the outer ring member 4 axially move relative to each other. However, since the axial movement of the planetary rollers 13 is restricted along with the carrier 14, the planetary rollers 13 do not axially move relative to the housing 15, and the outer ring member 4 axially moves relative to the housing 15.

On the other hand, while the axially forward load is being applied to the object by the outer ring member 4, the axially rearward reaction force is applied to the outer ring member 4 and transmitted to the carrier 14 through the planetary rollers 13 and then the thrust bearing 24, thereby moving the carrier 14 in the axially rearward direction relative to the rotary shaft 8. As a result thereof, as illustrated in FIG. 34, the carrier 14 and the frictionally coupling portion 87 are uncoupled from each other, thus allowing the carrier 14 and the rotary shaft 8 to rotate relative to each other. Therefore, in this state, the rotation of the rotary shaft 8 transmitted from the electric motor 2 illustrated in FIG. 29 through the reduction gear train 3 causes the planetary rollers 13 to revolve around the rotary shaft 8 while rotating about the support pins 18, i.e., their respective center axes. As a result thereof, since the helical rib 16 on the inner periphery of the outer ring member 4 is engaged in the circumferential grooves 17 in the outer peripheries of the planetary rollers 13, the planetary rollers 13 and the outer ring member 4 axially move relative to each other. However, since the axial movement of the planetary rollers 13 is restricted along with the carrier 14, the planetary rollers 13 do not axially move relative to the housing 15, and the outer ring member 4 axially moves relative to the housing 15.

Figure 43:
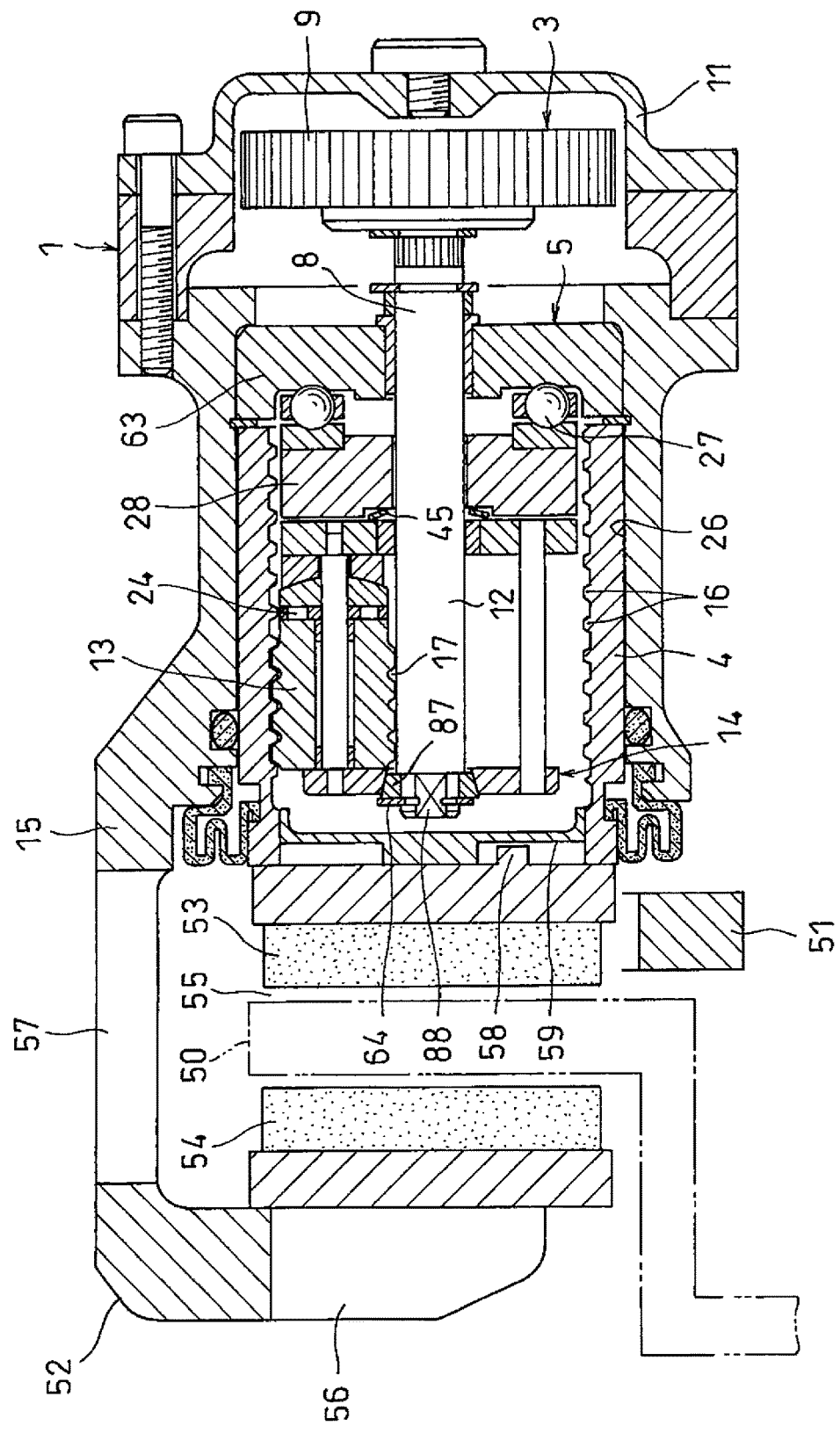
FIG. 43 is a sectional view of an electromechanical brake system in which the electric linear motion actuator of FIG. 29 is used.

FIG. 43 illustrates the electromechanical brake system in which the above-described electric linear motion actuator 1 is used. It is described how this electromechanical brake system operates.

When the electric motor 2 (see FIG. 29) is rotated to apply the brake, the rotation thereof is transmitted to the rotary shaft 8 through the reduction gear train 3, and is converted to the axial movement of the outer ring member 4 by the planetary roller screw type linear motion mechanism 5, so that the inboard brake pad 53 is pushed and moved in the axially forward direction by the outer ring member 4. Since, as illustrated in FIG. 33, the carrier 14 is frictionally coupled to the frictionally coupling portion 87 until the inboard brake pad 53 comes into contact with the brake disk 50, the outer ring member 4 illustrated in FIG. 43 axially moves at a relatively high speed until the inboard brake pad 53 comes into contact with the brake disk 50. Therefore, it is possible to bring the inboard brake pad 53 into contact with the brake disk 50 quickly, and thus to improve the response of the brake.

When, thereafter, the inboard brake pad 53 comes into contact with the brake disk 50, and applies an axial load to the brake disk 50, as illustrated in FIG. 34, the carrier 14 moves in the axially rearward direction relative to the rotary shaft 8, and thus the carrier 14 and the frictionally coupling portion 87 are uncoupled from each other. This reduces the axial moving speed of the outer ring member 4 illustrated in FIG. 43, and increases the load conversion rate, thereby generating a large axial load. Thus, it is possible to increase the force with which the inboard brake pad 53 presses the brake disk 50.

As described above, in the planetary roller screw type linear motion mechanism 5, while no axially forward load is being applied to the object by the outer ring member 4, the carrier 14 is frictionally coupled to the frictionally coupling portion 87, and thus the relative rotation of the carrier 14 and the rotary shaft 8 is restricted, so that, in this state, the outer ring member 4 axially moves at a high speed, and the load conversion rate is low. On the other hand, when the axially forward load is applied to the object by the outer ring member 4, the carrier 14 and the frictionally coupling portion 87 are uncoupled from each other, and thus the carrier 14 and the rotary shaft 8 are allowed to rotate relative to each other, so that, in this state, the outer ring member 4 axially moves at a low speed, and the load conversion rate is high. In this way, the planetary roller screw type linear motion mechanism 5 is configured such that the load conversion rate can be switched according to the magnitude of the axial load applied to the object by the outer ring member 4.

In this embodiment, when the cylindrical surface 12 on the outer periphery of the rotary shaft 8, with which the planetary rollers 13 are in rolling contact, is finished with high accuracy, e.g., by polishing, it is possible to use a low-cost machining method such as centerless polishing.

Namely, while, for example, the frictionally coupling portion 87 illustrated in FIG. 30 may be formed integral with the portion of the rotary shaft 8 having the cylindrical surface 12, if the frictionally coupling portion 87 is integral with the rotary shaft 8, since the tapered surface 95 is larger in diameter than the cylindrical surface 12, when the cylindrical surface 12 is finished, e.g., by polishing, it is impossible to use a low-cost machining method (e.g., centerless polishing), thus increasing the machining costs for finishing the cylindrical surface 12 with high accuracy.

In contrast thereto, in this embodiment, since the frictionally coupling portion 87 is an annular member formed separately from the portion of the rotary shaft 8 having the cylindrical surface 12, the cylindrical surface 12, with which the planetary rollers 13 are in rolling contact, is larger in diameter than any other portion of the rotary shaft 8. Therefore, it is possible to use a low-cost machining method, i.e., a method by which the outer periphery of the rotary shaft 8 is machined with the rotary shaft 8 rollably supported (e.g., centerless polishing), and to easily finish the cylindrical surface 12, e.g., by polishing. Centerless polishing is a machining method in which, with a workpiece sandwiched between a grinding wheel configured to rotate at a fixed position, and a regulating wheel configured to rotate at the position opposed to the grinding stone through the workpiece, the outer periphery of the workpiece is continuously polished, while axially feeding the workpiece, with the grinding wheel and the regulating wheel.

Since, in this embodiment, the rotation of the frictionally coupling portion 87 relative to the rotary shaft 8 is restricted by fitting the frictionally coupling portion 87 to the anti-rotation arrangement 88 disposed on the outer periphery of the fitting shaft portion 8a of the rotary shaft 8, and having a non-circular cross section, and the axial movement of the frictionally coupling portion 87 relative to the rotary shaft 8 is restricted by the snap ring 64 on the outer periphery of the rotary shaft 8, it is possible to easily mount the frictionally coupling portion 87 to the outer periphery of the rotary shaft 8.

If, as shown in FIG. 32, the anti-rotation arrangement 88 having a non-circular cross section comprises a plurality of (two in FIG. 32) flat surfaces formed by cutting portions of the circumference of the rotary shaft 8 so as to extend parallel to the center axis of the rotary shaft 8 and so as to be circumferentially equidistantly spaced apart from each other, it is possible to more accurately position the center of the frictionally coupling portion 87 on the center of the rotary shaft 8. However, the anti-rotation arrangement 88 may comprise only one such flat surface as illustrated in FIGS. 35 (a) and (b).

FIGS. 36(a) and 36(b) illustrate the second embodiment of the fourth aspect of the present invention.

In this embodiment, the rotation of the frictionally coupling portion 87 relative to the rotary shaft 8 is restricted by fitting the frictionally coupling portion 87 to an anti-rotation arrangement 88 disposed on the outer periphery of the fitting shaft portion 8a of the rotary shaft 8 and having a non-circular cross section. In the example shown, the anti-rotation arrangement has a polygonal cross section. The axially forward movement of the frictionally coupling portion 87 relative to the rotary shaft 8 is restricted by a snap ring 64 mounted on the outer periphery of the fitting shaft portion 8a of the rotary shaft 8, whereas the axially rearward movement of the frictionally coupling portion 87 relative to the rotary shaft 8 is restricted by a step 94 formed on the axially rear end of the fitting shaft portion 8a. With this arrangement, too, as in the first embodiment of the fourth aspect of the invention, it is possible to easily mount the frictionally coupling portion 87 to the outer periphery of the rotary shaft 8.

Figure 37A:
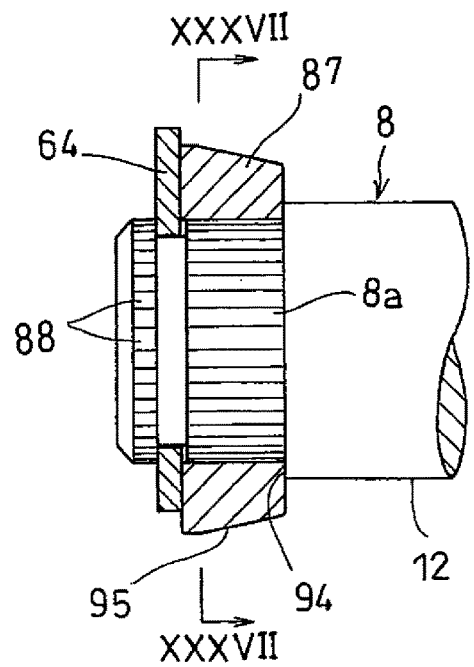
FIG. 37(a) is an enlarged view illustrating a frictionally coupling portion of a planetary roller screw type linear motion mechanism according to a third embodiment of the fourth aspect of the present invention.
Figure 37B:
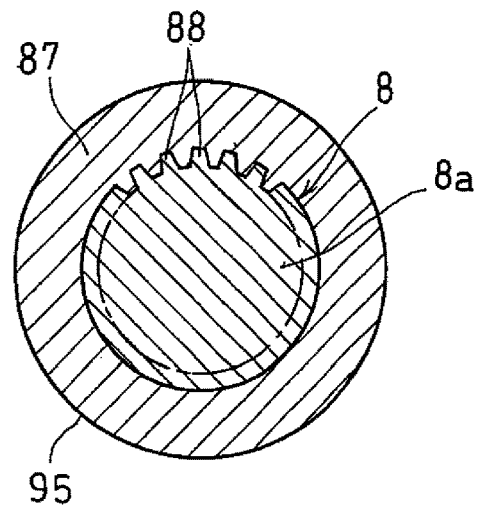
FIG. 37(b) is a sectional view taken along line XXXVII-XXXVII of FIG. 37(a).

FIGS. 37(a) and 37(b) illustrate the third embodiment of the fourth aspect of the present invention.

In this embodiment, the rotation of the frictionally coupling portion 87 relative to the rotary shaft 8 is restricted by fitting the frictionally coupling portion 87 to an anti-rotation arrangement 88 disposed on the outer periphery of the fitting shaft portion 8a of the rotary shaft 8 and having a non-circular cross section. The anti-rotation arrangement 88 of this embodiment comprises splines (a plurality of circumferentially equidistantly spaced apart, axially extending protrusions). The axially forward movement of the frictionally coupling portion 87 relative to the rotary shaft 8 is restricted by a snap ring 64 mounted on the outer periphery of the fitting shaft portion 8a of the rotary shaft 8, whereas the axially rearward movement of the frictionally coupling portion 87 relative to the rotary shaft 8 is restricted by a step 94 formed on the axially rear end of the fitting shaft portion 8a. With this arrangement, too, as in the first embodiment of the fourth aspect of the invention, it is possible to easily mount the frictionally coupling portion 87 to the outer periphery of the rotary shaft 8.

Figure 38:
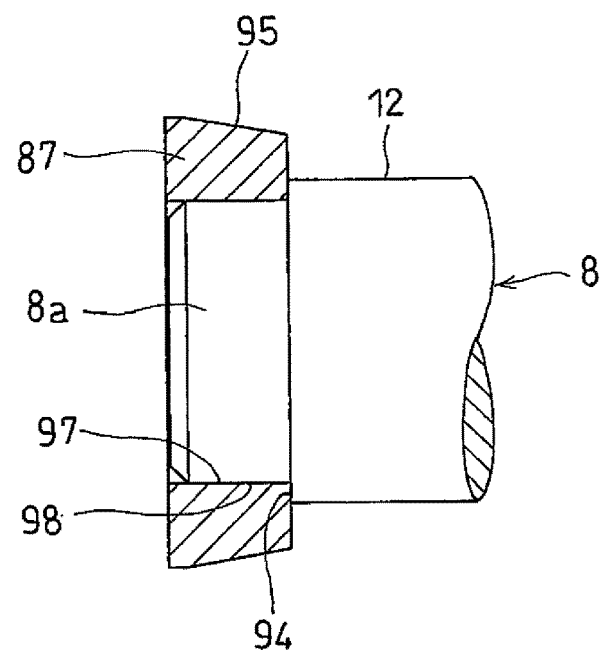
FIG. 38 is an enlarged view illustrating a frictionally coupling portion of a planetary roller screw type linear motion mechanism according to a fourth embodiment of the fourth aspect of the present invention.

FIG. 38 illustrates the fourth embodiment of the fourth aspect of the present invention.

In this embodiment, the frictionally coupling portion 87 is fitted on the outer periphery of the fitting shaft portion 8a of the rotary shaft 8 with interference. The frictionally coupling portion 87 has a cylindrical surface 97 on its inner periphery, and the fitting shaft portion 8a also has a cylindrical surface 98 on its outer periphery. In the state in which the frictionally coupling portion 87 is not fitted on (i.e., is removed from) the fitting shaft portion 8a, the cylindrical surface 97 on the inner periphery of the frictionally coupling portion 87 is smaller in diameter than the cylindrical surface 98 on the outer periphery of the fitting shaft portion 8a. By press-fitting the fitting shaft portion 8a to the frictionally coupling portion 87, it is possible to keep the outer periphery of the fitting shaft portion 8a tightened by the inner periphery of the frictionally coupling portion 87. With this arrangement, it is possible to simplify the inner peripheral shape of the frictionally coupling portion 87, and the outer peripheral shape of the portion of the rotary shaft 8 fitted to the frictionally coupling portion 87, and thus to reduce the cost for manufacturing the frictionally coupling portion 87 and the rotary shaft 8. Instead of press-fitting, shrink-fitting may be used.

Figure 39:
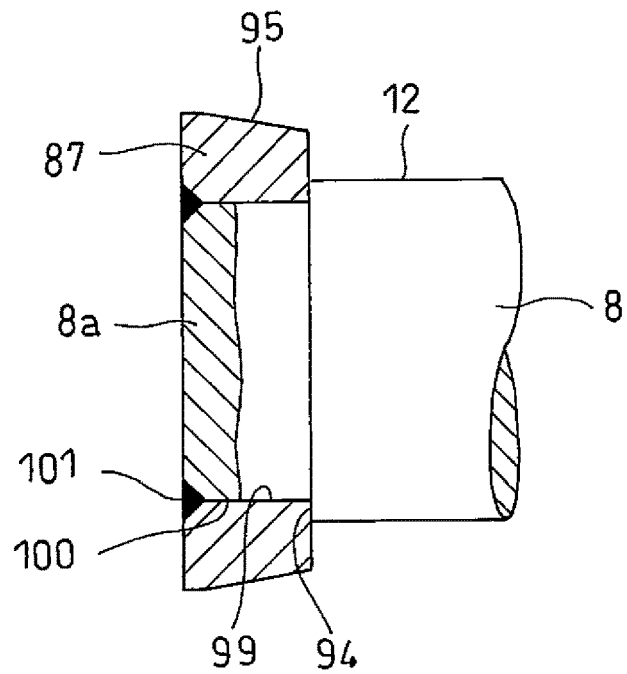
FIG. 39 is an enlarged view illustrating a frictionally coupling portion of a planetary roller screw type linear motion mechanism according to a fifth embodiment of the fourth aspect of the present invention.

FIG. 39 illustrates the fifth embodiment of the fourth aspect of the present invention.

In this embodiment, the frictionally coupling portion 87 is welded to the outer periphery of the fitting shaft portion 8a of the rotary shaft 8. The frictionally coupling portion 87 has a cylindrical surface 99 on its inner periphery, and the fitting shaft portion 8a also has a cylindrical surface 100 on its outer periphery. The cylindrical surface 99 on the inner periphery of the frictionally coupling portion 87 is slightly larger in diameter than the cylindrical surface 100 on the outer periphery of the fitting shaft portion 8a. The base materials of the frictionally coupling portion 87 and the rotary shaft 8 are partially melted and integrated into beads 101 at the axially front ends of the portions of the cylindrical surfaces 99 and 100 fitted to each other. With this arrangement, it is possible to simplify the inner peripheral shape of the frictionally coupling portion 87, and the outer peripheral shape of the portion of the rotary shaft 8 fitted to the frictionally coupling portion 87, and thus to reduce the cost for manufacturing the frictionally coupling portion 87 and the rotary shaft 8.

Figures 40A, 40B:
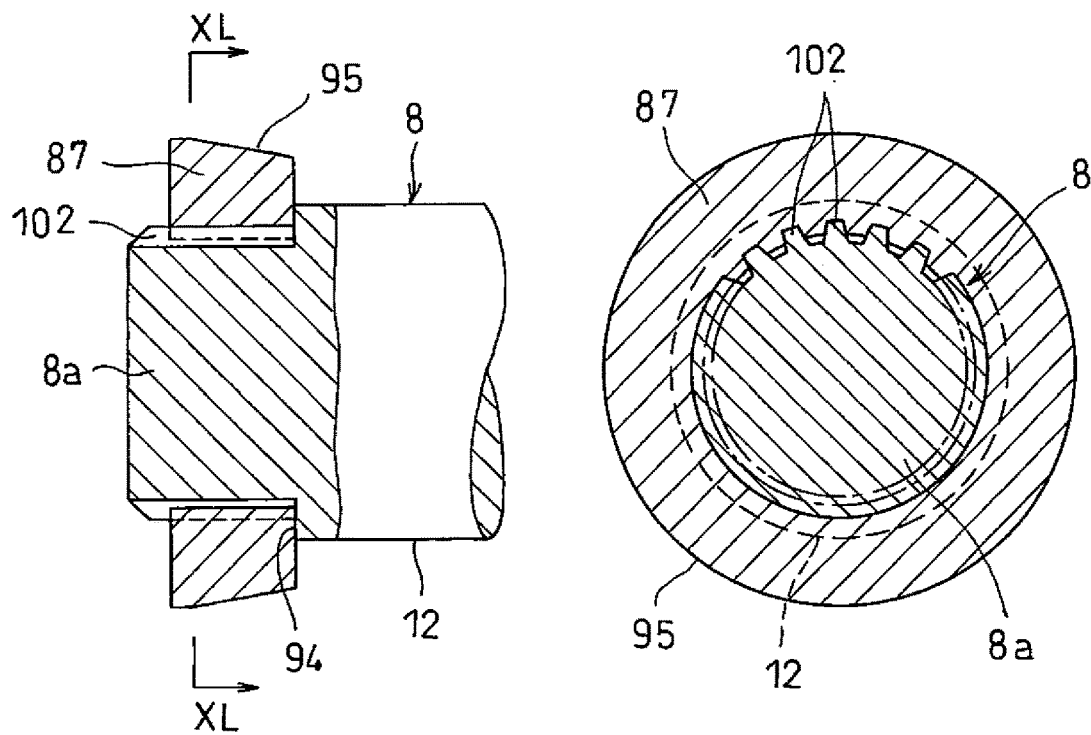
FIG. 40(a) is an enlarged view illustrating a frictionally coupling portion of a planetary roller screw type linear motion mechanism according to a sixth embodiment of the fourth aspect of the present invention.
FIG. 40(b) is a sectional view taken along line XL-XL of FIG. 40(a).

FIGS. 40(a) and 40(b) illustrate the sixth embodiment of the fourth aspect of the present invention.

The fitting shaft portion 8a of the rotary shaft 8 includes, on its outer periphery, splines 102 higher in hardness than the inner peripheral portion of the frictionally coupling portion 87. By wedging the splines 102 against the inner peripheral portion of the frictionally coupling portion 87, the frictionally coupling portion 87 is fixed to the rotary shaft 8.

Figure 41:
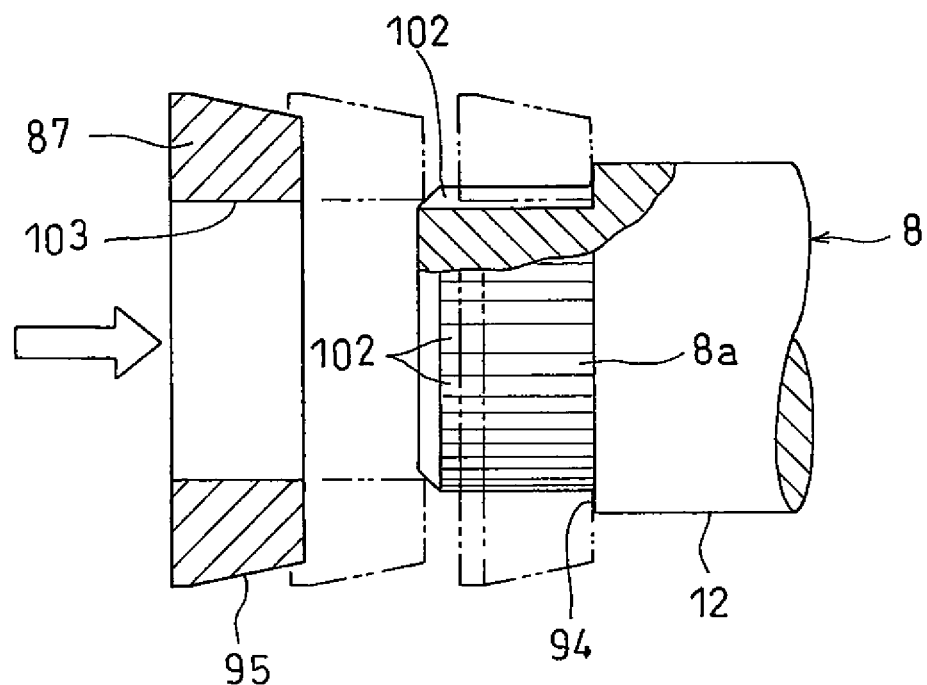
FIG. 41 is a view illustrating the step of fixing the frictionally coupling portion of FIG. 40 to a fitting shaft portion of the rotary shaft.

It is now described how the frictionally coupling portion 87 is fixed to the fitting shaft portion 8a. As illustrated in FIG. 41, first, the splines 102 are formed on the outer periphery of the fitting shaft portion 8a of the rotary shaft 8. Next, the outer periphery of the fitting shaft portion 8a is hardened by heat treatment. The inner peripheral portion of the frictionally coupling portion 87 comprises a cylindrical surface 103 which is not subjected to heat treatment. Therefore, the splines 102 are higher in hardness than the inner peripheral portion of the frictionally coupling portion 87. The circumcircle of the splines 102 is larger in diameter than the cylindrical surface 103. When the fitting shaft portion 8a of the rotary shaft 8, which includes such splines 102, is press-fitted to the frictionally coupling portion 87, the splines 102 are wedged against the cylindrical surface 103 of the frictionally coupling portion 87 on its inner periphery, thereby plastically deforming the inner peripheral portion of the frictionally coupling portion 87. Due to this plastic deformation, the frictionally coupling portion 87 is firmly fixed to the fitting shaft portion 8a.

By fixing the frictionally coupling portion 87 to the rotary shaft 8 by wedging the splines 102 against the inner peripheral portion of the frictionally coupling portion 87, it is possible to fix the frictionally coupling portion 87 in position with extremely high strength.

Figure 42:
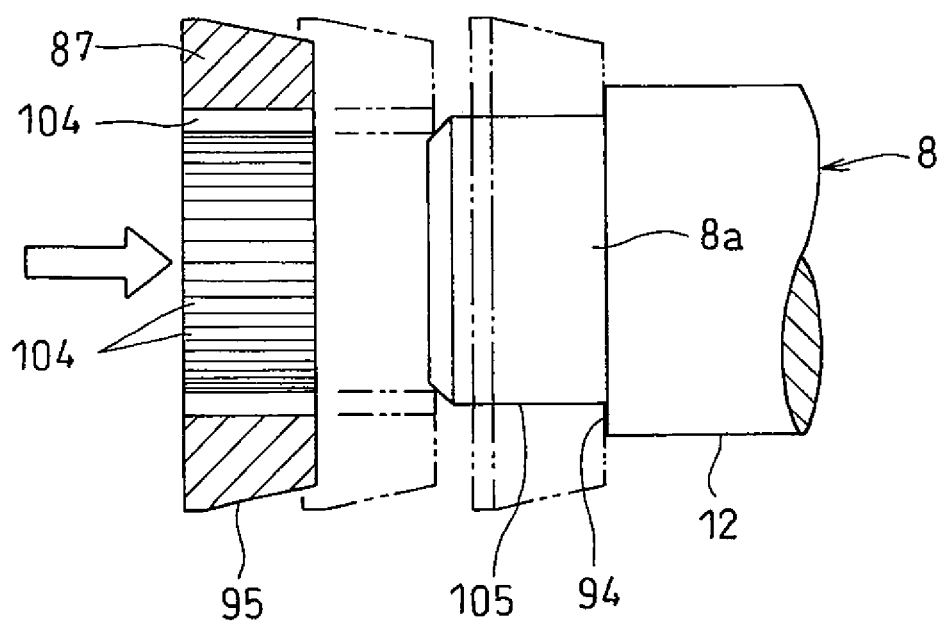
FIG. 42 is a view illustrating the step of fixing a frictionally coupling portion of a planetary roller screw type linear motion mechanism according to a seventh embodiment of the fourth aspect of the present invention to a fitting shaft portion of the rotary shaft.

FIG. 42 illustrates a fixing method for fixing the frictionally coupling portion 87 to the fitting shaft portion 8a in the actuator 1 according to the seventh embodiment of the fourth group of the present invention.

In this embodiment, first, splines 104 are formed on the inner periphery of the frictionally coupling portion 87. Next, the inner periphery of the frictionally coupling portion 87 is hardened by heat treatment. The outer peripheral portion of the fitting shaft portion 8a of the rotary shaft 8 comprises a cylindrical surface 105 which is not subjected to heat treatment. Therefore, the splines 104 of the frictionally coupling portion 87 are higher in hardness than the outer peripheral portion of the fitting shaft portion 8a of the rotary shaft 8. The inscribed circle of the splines 104 is smaller in diameter than the cylindrical surface 105. When the fitting shaft portion 8a of the rotary shaft 8 is press-fitted to the frictionally coupling portion 87, which includes such splines 104, the splines 104 are wedged against the cylindrical surface 105 on the outer periphery of the fitting shaft portion 8a, thereby plastically deforming the outer peripheral portion of the fitting shaft portion 8a. Due to this plastic deformation, the frictionally coupling portion 87 is firmly fixed to the fitting shaft portion 8a.

By fixing the frictionally coupling portion 87 to the rotary shaft 8 by wedging the splines 104 against the outer peripheral portion of the fitting shaft portion 8a, it is possible to fix the frictionally coupling portion 87 in position with extremely high strength.

The above embodiments of the fourth aspect of the present invention, which have been described with reference to FIGS. 29 to 43, can be summarized as follows:

(Additional Description 9)

A planetary roller screw type linear motion mechanism comprising:
- a rotary shaft (8) having a cylindrical surface (12) on its outer periphery;
- a plurality of planetary rollers (13) in rolling contact with the cylindrical surface (12);
- a carrier (14) retaining the planetary rollers (13) such that the planetary rollers (13) can revolve around the rotary shaft (8) while rotating about their respective center axes;
- an outer ring member (4) surrounding the planetary rollers (13), and supported so as to be axially movable;
- a helical rib (16) disposed on the inner periphery of the outer ring member (4);
- a helical groove or circumferential grooves (17) which are disposed in the outer periphery of each of the planetary rollers (13), and in which the helical rib (16) is engaged such that the outer ring member (4) axially moves when the planetary rollers (13) revolve around the rotary shaft (8) while rotating about their respective center axes;
- an elastic member (45) supporting the carrier (14) such that the carrier (14) moves in the axially rearward direction relative to the rotary shaft (8) due to the axially rearward reaction force which the outer ring member (4) receives when the outer ring member (4) applies an axially forward load to an object; and
- a frictionally coupling portion (87) disposed on the outer periphery of the rotary shaft (8), and configured such that, while the carrier (14) has not moved in the axially rearward direction relative to the rotary shaft (8), the frictionally coupling portion (87) and the carrier (14) are frictionally coupled together so as to restrict the relative rotation of the carrier (14) and the rotary shaft (8), and such that, when the carrier (14) has moved in the axially rearward direction relative to the rotary shaft (8), the frictionally coupling portion (87) and the carrier (14) are uncoupled from each other so as to allow the carrier (14) and the rotary shaft (8) to rotate relative to each other,
- wherein the frictionally coupling portion (87) has an outer diameter larger than the diameter of the cylindrical surface (12),
- characterized in that the frictionally coupling portion (87) comprises an annular member formed separately from the portion of the rotary shaft (8) having the cylindrical surface (12), and fixedly fitted on the outer periphery of the rotary shaft (8).

(Additional Description 10)

The planetary roller screw type linear motion mechanism according to additional description 9, further comprising:
- an anti-rotation arrangement (88) disposed on the outer periphery of the rotary shaft (8), and having a non-circular cross section, wherein the frictionally coupling portion (87) is fitted to the anti-rotation arrangement (88) such that the rotation of the frictionally coupling portion (87) relative to the rotary shaft (8) is restricted by fitting the frictionally coupling portion (87); and,
- a snap ring (64) mounted on the outer periphery of the rotary shaft (8) so as to restrict the axial movement of the frictionally coupling portion (87) relative to the rotary shaft (8); and (Additional Description 11)

The planetary roller screw type linear motion mechanism according to additional description 9, wherein the frictionally coupling portion (87) is fitted on the outer periphery of the rotary shaft (8) with interference.

(Additional Description 12)

The planetary roller screw type linear motion mechanism according to additional description 9, wherein the frictionally coupling portion (87) is welded to the outer periphery of the rotary shaft (8).

(Additional Description 13)

The planetary roller screw type linear motion mechanism according to additional description 9, wherein the rotary shaft (8) includes, on its outer periphery, splines (102) higher in hardness than the inner peripheral portion of the frictionally coupling portion (87), and wedged against the inner peripheral portion of the frictionally coupling portion (87) so that the frictionally coupling portion (87) is fixed to the rotary shaft (8).

(Additional Description 14)

The planetary roller screw type linear motion mechanism according to additional description 9, wherein the frictionally coupling portion (87) includes, on its inner periphery, splines (104) higher in hardness than the outer peripheral portion of the rotary shaft (8) fitted to the frictionally coupling portion (87), and wedged against the outer peripheral portion of the rotary shaft (8) so that the frictionally coupling portion (87) is fixed to the rotary shaft (8).

(Additional Description 15)

The planetary roller screw type linear motion mechanism according to any of additional descriptions 9 to 14, wherein the contact surface of the frictionally coupling portion (87)

with which the carrier (14) comes into contact comprises a tapered surface whose diameter decreases toward the axially rearward side thereof.

(Additional Description 16)

An electromechanical brake system comprising:
the planetary roller screw type linear motion mechanism (5) according to any of additional descriptions 9 to 15;
an electric motor (2) configured to drive and rotate the rotary shaft (8) of the planetary roller screw type linear motion mechanism (5);
a brake pad (53) configured to move together with the outer ring member (4) of the planetary roller screw type linear motion mechanism (5); and
a brake disk (50) opposed to the brake pad (53).

DESCRIPTION OF REFERENCE NUMERALS

1: electric linear motion actuator
2: electric motor
4: outer ring member
8: rotary shaft
13: planetary roller
14: carrier
15: housing
16: helical rib
17: circumferential groove
27: first thrust bearing
30: load sensor
31: flange member
32: support member
33: magnetic target
34: magnetism detector
42: rib
45: elastic member
47: frictionally coupling surface
48: snap ring
50: brake disk
53: inboard brake pad
61: second thrust bearing

The invention claimed is:

1. An electric linear motion actuator comprising:
an electric motor;
a rotary shaft to which rotation of the electric motor is to be transmitted;
a plurality of planetary rollers in rolling contact with an outer periphery of the rotary shaft, and each having an outer periphery;
a carrier retaining the planetary rollers such that the planetary rollers can revolve around the rotary shaft while rotating about respective center axes of the planetary rollers;
an outer ring member surrounding the planetary rollers, and supported so as to be axially movable;
a housing in which the outer ring member is axially movably received;
a helical rib disposed on an inner periphery of the outer ring member;
either helical grooves each disposed in the outer periphery of a respective one of the planetary rollers, or circumferential grooves, a plurality of the circumferential grooves being disposed in the outer periphery of a respective one of the planetary rollers, wherein the helical rib is engaged in the helical grooves or the circumferential grooves such that the outer ring member is axially movable when the planetary rollers revolve around the rotary shaft while rotating about the respective center axes thereof, a front engagement portion disposed on the outer periphery of the rotary shaft so as to restrict a range within which the carrier is movable in an axially forward direction relative to the rotary shaft;
a rear engagement portion disposed on the outer periphery of the rotary shaft so as to restrict a range within which the carrier is movable in an axially rearward direction relative to the rotary shaft;
an elastic member configured to bias the carrier in the axially forward direction relative to the rotary shaft;
wherein the electric linear motion actuator is configured such that
while a first axially forward load is not being applied to an object by the outer ring member, a preload is applied to the front engagement portion by the elastic member, and
when the first axially forward load is applied to the object by the outer ring member, an axial load applied to the front engagement portion decreases by an amount equal to an axially rearward reaction force which the outer ring member receives from the object when the first axially forward load is applied to the object by the outer ring member; and
a load sensor configured to support, through the planetary rollers and the carrier, the axially rearward reaction force,
wherein the load sensor comprises:
a flange member configured to be deflected by the axially rearward reaction force;
a circular annular plate-shaped support member disposed axially rearward of the flange member;
a magnetic target configured to generate a magnetic field; and
a magnetism detector configured to detect the magnetic field generated by the magnetic target,
wherein one of the magnetic target and the magnetism detector is fixed to the flange member, and the other of the magnetic target and the magnetism detector is fixed to the circular annular plate-shaped support member such that, as the flange member is deflected, the magnetic target and the magnetism detector are displaced from each other according to a degree of deflection of the flange member,
wherein the circular annular plate-shaped support member is disposed between the carrier and the rear engagement portion such that a second axially forward load applied through the rear engagement portion is applied to the circular annular plate-shaped support member,
wherein the housing includes a support protrusion disposed axially rearward of a portion of an inner periphery of the housing on which the support member is fitted to restrict axially rearward movement of the support member, and
wherein the circular annular plate-shaped support member includes, on an axially rear side surface of the circular annular plate-shaped support member, a plurality of radially extending ribs circumferentially spaced apart from each other, the ribs having radially outer ends that are radially opposed to a radially inner edge of the support protrusion.

2. The electric linear motion actuator according to claim 1, wherein the front engagement portion comprises a frictionally coupling surface configured such that, while the carrier has not moved in the axially rearward direction relative to the rotary shaft, the frictionally coupling surface and the carrier are frictionally coupled together so as to restrict a relative rotation of the carrier and the rotary shaft, and such that, when the carrier has moved in the axially rearward direction relative to the rotary shaft, the frictionally coupling surface and the carrier are uncoupled from each other so as to allow the carrier and the rotary shaft to rotate relative to each other.

3. An electromechanical brake system comprising:
a brake disk configured to rotate together with a vehicle wheel;
a brake pad opposed to the brake disk; and
the electric linear motion actuator according to claim 1, which is configured to linearly drive the brake pad.

4. An electric linear motion actuator comprising:
an electric motor;
a rotary shaft to which rotation of the electric motor is to be transmitted;
a plurality of planetary rollers in rolling contact with an outer periphery of the rotary shaft, and each having an outer periphery;
a carrier retaining the planetary rollers such that the planetary rollers can revolve around the rotary shaft while rotating about respective center axes of the planetary rollers;
an outer ring member surrounding the planetary rollers, and supported so as to be axially movable;
a housing in which the outer ring member is axially movably received;
a helical rib disposed on an inner periphery of the outer ring member;
either helical grooves each disposed in the outer periphery of a respective one of the planetary rollers, or circumferential grooves, a plurality of the circumferential grooves being disposed in the outer periphery of a respective one of the planetary rollers, wherein the helical rib is engaged in the helical grooves or the circumferential grooves such that the outer ring member is axially movable when the planetary rollers revolve around the rotary shaft while rotating about the respective center axes thereof,
a front engagement portion disposed on the outer periphery of the rotary shaft so as to restrict a range within which the carrier is movable in an axially forward direction relative to the rotary shaft;
a rear engagement portion disposed on the outer periphery of the rotary shaft so as to restrict a range within which the carrier is movable in an axially rearward direction relative to the rotary shaft;
an elastic member configured to bias the carrier in the axially forward direction relative to the rotary shaft;
wherein the electric linear motion actuator is configured such that
while a first axially forward load is not being applied to an object by the outer ring member, a preload is applied to the front engagement portion by the elastic member, and
when the first axially forward load is applied to the object by the outer ring member, an axial load applied to the front engagement portion decreases by an amount equal to an axially rearward reaction force which the outer ring member receives from the object when the first axially forward load is applied to the object by the outer ring member; and
a load sensor configured to support, through the planetary rollers and the carrier, the axially rearward reaction force, wherein the load sensor comprises:
a flange member configured to be deflected by the axially rearward reaction force;
a circular annular plate-shaped support member disposed axially rearward of the flange member;
a magnetic target configured to generate a magnetic field; and
a magnetism detector configured to detect the magnetic field generated by the magnetic target,
wherein one of the magnetic target and the magnetism detector is fixed to the flange member, and the other of the magnetic target and the magnetism detector is fixed to the circular annular plate-shaped support member such that, as the flange member is deflected, the magnetic target and the magnetism detector are displaced from each other according to a degree of deflection of the flange member,
wherein the circular annular plate-shaped support member has a radially outer edge, and is disposed between the carrier and the rear engagement portion such that a second axially forward load applied through the rear engagement portion is applied to the radially outer edge of the circular annular plate-shaped support member,
wherein the circular annular plate-shaped support member is a first support member, and the load sensor further includes a second support member disposed between the first support member and the rear engagement portion, the second support member having a radially inner edge supported from an axially rear side thereof by the rear engagement portion, the second support member further having a radially outer edge supporting the radially outer edge of the first support member from an axially rear side of the first support member,
and wherein the first support member and the second support member are in contact with each other only at the radially outer edges thereof, and are out of contact with each other at portions of the first and second support members located radially inwardly of the respective radially outer edges thereof.

5. The electric linear motion actuator according to claim 4, wherein the front engagement portion comprises a frictionally coupling surface configured such that, while the carrier has not moved in the axially rearward direction relative to the rotary shaft, the frictionally coupling surface and the carrier are frictionally coupled together so as to restrict a relative rotation of the carrier and the rotary shaft, and such that, when the carrier has moved in the axially rearward direction relative to the rotary shaft, the frictionally coupling surface and the carrier are uncoupled from each other so as to allow the carrier and the rotary shaft to rotate relative to each other.

6. An electromechanical brake system comprising:
a brake disk configured to rotate together with a vehicle wheel;
a brake pad opposed to the brake disk; and
the electric linear motion actuator according to claim 4, which is configured to linearly drive the brake pad.

7. An electric linear motion actuator comprising:
an electric motor;
a rotary shaft to which rotation of the electric motor is to be transmitted;
a plurality of planetary rollers in rolling contact with an outer periphery of the rotary shaft, and each having an outer periphery;

a carrier retaining the planetary rollers such that the planetary rollers can revolve around the rotary shaft while rotating about respective center axes of the planetary rollers;

an outer ring member surrounding the planetary rollers, and supported so as to be axially movable;

a housing in which the outer ring member is axially movably received;

a helical rib disposed on an inner periphery of the outer ring member;

either helical grooves each disposed in the outer periphery of a respective one of the planetary rollers, or circumferential grooves, a plurality of the circumferential grooves being disposed in the outer periphery of a respective one of the planetary rollers, wherein the helical rib is engaged in the helical grooves or the circumferential grooves such that the outer ring member is axially movable when the planetary rollers revolve around the rotary shaft while rotating about the respective center axes thereof, a front engagement portion disposed on the outer periphery of the rotary shaft so as to restrict a range within which the carrier is movable in an axially forward direction relative to the rotary shaft;

a rear engagement portion disposed on the outer periphery of the rotary shaft so as to restrict a range within which the carrier is movable in an axially rearward direction relative to the rotary shaft;

an elastic member configured to bias the carrier in the axially forward direction relative to the rotary shaft;

wherein the electric linear motion actuator is configured such that while a first axially forward load is not being applied to an object by the outer ring member, a preload is applied to the front engagement portion by the elastic member, and when the first axially forward load is applied to the object by the outer ring member, an axial load applied to the front engagement portion decreases by an amount equal to an axially rearward reaction force which the outer ring member receives from the object when the first axially forward load is applied to the object by the outer ring member; and a load sensor configured to support, through the planetary rollers and the carrier, the axially rearward reaction force, wherein the rear engagement portion is a snap ring disposed on a portion of the outer periphery of the rotary shaft between the carrier and the load sensor, and the load sensor is disposed axially rearward of the rear engagement portion.

8. The electric linear motion actuator according to claim 7, further comprising:

a first thrust bearing arranged to allow the carrier and the load sensor to rotate relative to each other, while transmitting any axial load between the carrier and the load sensor; and a second thrust bearing arranged to allow the carrier and the rear engagement portion to rotate relative to each other, while transmitting any axial load between the carrier and the rear engagement portion.

9. The electric linear motion actuator according to claim 7, wherein the front engagement portion comprises a frictionally coupling surface configured such that, while the carrier has not moved in the axially rearward direction relative to the rotary shaft, the frictionally coupling surface and the carrier are frictionally coupled together so as to restrict a relative rotation of the carrier and the rotary shaft, and such that, when the carrier has moved in the axially rearward direction relative to the rotary shaft, the frictionally coupling surface and the carrier are uncoupled from each other so as to allow the carrier and the rotary shaft to rotate relative to each other.

10. The electric linear motion actuator according to claim 8, wherein the front engagement portion comprises a frictionally coupling surface configured such that, while the carrier has not moved in the axially rearward direction relative to the rotary shaft, the frictionally coupling surface and the carrier are frictionally coupled together so as to restrict a relative rotation of the carrier and the rotary shaft, and such that, when the carrier has moved in the axially rearward direction relative to the rotary shaft, the frictionally coupling surface and the carrier are uncoupled from each other so as to allow the carrier and the rotary shaft to rotate relative to each other.

11. An electromechanical brake system comprising:
a brake disk configured to rotate together with a vehicle wheel;
a brake pad opposed to the brake disk; and
the electric linear motion actuator according to claim 7, which is configured to linearly drive the brake pad.

12. An electromechanical brake system comprising:
a brake disk configured to rotate together with a vehicle wheel;
a brake pad opposed to the brake disk; and
the electric linear motion actuator according to claim 8, which is configured to linearly drive the brake pad.

* * * * *